(12) United States Patent
Horie et al.

(10) Patent No.: US 10,786,835 B2
(45) Date of Patent: Sep. 29, 2020

(54) ULTRASONIC CLEANER AND AUTOMATIC ANALYZER USING THE SAME

(71) Applicant: Hitachi High-Technologies Corporation, Tokyo (JP)

(72) Inventors: Yosuke Horie, Tokyo (JP); Tomohiro Inoue, Tokyo (JP); Takamichi Mori, Tokyo (JP); Kouhei Nonaka, Tokyo (JP); Masato Ishizawa, Tokyo (JP); Isao Yamazaki, Tokyo (JP); Hitoshi Tokieda, Tokyo (JP); Akihiro Nojima, Tokyo (JP)

(73) Assignee: HITACHI HIGH-TECH CORPORATION, Tokyo (JP)

( * ) Notice: Subject to any disclaimer, the term of this patent is extended or adjusted under 35 U.S.C. 154(b) by 350 days.

(21) Appl. No.: 15/580,910

(22) PCT Filed: Jun. 27, 2016

(86) PCT No.: PCT/JP2016/068941
§ 371 (c)(1),
(2) Date: Dec. 8, 2017

(87) PCT Pub. No.: WO2017/002740
PCT Pub. Date: Jan. 5, 2017

(65) Prior Publication Data
US 2018/0161829 A1 Jun. 14, 2018

(30) Foreign Application Priority Data

Jun. 29, 2015 (JP) .................................. 2015-129454
Dec. 25, 2015 (JP) .................................. 2015-252803
Jun. 10, 2016 (JP) .................................. 2016-115823

(51) Int. Cl.
*B08B 3/12* (2006.01)
*B08B 3/14* (2006.01)
(Continued)

(52) U.S. Cl.
CPC ................. *B08B 3/12* (2013.01); *B08B 3/14* (2013.01); *G01N 1/14* (2013.01); *G01N 35/1002* (2013.01); *G01N 35/1004* (2013.01)

(58) Field of Classification Search
None
See application file for complete search history.

(56) References Cited

U.S. PATENT DOCUMENTS 4,516,437 A * 5/1985 Pedroso ............. G01N 35/1004
134/21
4,989,623 A * 2/1991 Hoffman ............. G01N 35/1004
134/170

(Continued)

FOREIGN PATENT DOCUMENTS

JP 60-042635 A 3/1985
JP 01-101680 U 7/1989
(Continued)

OTHER PUBLICATIONS

JP 2945746 translation, J Plat Pat (Year: 1999).*
(Continued)

*Primary Examiner* — Cristi J Tate-Sims
(74) *Attorney, Agent, or Firm* — Mattingly & Malur, PC

(57) ABSTRACT

An ultrasonic cleaner according to the present invention includes a vibrating part 222 for enlarging ultrasonic vibration of a BLT 100 on a side surface side in a cleaning tank 211, generates cavitation by the ultrasonic vibration with respect to cleaning liquid supplied into the cleaning tank 211 by driving the BLT 100 on the periphery of a nozzle without unevenness, and is capable of performing effective nozzle cleaning.

26 Claims, 22 Drawing Sheets

(51) Int. Cl.
   *G01N 1/14*   (2006.01)
   *G01N 35/10*   (2006.01)

(56) References Cited

U.S. PATENT DOCUMENTS

| | | | | |
|---|---|---|---|---|
| 5,603,342 | A * | 2/1997 | Shambaugh | B08B 3/04 |
| | | | | 134/154 |
| 6,422,248 | B1 * | 7/2002 | Furst | B08B 3/02 |
| | | | | 134/170 |
| 2005/0279387 | A1 * | 12/2005 | Blackwell | G01N 35/1004 |
| | | | | 134/22.1 |
| 2006/0054190 | A1 * | 3/2006 | Gifford | B08B 3/12 |
| | | | | 134/22.1 |
| 2006/0179946 | A1 * | 8/2006 | Wilson | B06B 3/02 |
| | | | | 73/570 |
| 2008/0142037 | A1 * | 6/2008 | Dempski | B01L 13/02 |
| | | | | 134/1 |

FOREIGN PATENT DOCUMENTS

| | | |
|---|---|---|
| JP | 04-009670 A | 1/1992 |
| JP | 04-169850 A | 6/1992 |
| JP | 2945746 B2 | 6/1999 |
| JP | 2010-025587 A | 2/2010 |
| JP | 2010-133727 A | 6/2010 |
| JP | 2010-286243 A | 12/2010 |
| JP | 2012-150023 A | 8/2012 |

OTHER PUBLICATIONS

Extended European Search Report received in corresponding European Application No. 16817848.1 dated Feb. 4, 2019.
International Search Report of PCT/JP2016/068941 dated Sep. 20, 2016.

* cited by examiner

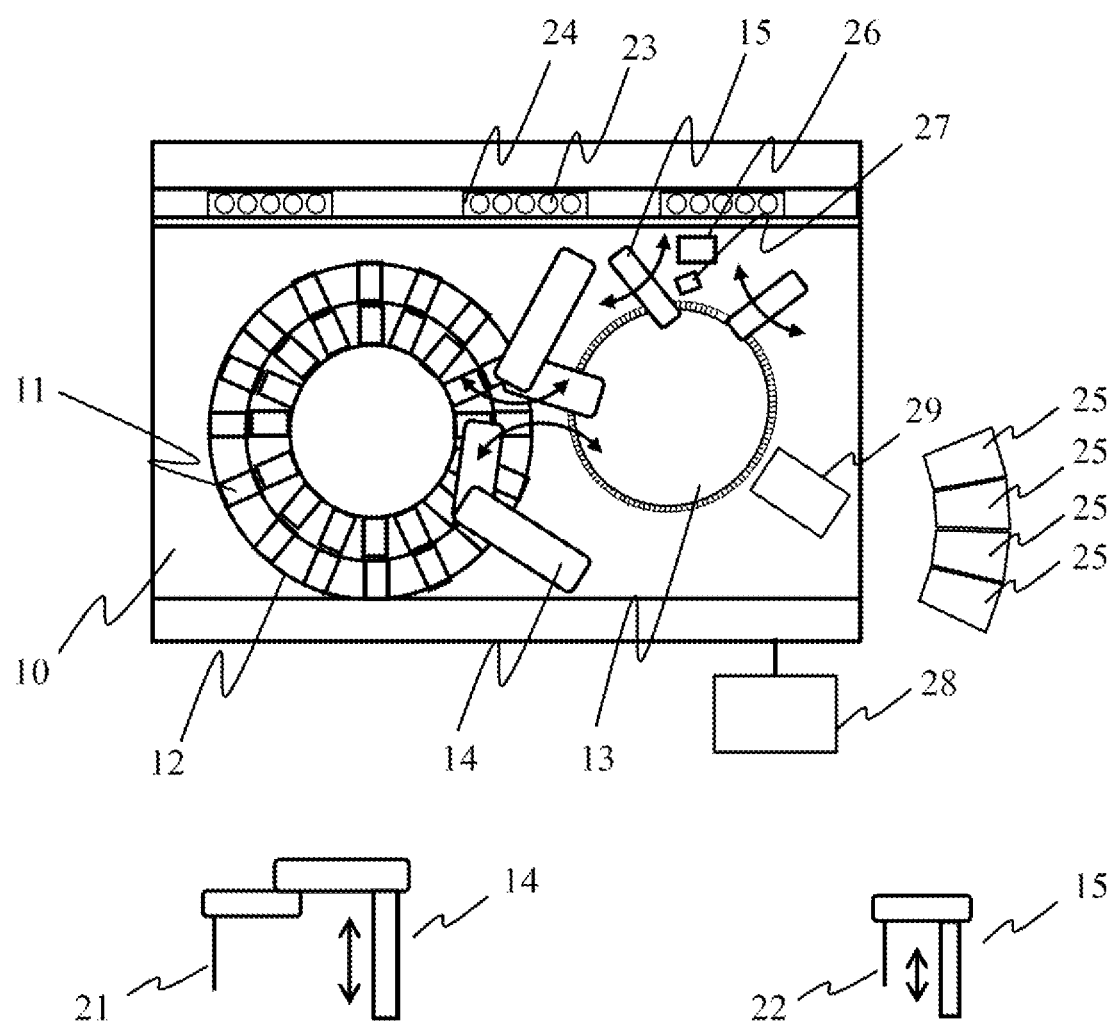
[Fig. 1]

[Fig. 2]
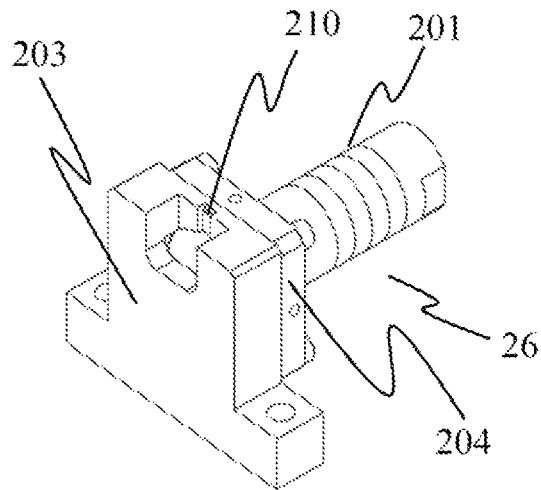
(a)
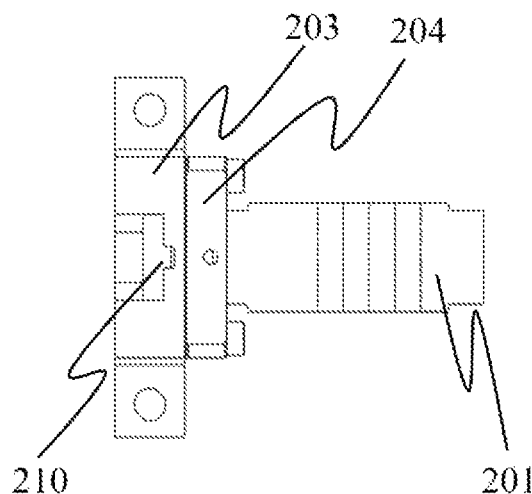
(b)
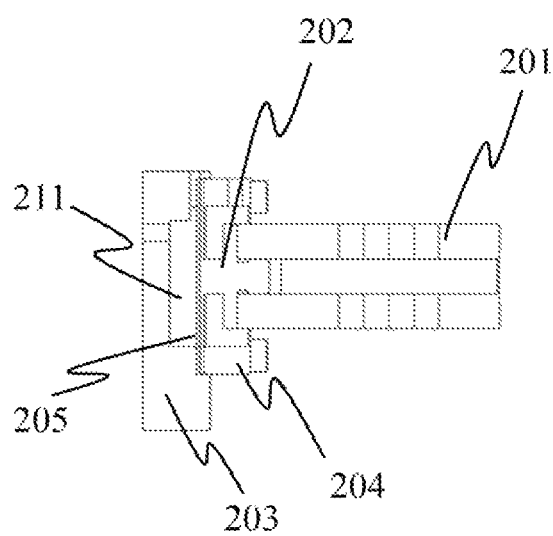
(c)
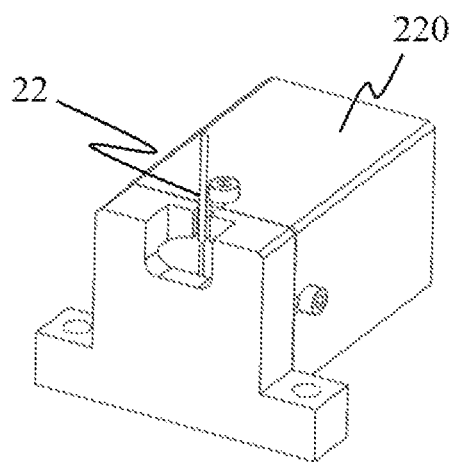
(d)

[Fig. 3]
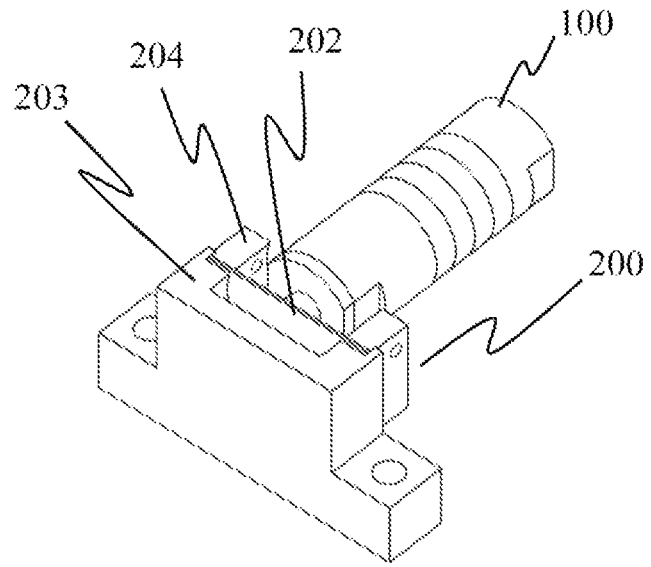
(a)
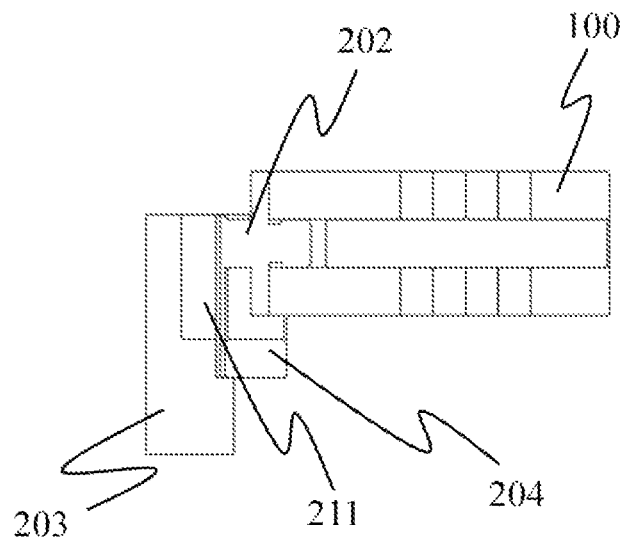
(b)

[Fig. 4]
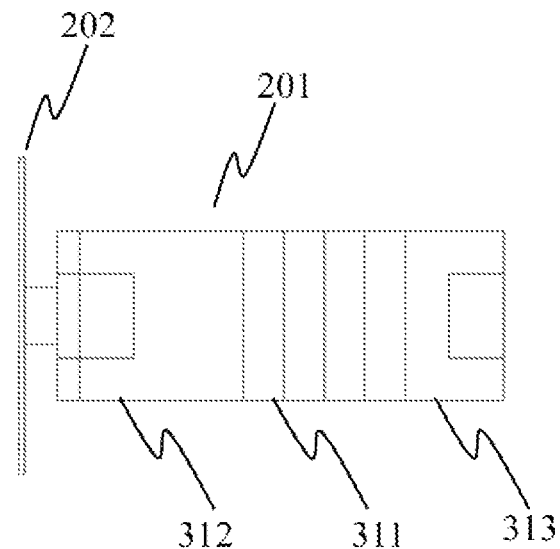
(a)
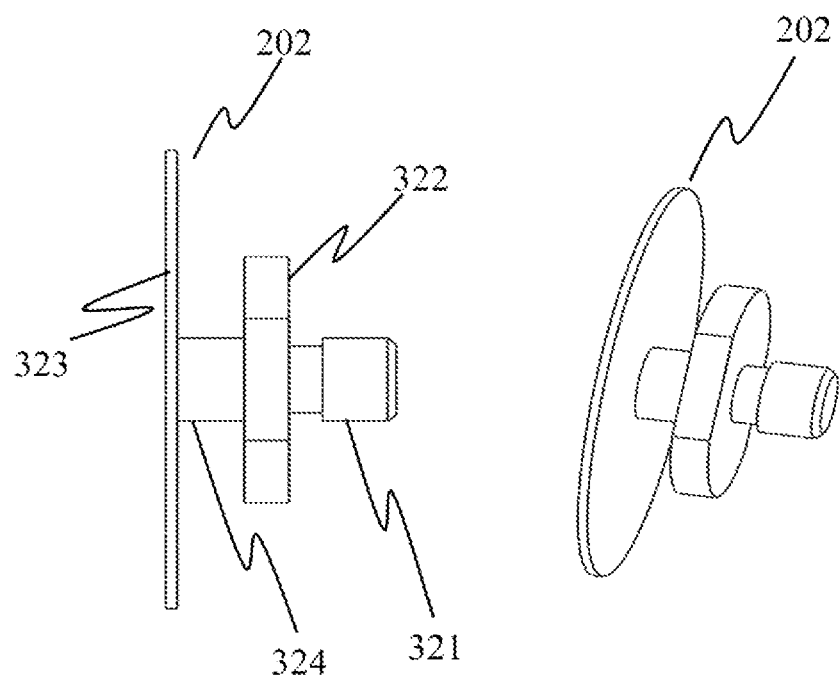
(b)　　　　　　(c)

[Fig. 5]
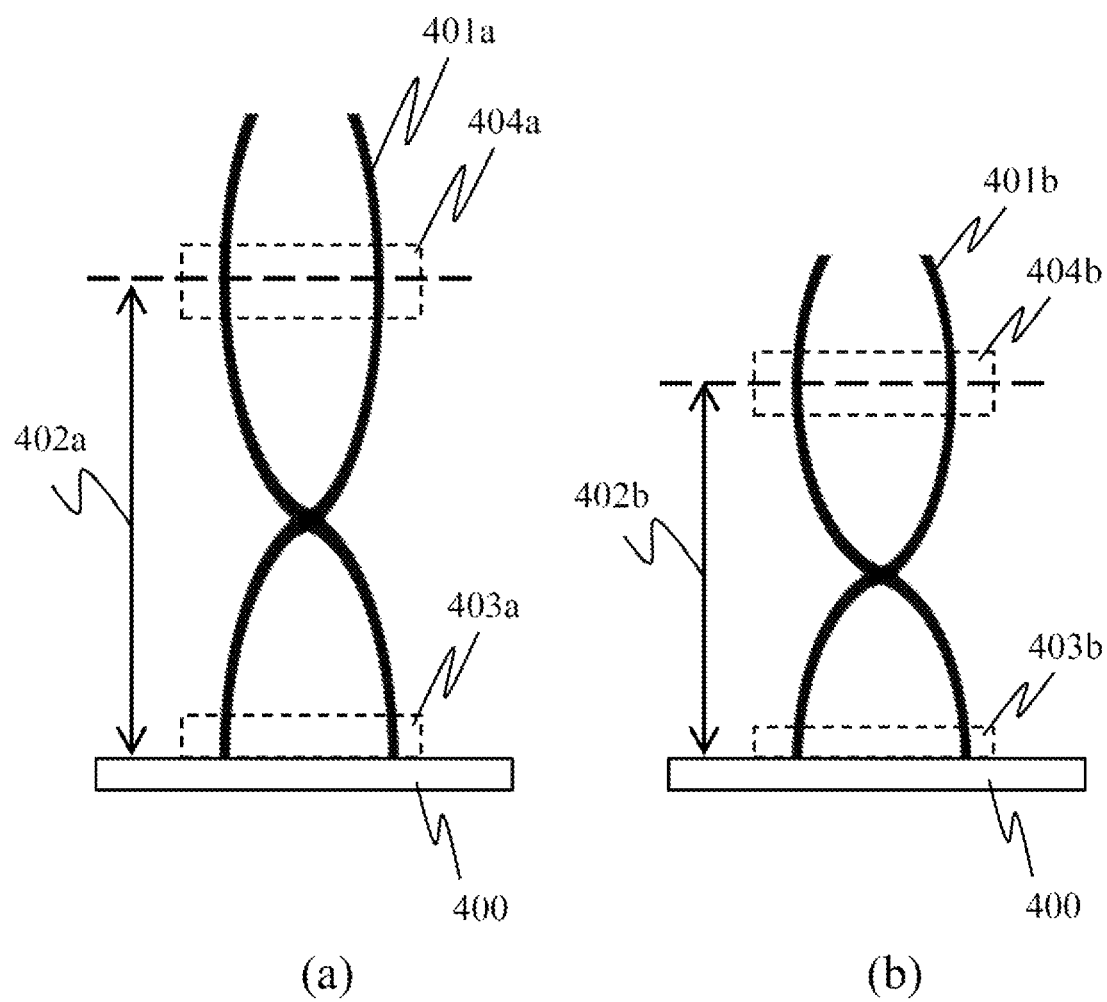

[Fig. 6]
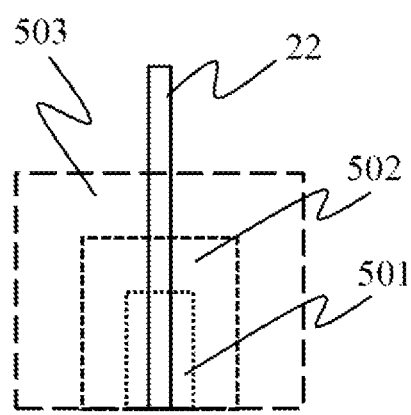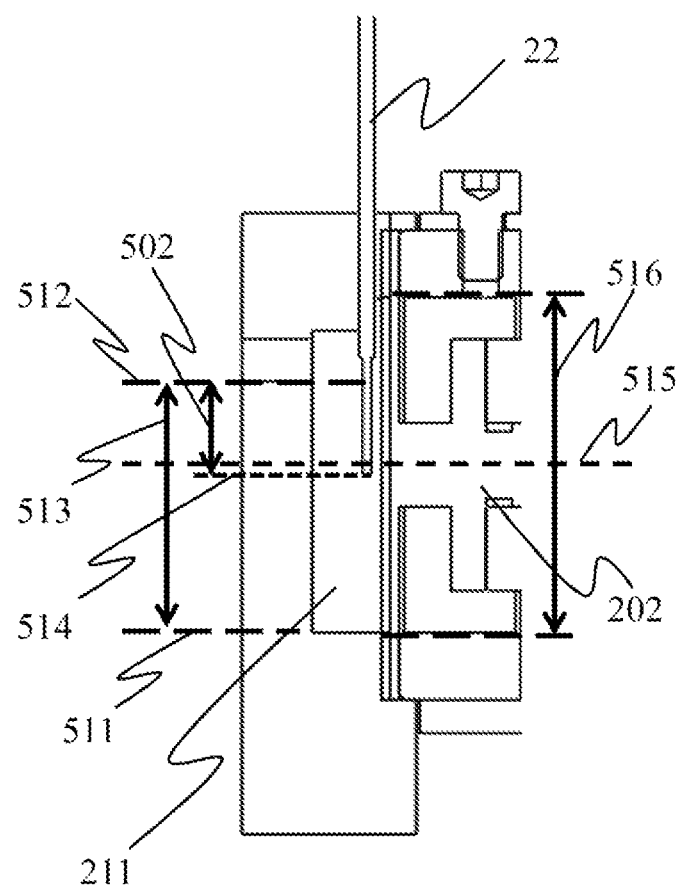
(a)　　　　　　　　　　(b)

[Fig. 7]
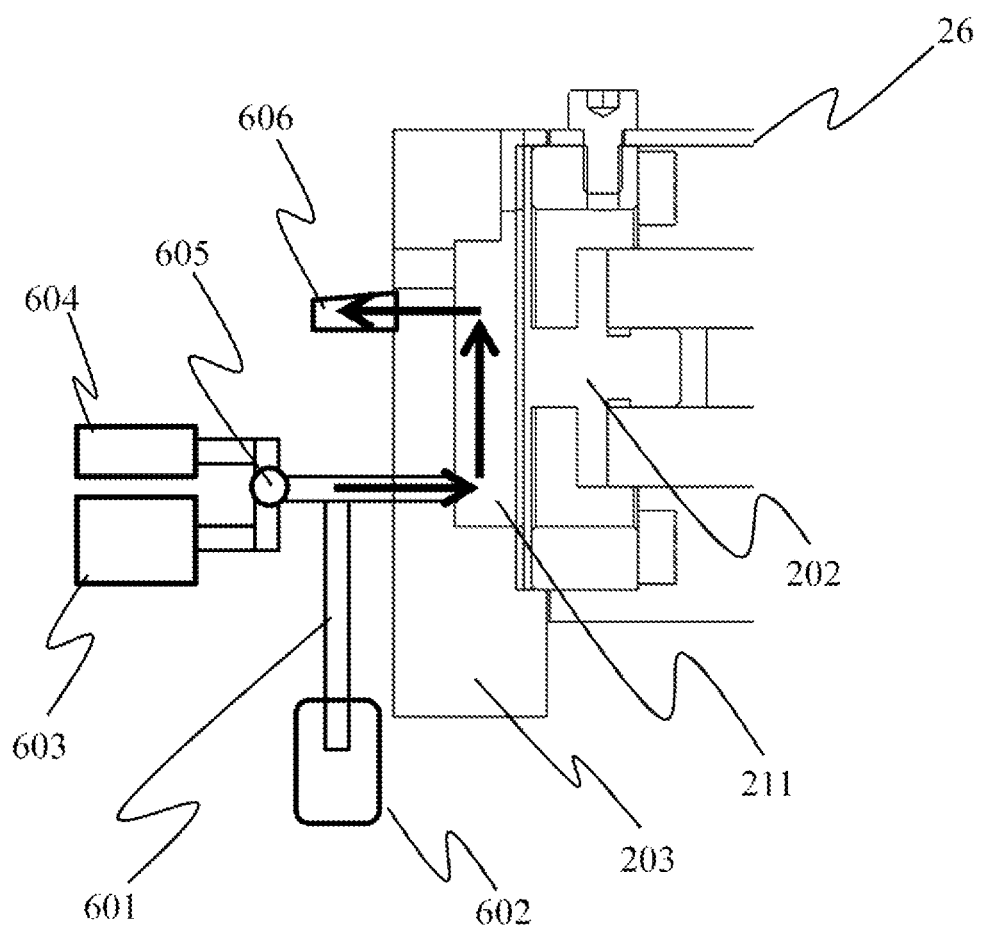

[Fig. 8]
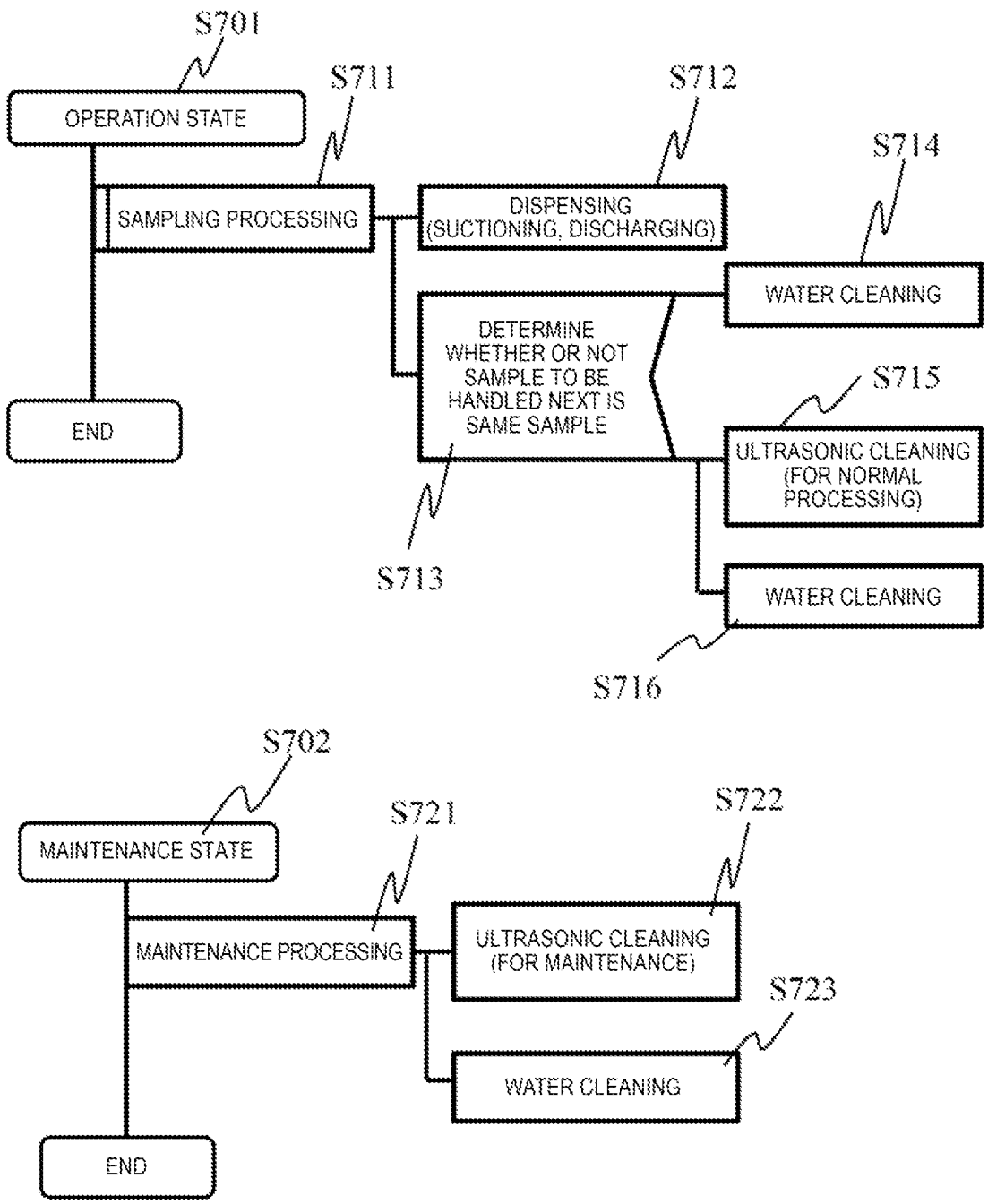

[Fig. 9]
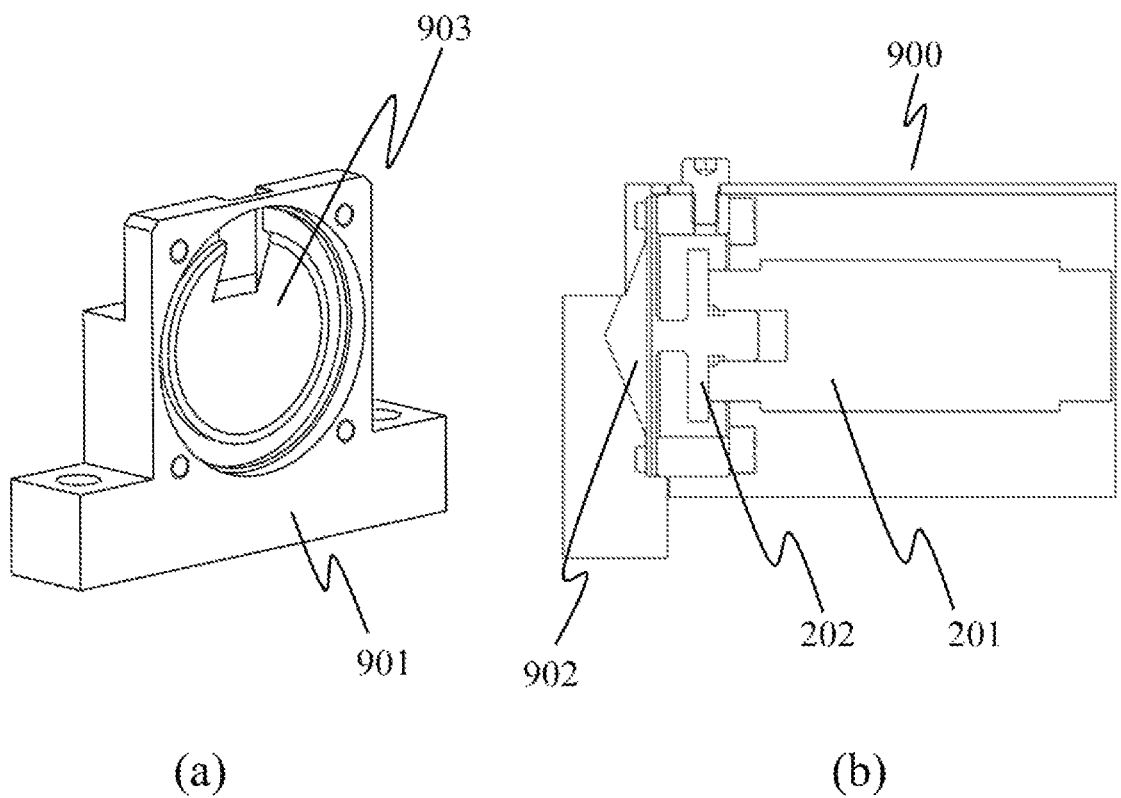
(a) (b)

[Fig. 10]
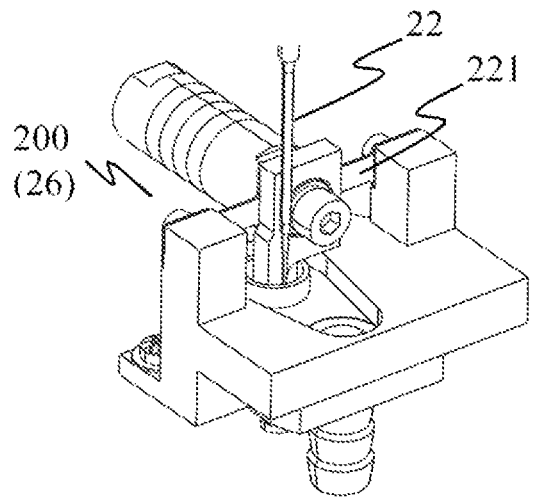
(a)
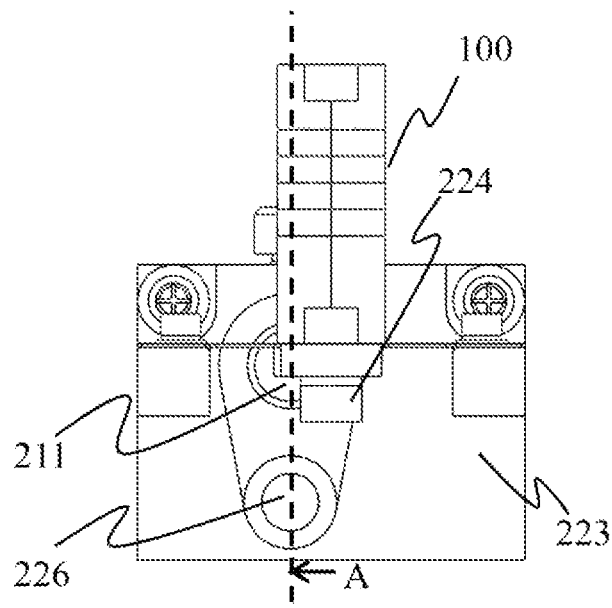
(b)
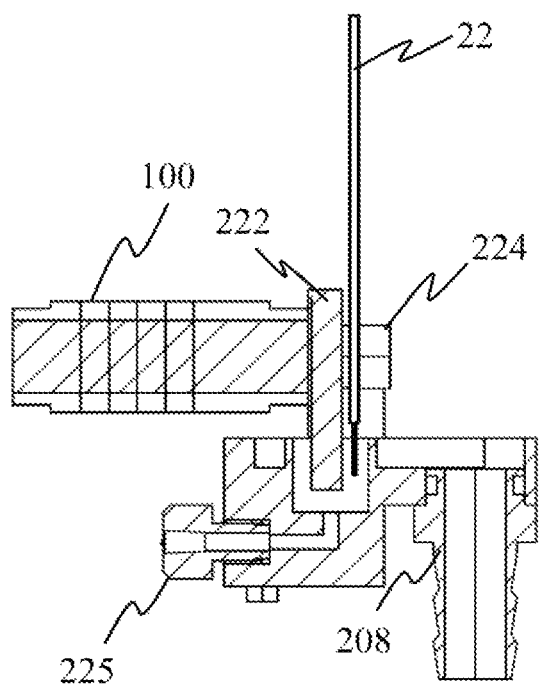
(c)

[Fig. 11]
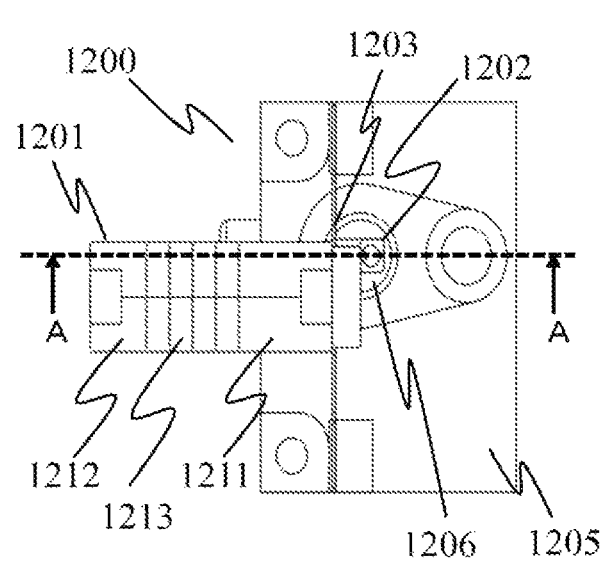
(a)
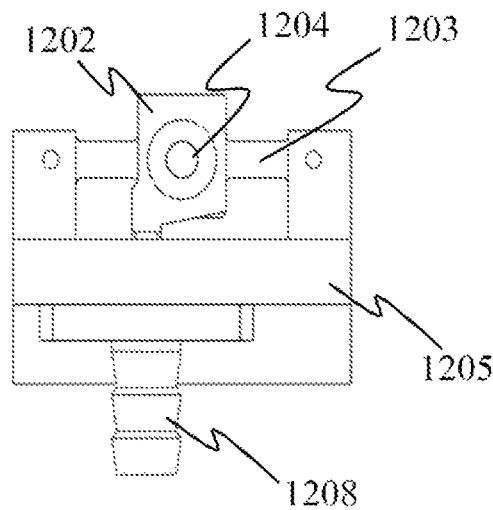
(b)
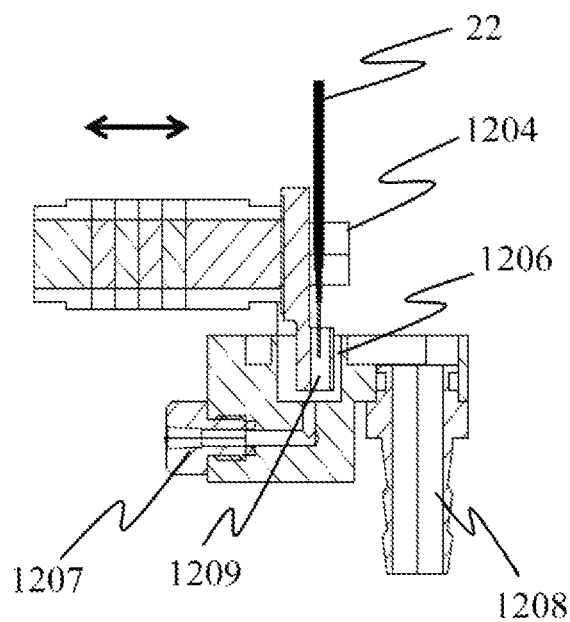
(c)
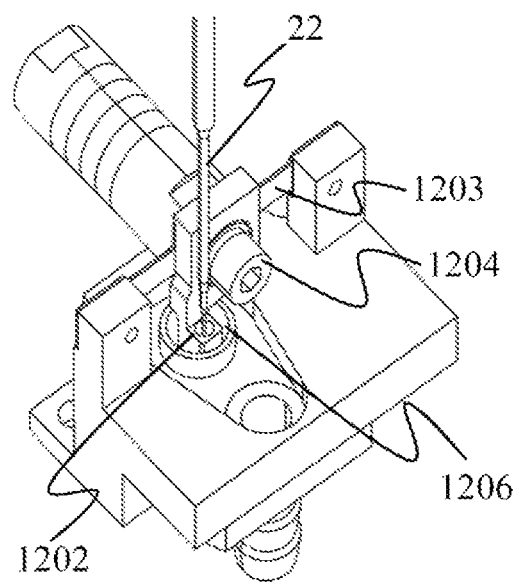
(d)

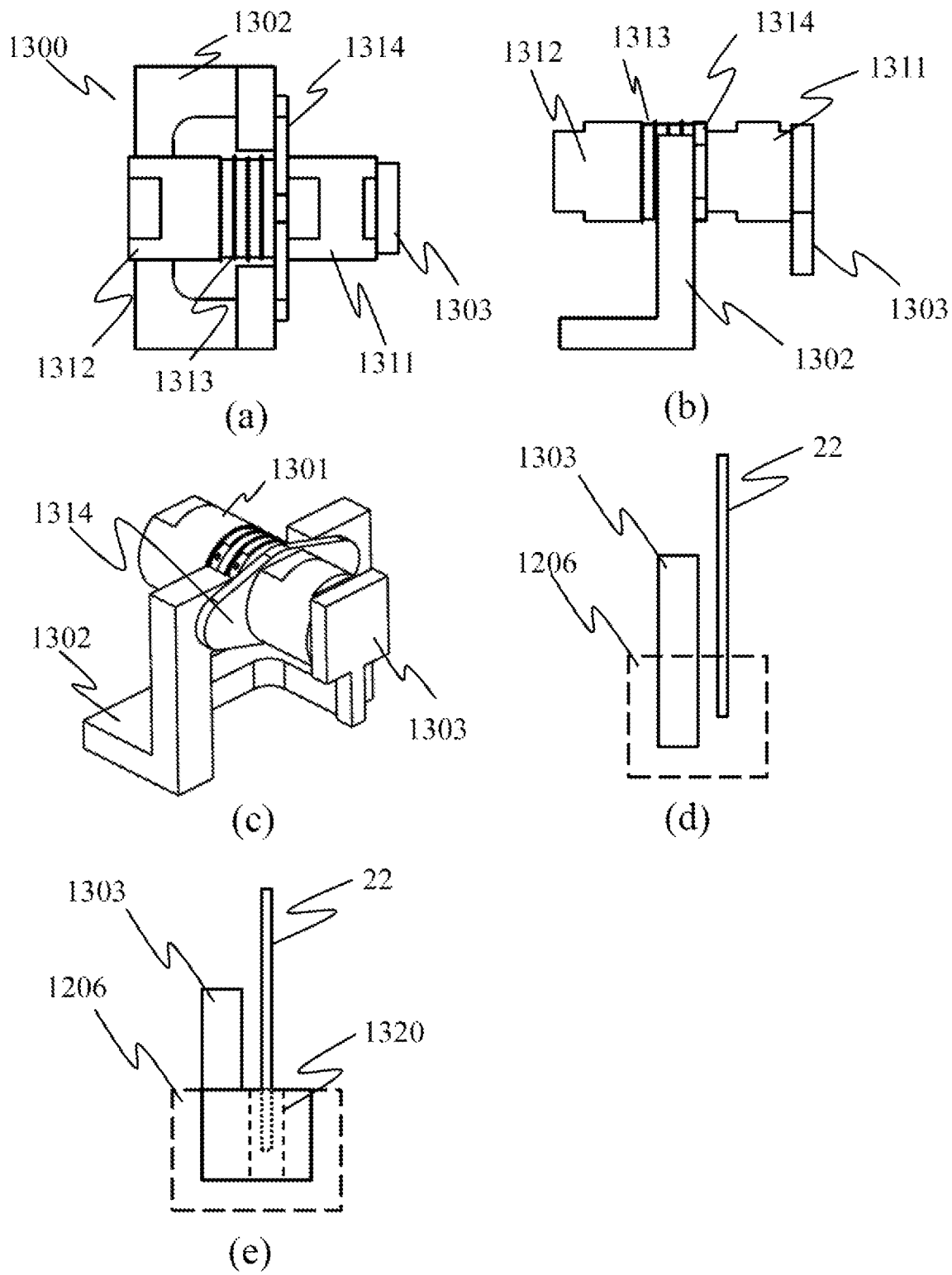
[Fig. 12]

[Fig. 13]
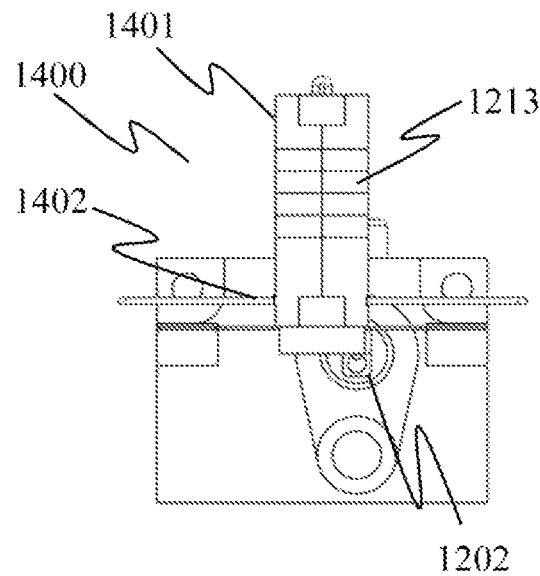
(a)
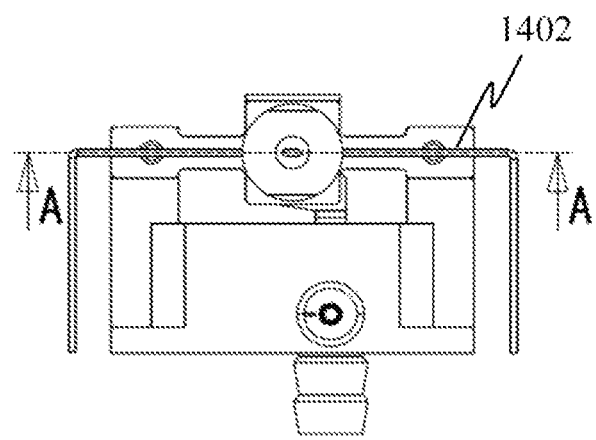
(b)
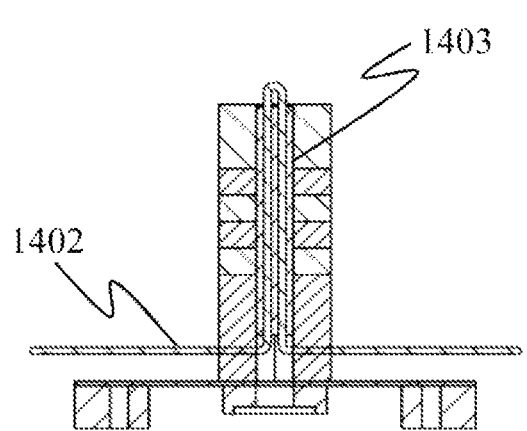
(c)
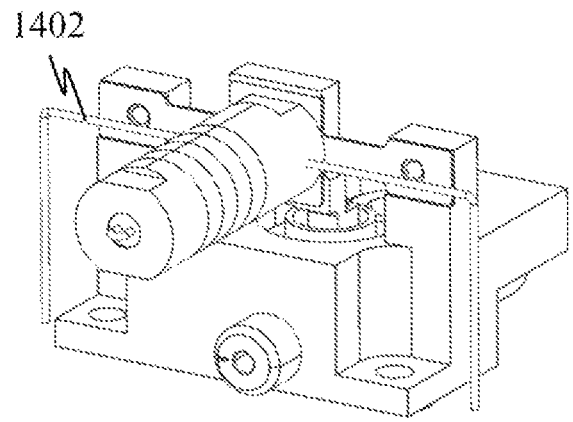
(d)

[Fig. 14]
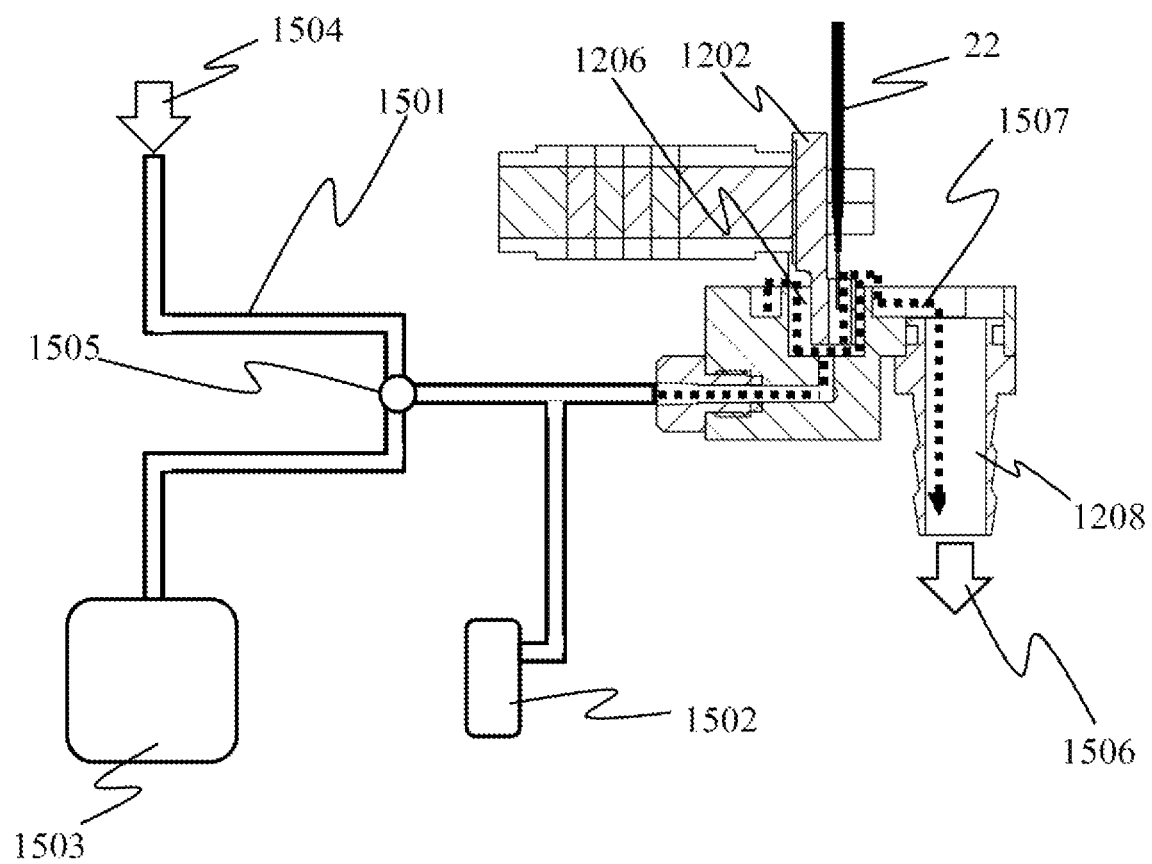

[Fig. 15]
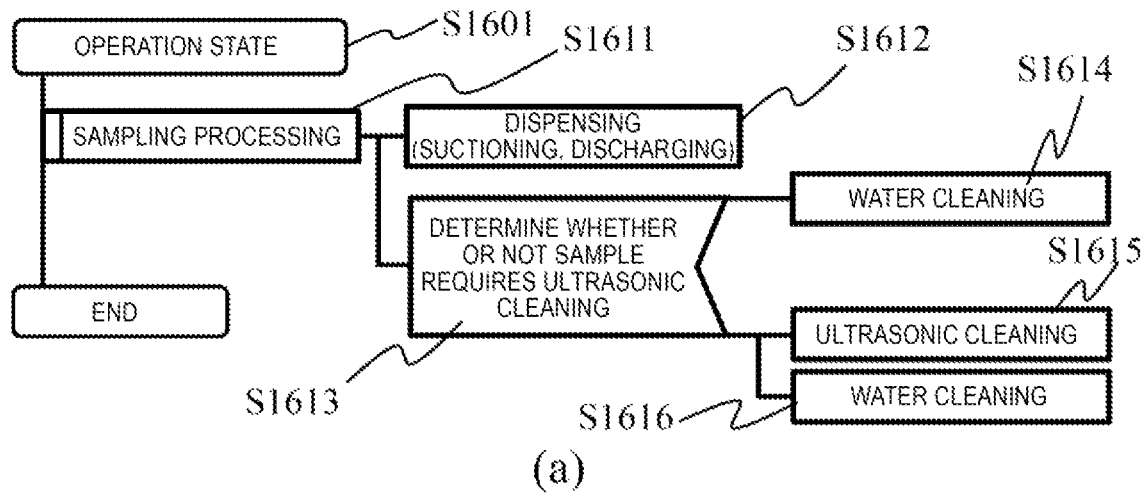
(a)
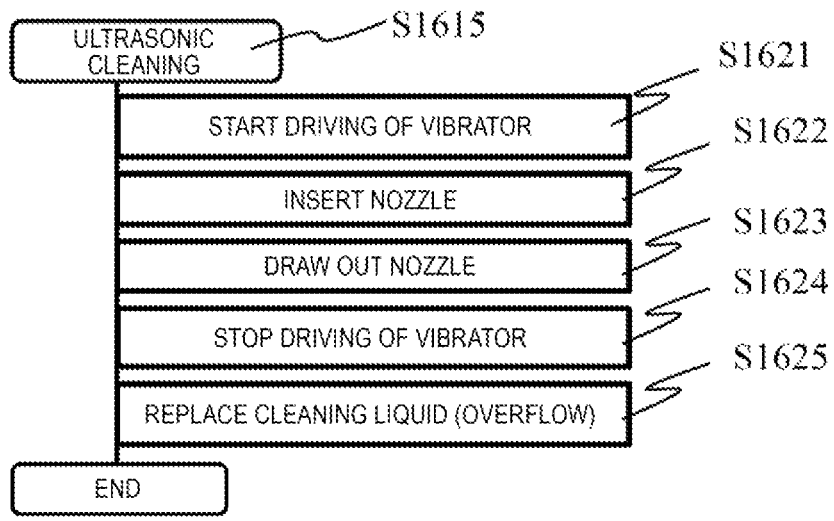
(b)
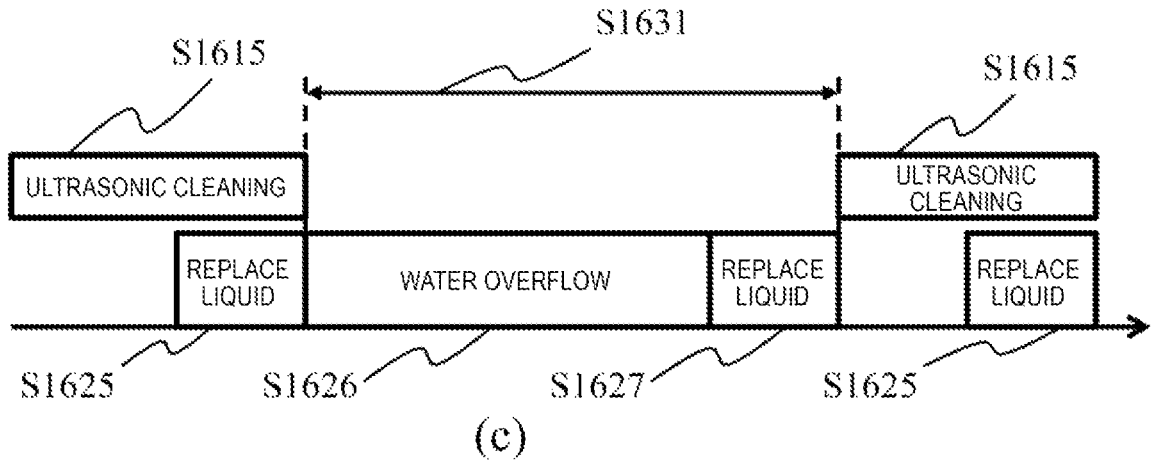
(c)

[Fig. 16]
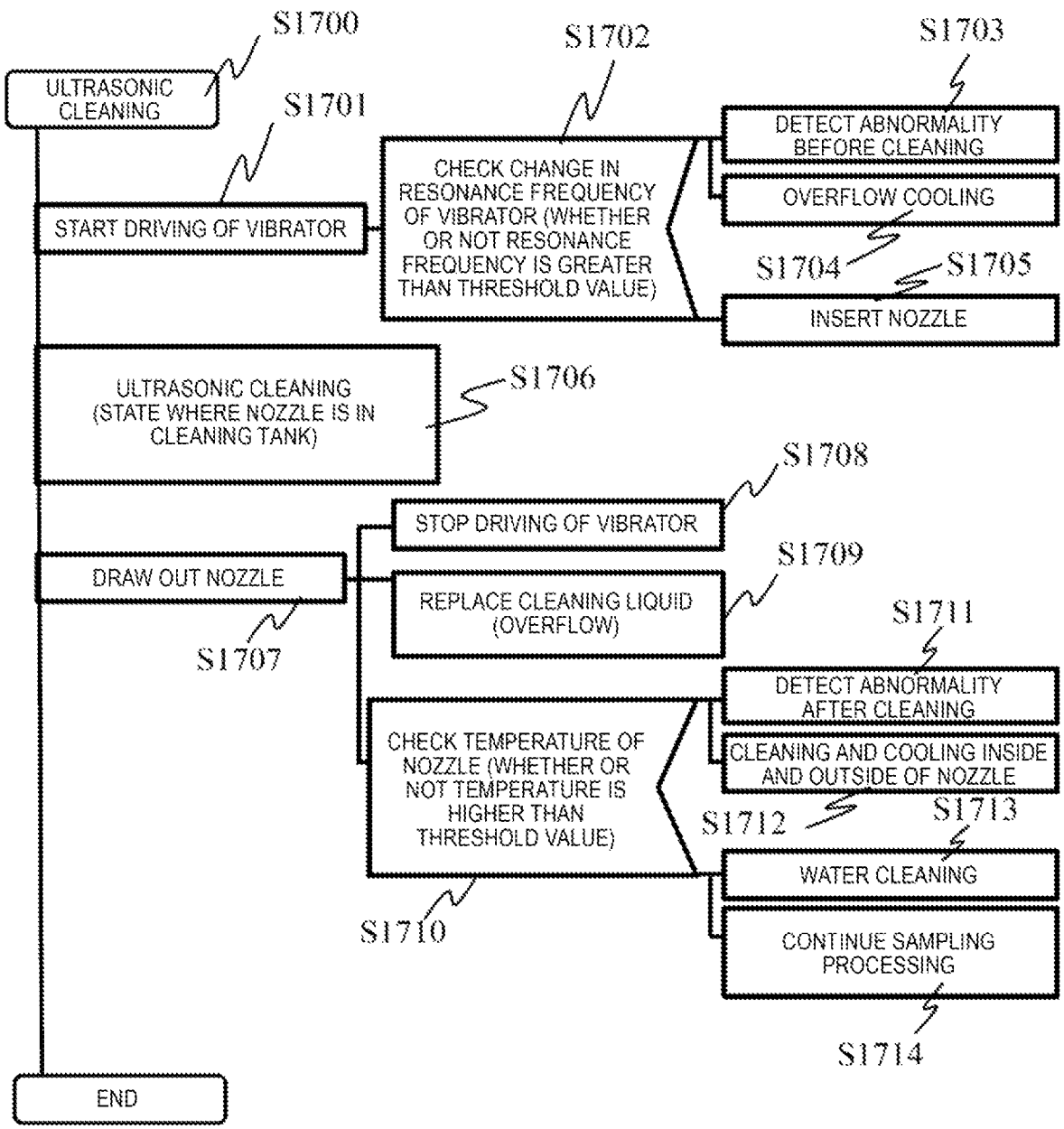

[Fig. 17]
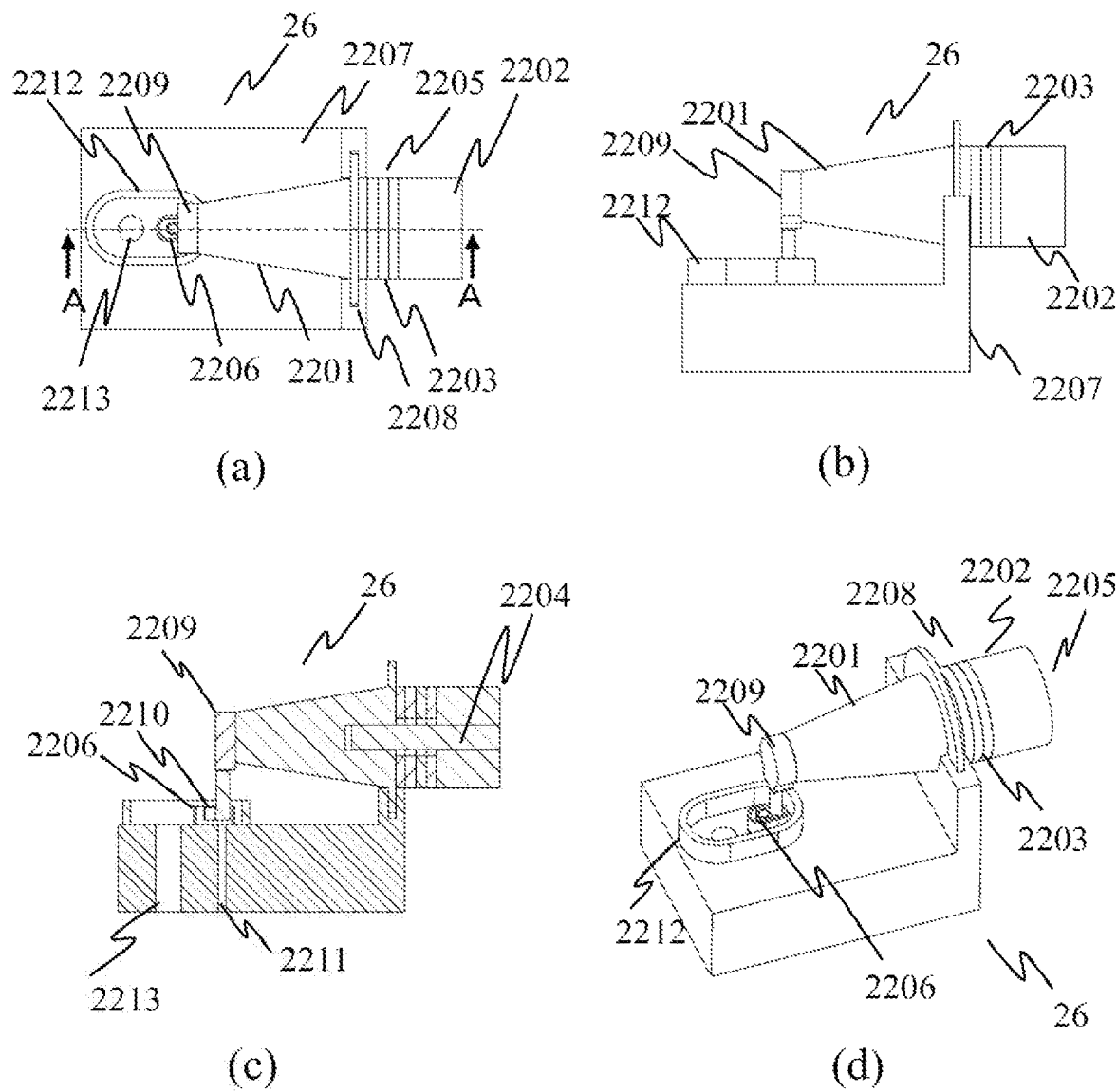

[Fig. 18]
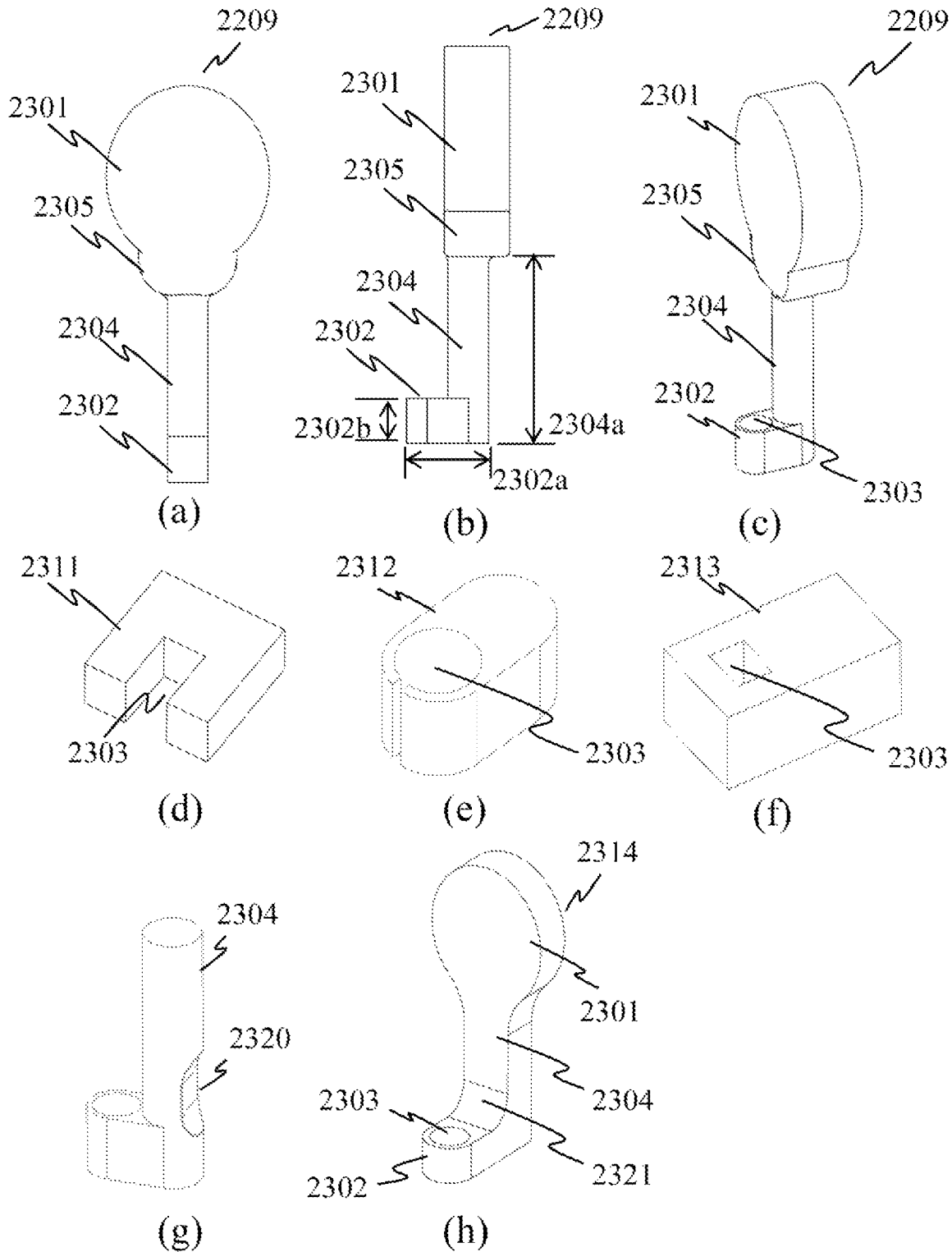

[Fig. 19]
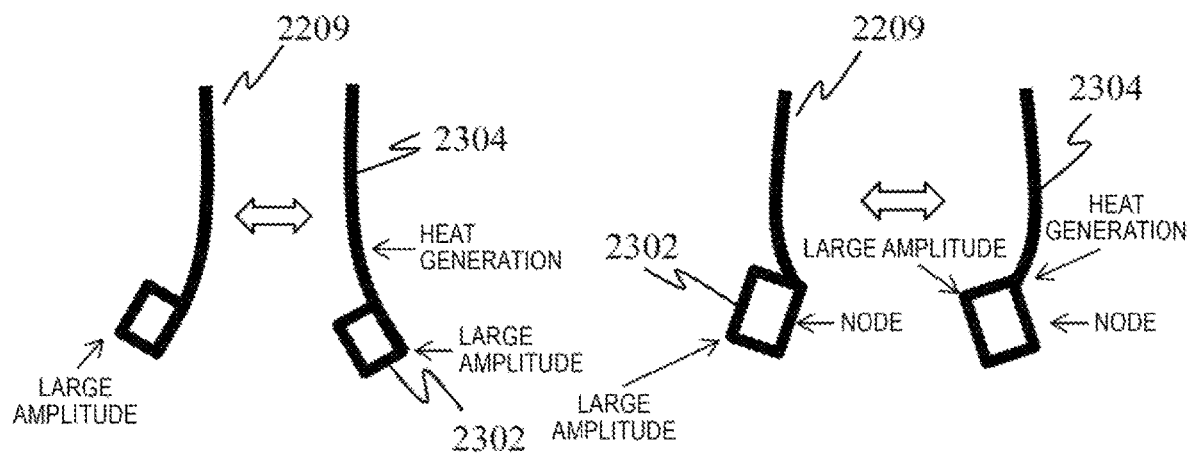
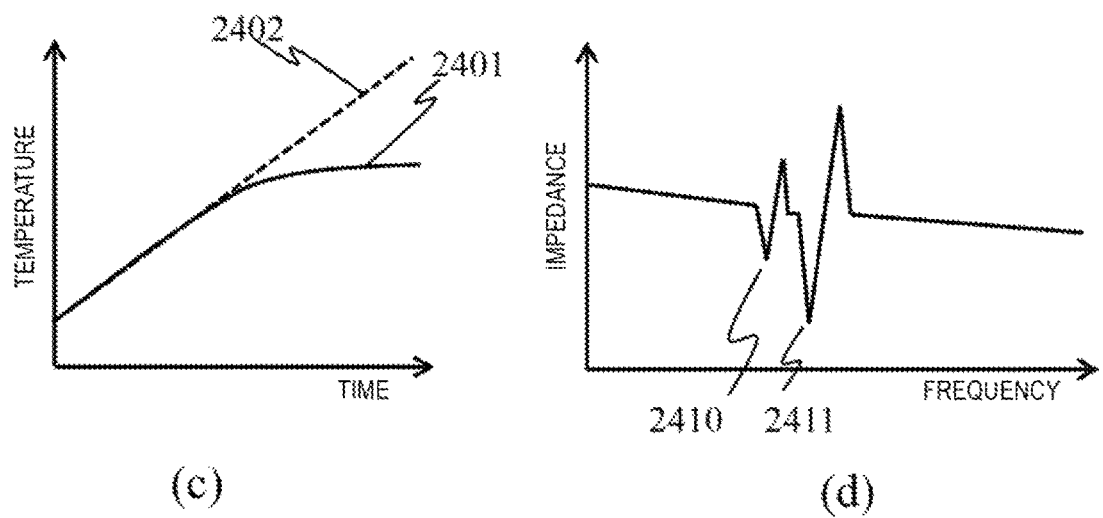

[Fig. 20]
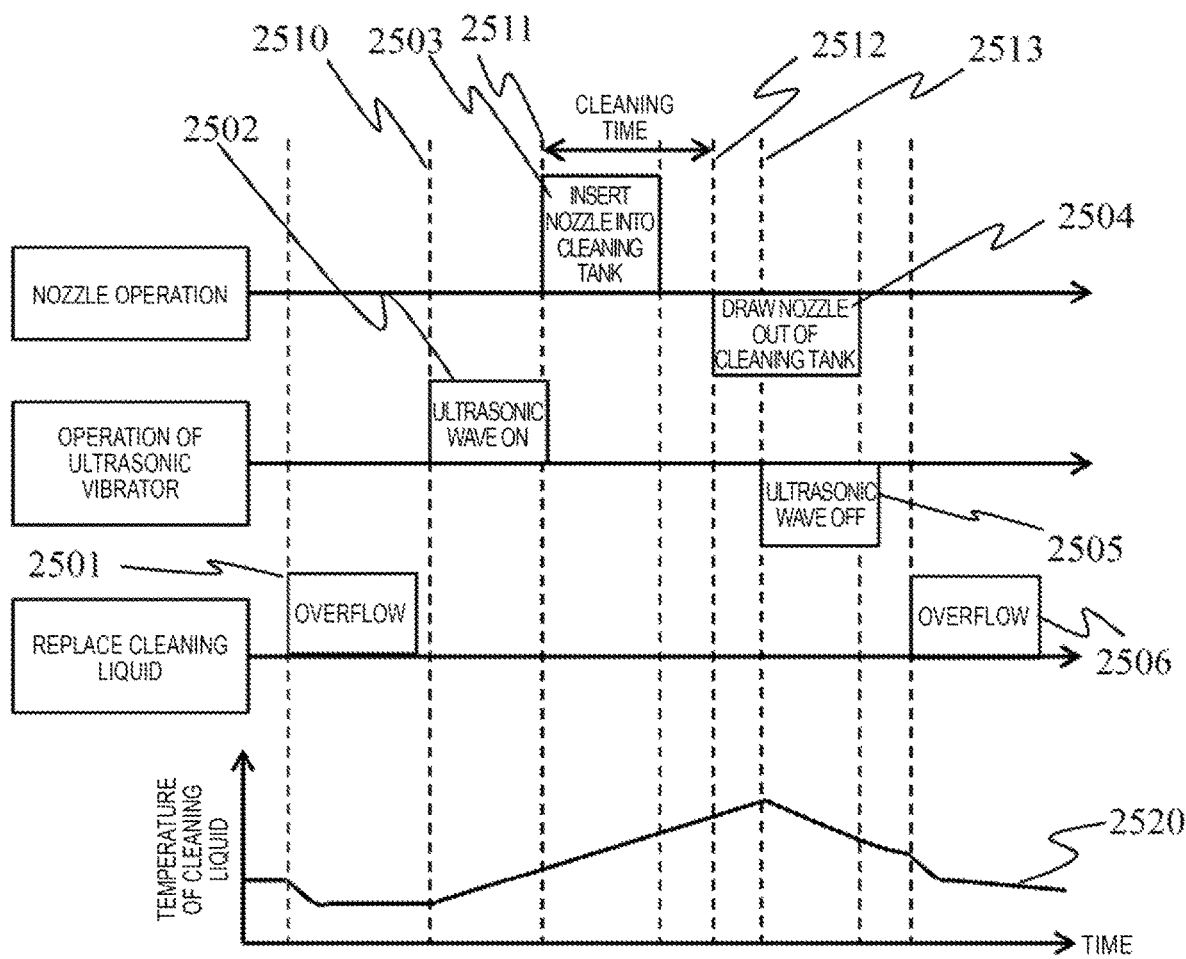

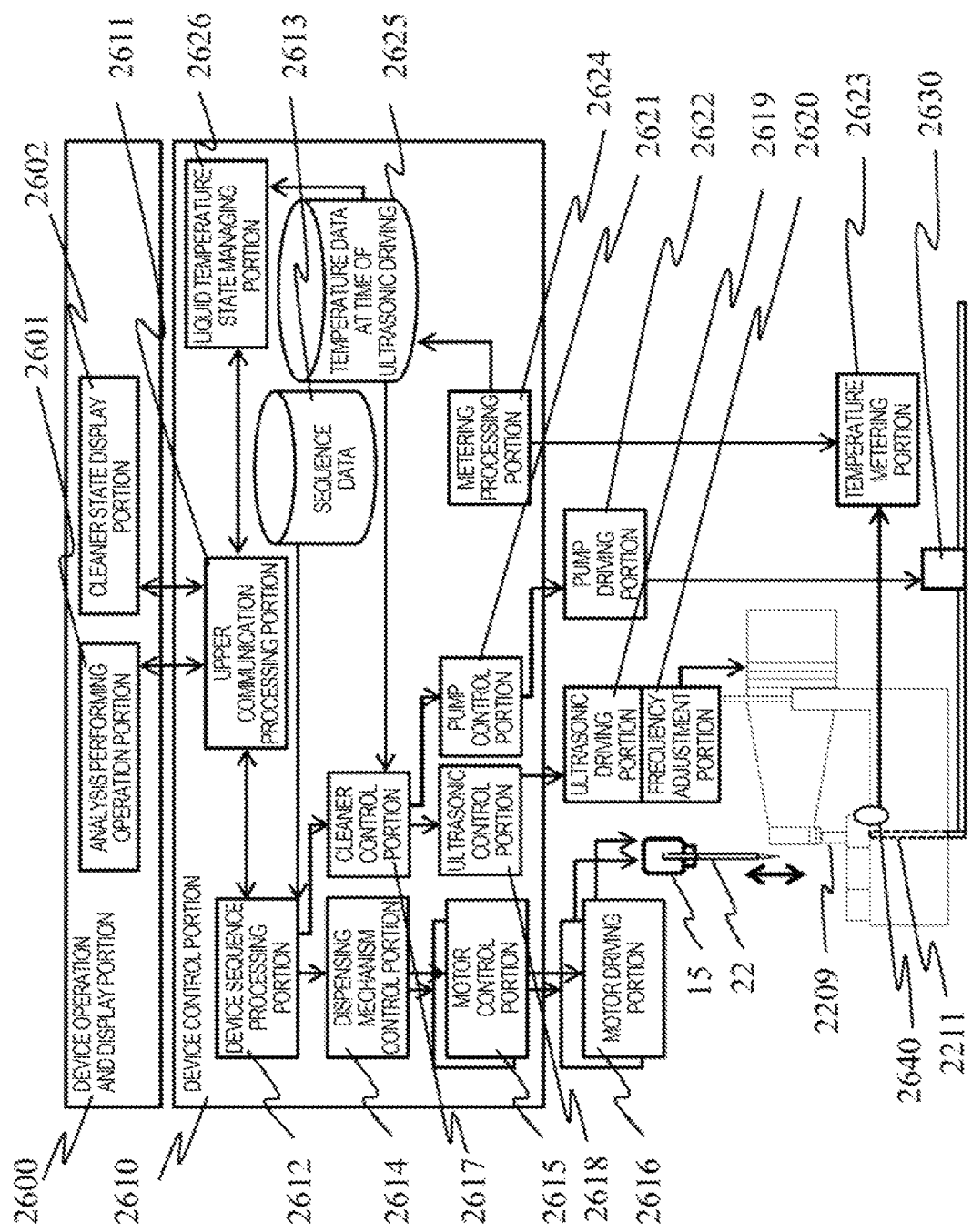
[Fig. 21]

[Fig. 22]
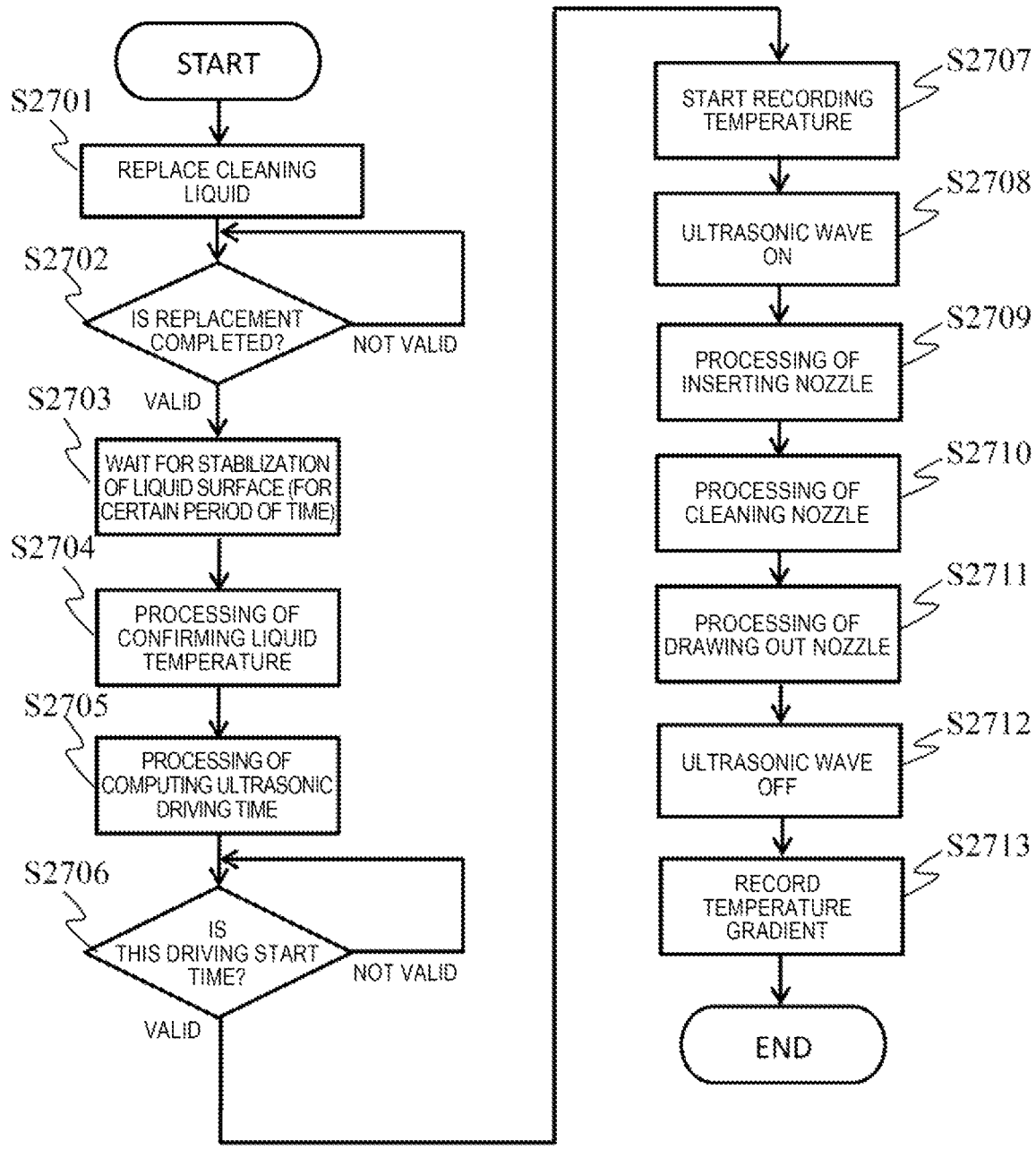

ULTRASONIC CLEANER AND AUTOMATIC ANALYZER USING THE SAME

TECHNICAL FIELD

The present invention relates to an ultrasonic cleaner for cleaning a nozzle which suctions a sample or a reagent in an automatic analyzer which performs component analysis or the like by mixing the sample, such as serum or urine, with the reagent.

BACKGROUND ART

In an automatic analyzer, in order to dispense a sample by repeatedly using the same nozzle, a nozzle tip end is cleaned before suctioning a different sample. When the nozzle tip end is not sufficiently cleaned, the previous sample component is carried over the next sample, and measurement accuracy deteriorates (carry-over). Meanwhile, in the automatic analyzer having high throughput performance, since dispensing processing is performed at high speed, sufficient time is not taken to clean the nozzle. As a more effective method of cleaning the nozzle, in PTL 1, a method of removing contaminants (residual of the previous sample) which adhere to the nozzle due to cavitation occurred in liquid, by using an ultrasonic cleaner in which a bolt-clamped Langevin type vibrator (hereinafter, referred to as a bolt-clamped Langevin type transducer (BLT)) is provided at a bottom part of a cleaning tank, is disclosed.

In addition, in PTL 2, as an ultrasonic cleaner for a nozzle, a configuration in which an ultrasonic wave is converged in a nozzle by disposing a plurality of piezoelectric elements (vibrator array) in a cylindrical cleaning tank, is disclosed.

CITATION LIST

Patent Literature

PTL 1: JP-A-4-169850
PTL 2: JP-A-2010-133727

SUMMARY OF INVENTION

Technical Problem

In performing the cleaning using the ultrasonic wave, the obtained cleaning actions vary according to a frequency band (low frequency, intermediate frequency, high frequency) which is generally used in driving an ultrasonic vibrator, and the low frequency (20 to 100 kHz) is used with respect to the contaminants which are unlikely to be removed. At the low frequency, cavitation (a phenomenon in which bubbles are generated or extinguished due to a pressure difference generated in the liquid) which occurs in the liquid is used. An occurrence condition of the cavitation includes a threshold value of the ultrasonic intensity which varies according to the driving frequency, stronger cavitation is obtained as the ultrasonic intensity increases, and a cleaning effect increases. In addition, regarding the threshold value of the ultrasonic intensity for the occurrence of the cavitation, since it is necessary to generate a strong ultrasonic wave as a driving frequency increases, the cavitation is hardly generated in the method which uses the high frequency. Furthermore, the cavitation does not occur equivalently in the liquid, and the strength of the cavitation also changes according to the degree of the ultrasonic intensity. A region in which the ultrasonic intensity increases can be a region in which the generated interval varies according to the driving frequency, and the cavitation becomes stronger for each distance obtained by dividing the sound velocity (approximately 1500 m/s in water) of the liquid by the driving frequency of the ultrasonic vibrator. For example, when the driving is performed at 50 kHz, a region in which a standing wave in which one wavelength is 30 mm is generated, and the cavitation strength is strong at an interval of 15 mm which is a half-wavelength of the wavelength of the standing wave, is generated.

For example, in the ultrasonic cleaner in which the BLT is provided at a lower part of the cleaning tank as described in PTL 1, the driving is performed at 20 to 100 kHz in order to obtain the effect of cavitation, but the region in which the cavitation becomes strong is generated at an interval of 7.5 mm (driving at 100 kHz) to 37.5 mm (driving at 20 kHz). The cavitation strength increases when being close to the BLT which is a driving source. In addition, a range of the region in which the cavitation strength increases is narrow. Due to this, a cleaning range of the nozzle is restricted and cleaning unevenness is likely to occur.

In addition, in PTL 2, a cleaning mechanism in which a plurality of ultrasonic arrays that generate the ultrasonic wave are disposed to be aligned in the circumferential direction and in the shaft direction of a dispensing nozzle on the inside of the cleaning tank, is disclosed. According to the configuration, the problem regarding the cleaning unevenness can be comparatively solved. However, it is difficult to obtain a high cleaning effect in the ultrasonic array.

The strength of the cavitation mainly depends on amplitude of a vibrating member. In other words, as the amplitude of the vibrating member increases, the strength of the cavitation increases. The ultrasonic array described above is considered, for example, an array which uses the piezoelectric element, but as described above, in a case where the piezoelectric element becomes the vibrating member, it is not possible to expect a substantially large amplitude since the deformation itself of the piezoelectric element is used.

In addition, as described above, the cavitation can effectively occur at the low frequency (20 to 100 kHz), but a resonance frequency of a single piezoelectric element is several MHz, and in a case where the driving is performed at the low frequency (20 to 100 kHz), a deformation amount cannot be effectively obtained. Meanwhile, when large voltage is excessively applied to the piezoelectric element in order to increase the deformation amount, the element itself becomes broken. Therefore, in order to obtain a high cleaning effect, it is not appropriate to allow the piezoelectric element itself to be a vibrating member.

As described above, in the ultrasonic cleaner for cleaning the nozzle, it is difficult to obtain a high cleaning effect while suppressing the cleaning unevenness.

Here, an object of the present invention is to provide an automatic analyzer or the like provided with the ultrasonic cleaner for the nozzle that can obtain a high cleaning effect while suppressing the cleaning unevenness.

Solution to Problem

The following is a representative invention.

According to the representative invention, there is provided an automatic analyzer including: a nozzle which suctions a sample or a reagent; a cleaning tank which cleans the nozzle; an ultrasonic cleaner which generates an ultrasonic wave; and a control portion which performs driving control of the ultrasonic cleaner, in which the ultrasonic cleaner includes a vibrating part which is inserted into cleaning liquid in the cleaning tank, and transmits ultrasonic vibration to the cleaning liquid, and an ultrasonic vibrator which is configured by fixing and fastening a piezoelectric element with two or more metal blocks by a bolt, and generates the ultrasonic vibration to the vibrating part, and in which the control portion causes the vibrating part to generate the ultrasonic vibration to clean the nozzle.

In addition, according to another representative invention, there is provided an ultrasonic cleaner including: a vibrating part which is inserted into cleaning liquid in a cleaning tank, and transmits ultrasonic vibration to the cleaning liquid; an ultrasonic vibrator which is configured by fixing and fastening a piezoelectric element with two or more metal blocks by a bolt, and generates the ultrasonic vibration to the vibrating part; and a control portion which performs driving control of the ultrasonic vibrator, in which the control portion causes the vibrating part to generate the ultrasonic vibration to clean a nozzle which suctions a sample or a reagent.

In addition, according to still another representative invention, there is provided an ultrasonic cleaner including: a cleaning tank which has an insertion port of a nozzle at an upper part thereof, and is capable of storing liquid on the inside thereof; a vibrating part which is provided on a side surface side in the cleaning tank; and an ultrasonic vibrator which is connected to the vibrating part, in which the ultrasonic vibrator vibrates the vibrating part in the horizontal direction, and in which the nozzle is cleaned based on the vibration of the vibrating part.

In the ultrasonic cleaner of the present invention, it is possible to generate strong cavitation with respect to the liquid in the cleaning tank according to the ultrasonic vibration enlarged by the vibrating part, and to give the ultrasonic vibration from the side with respect to the nozzle inserted from the opening part of the upper part of the cleaning tank by further providing the vibrating part on a side surface side.

Here, the vibrating part provided on the side surface side in the cleaning tank is not provided on the side surface itself of the cleaning tank, but is provided on the side surface side using the dispensing nozzle inserted into the insertion port as a reference. In other words, both a case where the vibrating part is provided on the side surface itself of the cleaning tank and a case where the vibrating part is inserted into the cleaning tank, are included. In addition, the side surface is a term which is used for distinguishing the bottom surface, and the side surface mentioned in the specification is a term which means the side surface among the side surface and the bottom surface, and does not include the bottom surface. In addition, the side surface side is also a term which is used for distinguishing the bottom surface side.

Advantageous Effects of Invention

According to the present invention, is possible to provide an automatic analyzer or the like provided with an ultrasonic cleaner for a nozzle which can obtain a high cleaning effect without cleaning unevenness.

BRIEF DESCRIPTION OF DRAWINGS

FIG. 1 is an upper view of an automatic analyzer provided with an ultrasonic cleaner of Example 1.
FIG. 2 is an appearance view of an example of the ultrasonic cleaner of Example 1.
FIG. 3 is an appearance view of an example of the ultrasonic cleaner of Example 1.
FIG. 4 is an example of ultrasonic vibration means of Example 1.
FIG. 5 is a view illustrating a standing wave generated when applying an ultrasonic wave in the liquid.
FIG. 6 is a view illustrating a relationship of cleaning liquid and a nozzle position in the ultrasonic cleaner of Example 1.
FIG. 7 is a view illustrating an example of a pipe configuration in the ultrasonic cleaner of Example 1.
FIG. 8 is an example of a processing flow of nozzle cleaning in which the ultrasonic cleaner of Example 1 is used.
FIG. 9 is an appearance view of an example of the ultrasonic cleaner of Example 1.
FIG. 10 is an appearance view of an example of an ultrasonic cleaner of Example 2,
FIG. 11 is an appearance view of an example of an ultrasonic cleaner of Example 3.
FIG. 12 is an appearance view of an example of an ultrasonic cleaner of Example 4.
FIG. 13 is an appearance view of an example of the ultrasonic cleaner of Example 4.
FIG. 14 is an example of a liquid overflow structure and pipe connection in the ultrasonic cleaner of Example 4.
FIG. 15 is an example of a cleaning flow and a time chart in which the ultrasonic cleaner of Example 4 is used.
FIG. 16 is an example of a temperature abnormality detection flow in the ultrasonic cleaner of Example 4.
FIG. 17 is a configuration example of an ultrasonic cleaner of Example 5.
FIG. 18 is an example of a structure of a vibrating part (cleaning pad) of the ultrasonic cleaner of Example 5.
FIG. 19 is a view illustrating an example of a vibration mode of the cleaning pad and a temperature gradient of the cleaning liquid, in Example 5.
FIG. 20 is an example of the time chart of the nozzle cleaning in which the ultrasonic cleaner of Example 5 is used.
FIG. 21 is a configuration example of a dispensing mechanism of an automatic analyzer and a control block of the cleaner in Example 5.
FIG. 22 is an example of the cleaning flow in which the ultrasonic cleaner of Example 5 is used.

DESCRIPTION OF EMBODIMENTS

Hereinafter, embodiments of the present invention will be described in detail with reference to FIGS. 1 to 22.

Example 1

FIG. 1 is a view illustrating a configuration of an automatic analyzer of the present invention. An automatic analyzer 10 is configured of a reagent disk 12 on which a plurality of reagent containers 11, a reaction disk 13 which has a reaction cell in which a mixture of a reagent and a sample (hereinafter, referred to as a sample) is accommodated, a reagent dispensing mechanism 14 which suctions and ejects the reagent, and a sample dispensing mechanism 15 which suctions and ejects the sample.

The reagent dispensing mechanism 14 is provided with a reagent nozzle 21 for dispensing the reagent, and the sample dispensing mechanism 15 is provided with a sample nozzle 22 (hereinafter, referred to as a nozzle 22) for dispensing the sample. The sample put into the device is loaded on a lack 24 and is transported in a state of being in a sample container (test tube) 23. The plurality of sample containers 23 are loaded on the lack 24. In addition, the sample is a sample from blood, such as serum or whole blood, or urine.

The sample dispensing mechanism 15 moves the nozzle 22 to a suction position at which the sample is suctioned from the sample container 23, an ejection position at which the sample is ejected to a reaction cell 25, a cleaning position at which a tip end of the nozzle 22 is cleaned by an ultrasonic cleaner 26 of the present invention, and a cleaning position at which a cleaning tank 27 which washes the tip end of the nozzle 22 with water is provided. Furthermore, the sample dispensing mechanism 15 lowers the nozzle 22 in accordance with each height of the sample container 23, the reaction cell 25, the ultrasonic cleaner 26, and the cleaning tank 27 at the suction position, the ejection position, and the cleaning position. In order to perform such an operation, the sample dispensing mechanism 15 is configured to rotate the nozzle 22 at each stop position, and to be vertically movable.

The automatic analyzer has a measuring portion 29, and analyzes a concentration of a predetermined component in the sample by performing photometry with respect to the mixture of the sample and the reagent accommodated in the reaction cell 25. The measuring portion 29 has, for example, a light source and a photometer, and the photometer is, for example, a light-absorption photometer or a light-scattering photometer.

In addition, movement of the nozzle 22 or absorption ejection control of the sample, control of liquid supply to the cleaning tank 27, driving control of the ultrasonic cleaner 26, and control of other various types of mechanisms, are performed by a control portion 28. In addition, as the automatic analyzer, a device which is provided with an operating portion (PC or control board) for operating the device, and a unit which inputs or collects the lack 24 by an examiner is employed, but in FIG. 1, the device is omitted.

Next, an analyzing operation of the automatic analyzer will be described. The lack 24 in which the sample container 23 is accommodated moves to the suction position of the sample. At this position, the sample is suctioned by the nozzle 22 from the sample container 23. The suctioned sample is ejected to the reaction cell 25. The reagent disk 12 moves the desired reagent container 11 to a position at which the reagent nozzle 21 can access the reagent container 11 being rotated. At this position, the reagent is suctioned by the reagent nozzle 21 from the reagent container 11. The suctioned reagent is ejected to the reaction cell 25. The mixture of the sample and the reagent which are accommodated in the same reaction cell 25 are agitated, and the reaction disk 13 proceeds the reaction of the sample and the reagent while repeating the rotation and stop.

The reaction disk is driven while repeating the rotation and stop, and the reaction cell 25 which is a target to be measured periodically passes through the front of the measuring portion 29. When passing, the light irradiated from the light source is transmitted through the mixture in the reaction cell 25 and scattered to the mixture, and absorbance and scattering intensity are measured by the photometer. From the information of the light obtained by the photometer, the concentration of a predetermined component, which corresponds to the type of the reagent in the sample, is calculated.

Next, the ultrasonic cleaner 26 will be described. After dispensing and cleaning one sample, the nozzle 22 uses the sample repeatedly in dispensing. In a case of performing examination of many items with respect to one sample, the same sample is dispensed to the plurality of reaction cells 25. Since the dispensing is performed from the same sample, in this case, even after the sample is dispensed, basically, it is not necessary to perform strong cleaning. Therefore, while dispensing the same sample, basically, it is not necessary to perform the cleaning by the ultrasonic cleaner 26. Meanwhile, in a case where strong cleaning is required, for example, at a timing when the sample to be dispensed is switched, the cleaning in which the ultrasonic cleaner 26 is used is performed.

Next, the ultrasonic cleaner will be described. The ultrasonic cleaner including a cleaning tank which has an insertion port of the dispensing nozzle at an upper part thereof, and is capable of storing the liquid on the inside thereof, a vibrating part which is provided on the side surface side in the cleaning tank, and an ultrasonic vibrator which is connected to the vibrating part, and in which the ultrasonic vibrator vibrates the vibrating part in the horizontal direction, will be described hereinafter.

FIG. 2 is an appearance view of an example of the ultrasonic cleaner according to the present invention. FIG. 2(a) is a perspective view of the ultrasonic cleaner, FIG. 2(b) is an upper view of the ultrasonic cleaner, FIG. 2(c) is a sectional view of the ultrasonic cleaner, and FIG. 2(d) is a perspective view (with a cover) of the ultrasonic cleaner, respectively. FIG. 2 is an example in which a diaphragm 202 is used as a vibrating part.

The ultrasonic cleaner 26 of the embodiment is configured of a BLT 201 which vibrates by applying (for example, inputting a sign wave) voltage which periodically changes, the diaphragm 202 to which the BLT 201 is attached, a cleaning port 203 which can interpose and fix the diaphragm 202, a flange 204, a sealing material 205 for preventing liquid leakage from between the cleaning port 203 and the diaphragm 202. The diaphragm 202 is fixed so that a circumferential end part is pressed by the cleaning port 203 and the flange 204, and the sealing material 205 has a shape of a doughnut, and is configured to block only the circumferential end part of the diaphragm 202. A supply port and a discharge port of cleaning liquid which will be described later are provided in the cleaning port 203, but are omitted in FIG. 2.

In addition, the cleaning port 203 has an opening part 210 (insertion port) for inserting the nozzle 22 to the upper part thereof, and has a large opening part on the side surface of a cleaning tank 211 in which the cleaning liquid is stored, and by blocking the opening part with the diaphragm 202, the cleaning liquid can be stored in the cleaning port 203. The vibration generated in a BLT 100 is transmitted to the directly linked diaphragm 202, and is transmitted to the cleaning liquid in the cleaning tank 211 which is in contact with the diaphragm 202. According to the above-described configuration, when the voltage which periodically changes and is equal to or greater than 20 kHz is applied to the BLT, the ultrasonic wave can be generated in the cleaning liquid in the cleaning tank 211.

Furthermore, in the ultrasonic cleaner 26 of the present invention, the diaphragm 202 which generates the ultrasonic vibration is on the side surface of the cleaning tank 211, and can generate the ultrasonic wave from the horizontal direction with respect to the nozzle 22 inserted from the opening part 210. In addition, it is preferable that the opening part 210 into which the nozzle 22 is inserted has a shape into which the nozzle 22 is inserted to a position of the diaphragm 202 as near as possible (the reason will be described later). Therefore, as illustrated in FIG. 2(a), a part of the opening part protrudes to the diaphragm 202 side, and the part of the opening part 210 and the diaphragm 202 are connected to be adjacent to each other via a part of the opening part 210. In other words, a cutout into which the nozzle 22 is inserted is provided in the opening part 210, and the thickness of a member of the cleaning port is thin compared to that of other locations. By the configuration, it is possible to perform the cleaning by making the nozzle 22 close to the diaphragm 202. In addition, for example, by a configuration in which the locations at which the cleaning port is thin as described above is completely removed, and a part of the opening part 210 is in contact with the diaphragm, it is possible to perform the cleaning by making the nozzle 22 closer to the diaphragm 202. In other words, in the opening part 210 of the cleaning port 203 which interposes the opening part 210, a state (free end) in which a part of the circumferential end part of the diaphragm a part of which is open is not pressed, is achieved.

A cover 220 for protecting the BLT 100 may be attached to the ultrasonic cleaner 26.

FIG. 3 is an appearance view of another example of the ultrasonic cleaner of the embodiment. FIG. 3(a) is a perspective view of the ultrasonic cleaner, and FIG. 3(b) is a sectional view of the ultrasonic cleaner, respectively. An ultrasonic cleaner 200 (26 in FIG. 1) is not different from the ultrasonic cleaner 26 in the method of use or the installation position, except for the shape of the cleaning port 203, the flange 204, and the diaphragm 202 the upper parts of which are cut unlike the ultrasonic cleaner 26.

The ultrasonic cleaner 200 interposes and fixes the diaphragm 202 the upper part of which is cut by the cleaning port 203 and the flange 204, but a side of the upper part is not restrained and becomes a free end. As described above, the diaphragm 202 is configured so that the deformation amount of the center part increases, but even in the diaphragm 202 of the ultrasonic cleaner 200, the deformation amount increases in the vicinity similar to the diaphragm 202. However, as one side of the diaphragm 202 becomes a free end, the deformation amount in the vicinity of the shaft (center) of the diaphragm 202 can be enlarged to be greater than the deformation amount of the diaphragm 202 the upper part of which is not cut. In order to obtain a high cleaning effect, similar to the ultrasonic cleaner 200 of FIG. 3, it is preferable to use the diaphragm 202 at least a part of which is a free end.

In addition, in the ultrasonic cleaner 200, components (pipe connection or a receiver) which supply and discharge the cleaning liquid are not illustrated, but the cleaning liquid of the cleaning tank 211 is replaced being overflowed by the pressure of a syringe pump similar to the ultrasonic cleaner 26. In addition, a lid which prevents the cleaning liquid from being scattered may be provided at the upper part of the cleaning tank 211, and a hole into which the nozzle 22 can be inserted may be provided in the lid.

FIG. 4 is an example of ultrasonic vibration means of the embodiment. FIG. 4(a) is an appearance view in which the diaphragm the upper part of which is not cut in FIG. 2 is attached to the BLT, FIG. 4(b) is a side view of the diaphragm, and FIG. 4(c) is a perspective view of the diaphragm. The ultrasonic vibration means of the ultrasonic cleaner 26 of the invention is configured of the above-described diaphragm 202 and the BLT 201. The BLT 201 interposes one or more piezo elements 311 by a metal pressing member (on the diaphragm side) 312 and a metal pressing member (on the free end side) 313. A screw is cut in the pressing member 312 and the pressing member 313. The piezo element 311 is a hollow, and by fastening the pressing member 312 and the pressing member 313 by a blot (not illustrated), the piezo element 311 is fixed. Since the BLT 201 is a known member, the detailed description of the method of use and the manufacturing method will be omitted.

The diaphragm 202 is configured of a screw portion 321 for connecting the BLT 201, a metal plate 322 for transmitting the vibration from the BLT 201, a vibrating part 323 for transmitting the vibration to the cleaning tank, and a neck 324 for amplifying displacement from the BLT 201. The connection between the diaphragm 202 and the BLT 201 is fastened by the screw portion (male) 321 of the diaphragm 202 and the screw portion (female) of the metal pressing member 312. The metal plate 322 is in contact with the metal portion 312 for transmitting the vibration from the BLT 201. As described above, in the vibrating part 323, the circumferential end part of the vibrating part 323 is fixed to be interposed by the cleaning port 203 and the flange 204, and the BLT 100 is fixed (a side opposite to the diaphragm 202 is free) to the diaphragm 202 in a cantilevered state. The diaphragm 202 is fixed at the circumferential end part, and the displacement of the free BLT 201 on one side which is at the center acts on the fixed side of the circumferential end part. Therefore, in the example illustrated in FIG. 4, from the end part of the neck 324, in the diaphragm 202, the deformation amount increases as the distance to the fixed side increases. In other words, the deformation amount increases as a part of the neck 324 becomes narrow. For example, in a case where the metal portion 312 of the BLT 201 is configured to directly come into contact with the vibrating part 323, the distance from the end part of the BLT 201 to the fixed side of the diaphragm 202 becomes short, and thus, the displacement amount cannot be obtained compared to the configuration illustrated in FIG. 4.

Since the BLT 201 vibrates by applying the voltage which periodically changes to an electrode (not illustrated) at the front and rear part of the piezo element 311, a dedicated power source amplifier (not illustrated) is necessary. In the automatic analyzer, it is possible to drive the ultrasonic cleaner 26 by a command from a CPU board (not illustrated) which controls the device to the power source amplifier.

FIG. 5 is a view illustrating a standing wave generated when the ultrasonic wave is applied to the liquid. FIG. 5(a) illustrates the standing wave when the frequency of the ultrasonic vibration is low, and FIG. 5(b) illustrates the standing wave when the frequency is high, respectively. When the ultrasonic vibration is generated by an ultrasonic vibrating part 400, a standing wave 401 of the ultrasonic wave is generated in the liquid. The wavelength of the standing wave varies according to the frequency of the ultrasonic vibration, and the wavelength becomes long as the frequency becomes low. Therefore, in a half-wavelength 402 of the standing wave, 402a is longer than 402b. As described above, the cavitation which has a cleaning effect occurs at a part having high ultrasonic intensity, and the ultrasonic intensity increases in a region 403a in the vicinity of a surface of the ultrasonic vibrating part 400, and in a region 404a which is the half-wavelength 402 away from the ultrasonic vibrating part 400. The distance of a region 403 and a region 404 can be shortened by changing the frequency, but the distance cannot be set to be 0 at the frequency (approximately equal to or less than 100 kHz) at which the cavitation is likely to occur. In a case where the nozzle 22 is inserted toward the ultrasonic vibrating part 400 from the upper part of FIG. 5 and the cleaning is performed, cleaning unevenness occurs in the region (403 or 404) in which the cavitation occurs and in the region in which the cavitation does not occur. In addition, the ultrasonic intensity in the region 403 close to the ultrasonic vibrating part 400, is strong and appropriate for the cleaning.

In the embodiment, as described above, by disposing the vibrating part 323 of the diaphragm 202 which is the ultrasonic vibrating part 400 on the side surface in the cleaning tank, the tip end of the nozzle 22 can be inserted into the region having high ultrasonic intensity. Therefore, it is possible to effectively clean a wide area of the side surface of the tip end of the nozzle 22.

FIG. 6 is a view illustrating a relationship between the cleaning liquid and the nozzle position in the ultrasonic cleaner of the embodiment. FIG. 6(a) is a schematic view of a cleaning range, and FIG. 6(b) is a view illustrating a positional relationship between the nozzle 22, and the cleaning liquid and the center of diaphragm on the section of the cleaner, respectively. Since the cleaning range is limited when the nozzle 22 dispenses the sample, the liquid surface of the sample is detected so that the sample is inserted only to the limited position of the tip end of the nozzle 22, and the position at which the nozzle 22 is lowered is controlled. Since the method of detecting the liquid surface of the sample and a lowering controlling method in the nozzle 22 are known methods, the detailed description thereof will be omitted. Since the nozzle 22 is inserted into the sample to the limited depth as described above, a range 501 to which the sample adheres after suctioning the sample is limited to a certain range. Therefore, if a range 502 in which the cleaning is performed by the ultrasonic cleaner 26 is a range wider than the sample-attached range 501, an unwashed part is unlikely to be generated. In a case where the cleaning liquid is used by the ultrasonic cleaner 26, further, it is necessary to perform the washing with water and not to make the water brought into the sample, and it is necessary that a range 503 in which the cleaning is performed by the water is wider than a range in which the cleaning is performed by the ultrasonic cleaner 26. However, when the range 503 of the water cleaning is wide, the time which is taken for the water cleaning increases. Therefore, it is desirable that the range 503 of the water cleaning and the cleaning range 502 are set to be narrow as much as possible.

In the ultrasonic cleaner 26, the cleaning liquid is stored in the cleaning tank 211. The cleaning liquid may be the water, but it is preferable to use the cleaning liquid which can remove the contaminants by a chemical action. The cleaning liquid has the liquid surface on a pool 512 of the cleaning tank from a bottom 511 of the cleaning tank, and the height from the bottom 511 of the cleaning tank to the pool 512 of the cleaning tank becomes a liquid level 513. When the nozzle 22 is inserted into the cleaning tank 211, the range from a nozzle tip end position 514 to a cleaning tank pool 512 which is the liquid surface is the nozzle cleaning range 502 of the ultrasonic cleaner 26.

The diaphragm 202 of the ultrasonic cleaner 26 of the embodiment has a configuration in which the deformation amount is enlarged at the center part of the diaphragm as described above, and the ultrasonic intensity in the cleaning liquid also increases in the vicinity of the center of the diaphragm. In order to effectively clean the nozzle 22, it is preferable that the nozzle passes through a center line 515 of the diaphragm, and to stop the nozzle so that the center line 515 is included in the nozzle cleaning range 502. In other words, it is preferable that the cleaning range 502 is narrow in the ultrasonic cleaner 26 in which the cleaning liquid is used is narrow, and the nozzle tip end is inserted to be equal to or lower than the center line 515 of the diaphragm having a high cleaning effect. In other words, it is desirable that the nozzle tip end position 514 is below the center line 515.

Therefore, regarding the liquid level 513 of the cleaning liquid, it is preferable that the liquid level of the cleaning liquid satisfies the following expression when a length 516 from the fixing end of the diaphragm 202 to the fixing end is defined as D, the cleaning range 502 of the nozzle is defined as h, and the liquid level 513 is defined as H. In other words, it is desirable to perform the cleaning by stopping the nozzle to satisfy the expression 1. In other words, it is desirable that the liquid level of the liquid in the cleaning tank is lower than the position at which the length of the cleaning range of the dispensing nozzle is added to the height of the center line of the diaphragm, and the tip end of the dispensing nozzle when inserting the dispensing nozzle into the cleaning tank is inserted to be equal to or lower than the center line of the diaphragm and the cleaning is performed.

(Expression 1)

$$D/2 \leq H \leq D/2 + h \quad \text{(Expression 1)}$$

FIG. 7 is an example of a pipe configuration in the ultrasonic cleaner of the embodiment. In order to supply the cleaning liquid or the water to the ultrasonic cleaner 26, a pipe 601 is connected to a lower part of the cleaning tank 211. A syringe pump 602 for extruding the liquid by pressure, a cleaning liquid tank 603 in which the cleaning liquid is stored, a pipe 604 which is connected to water works facilities and supplies the water, and a switching valve 605 for switching the connection of the pipe, are connected to the pipe 601. Furthermore, a receiver (overflow receiver 606) for receiving the cleaning liquid overflowed to the pool 512 of the cleaning port 203, and a pipe (not illustrated) which is connected to a sewage system, are provided. In other words, a receiver for making the liquid in the cleaning tank overflowed is provided at the upper part of the cleaning tank.

In the cleaning tank 211, the water or the cleaning liquid is always stored, new liquid is supplied by the pressure of the syringe pump 602, the overflowed liquid is discharged to the receiver 606, and then, the discharged liquid flows to sewage. The syringe pump 602 and the switching valve 605 can be operated by a command from the CPU board (not illustrated) which controls the device, can supply the cleaning liquid when performing the ultrasonic cleaning of the nozzle 22, can supply the water when the cleaning is not performed for a long period of time and store the water. Regarding the cleaning liquid in the cleaning tank 211, it is preferable that the entire cleaning liquid after the cleaning is replaced for reducing the carry-over. In the configuration of the embodiment, by operating the syringe pump 602, it is possible to supply new cleaning liquid to the cleaning tank 211, to discharge the cleaning liquid used in the cleaning to sewage by the overflow, and to replace the cleaning liquid in the cleaning tank 211. In addition, it is desirable to supply the liquid for performing the cleaning to the cleaning tank only when the ultrasonic cleaning is used, and to supply and store the water in the cleaning tank when the ultrasonic cleaning is not used. This is because it is possible to suppress useless consumption of the liquid (cleaning liquid) for performing the cleaning.

FIG. 8 is an example of a processing flow of the nozzle cleaning in which the ultrasonic cleaner of the present invention is used. At the time of S701 when the device is in an operation state, the sample dispensing mechanism 15 repeats S711 of sampling processing. In S711 of the sampling processing, S712 of dispensing (suctioning of the sample and ejecting of the sample) is performed, and after this, the cleaning processing is performed, but, S713 of determining whether or not a sample to be dispensed next is the same sample, is performed. As a result, if the sample to be handled next is the same sample, only S714 of the water cleaning is performed by the cleaning tank 27, and in a case where a different sample is handled, the sample which adheres to the nozzle is cleaned by S715 of the ultrasonic cleaning (for normal processing) by the ultrasonic cleaner 26, and after this, the washing is performed by the cleaning liquid by S716 of the water cleaning by the cleaning tank 27. In this manner, in the middle of the operation, it is desirable that it is determined whether or not the sample to be handled next is the same sample, only the water cleaning is performed when the sample to be handled next is the same sample, and the cleaning in which the ultrasonic cleaner is used and the water cleaning are performed when the sample to be handled next is a different sample.

In the description above, according to the result of S713 of the sample determination processing, a case of only S714 of water cleaning processing and a case of S715 of the ultrasonic cleaning and S716 of the water cleaning are divided, but S715 of the ultrasonic cleaning processing may be used every time when the sampling is performed. However, in this case, an amount of the cleaning liquid used increases and the cleaning cost increases.

When the device is in S702 of a maintenance state, it is possible to perform S721 of maintenance processing of cleaning a small amount of contaminants accumulated in the nozzle 22. In S701 of the operation state, in order to prevent a throughput of the sampling processing from being dropped, it is necessary that the cleaning is performed during a short period of time, but in S702 of the maintenance state, the nozzle 22 can be cleaned taking time. In S722 of the ultrasonic cleaning (for maintenance) in S721 of the maintenance processing, it is possible to perform the cleaning (that is, deep insertion into the cleaning tank 211) by widening the nozzle cleaning range 502. In S722 of the ultrasonic cleaning (for maintenance), the cleaning is performed over a longer period of time than the ultrasonic cleaning (for normal processing). After this, in S723 of the water cleaning processing, a range wider than a normal range is washed with the water.

It is preferable to periodically perform S721 of the maintenance processing, and for example, it is possible to prevent the contaminants from being accumulated to the nozzle 22 by performing the S721 one time a day.

In this manner, in the operation state and in the maintenance state, by having parameters in which the cleaning time of the ultrasonic cleaner or the insertion depth of the dispensing nozzle vary, the automatic analyzer can perform the control as described above.

In addition, in the cleaning flow of the present invention, an operation of dropping a water droplet by vacuum suction or the like after the water cleaning, may be added.

FIG. 9 is an appearance view of an example in which a shape of the cleaning tank of the ultrasonic cleaner of the present invention is changed. FIG. 9(a) illustrates a cleaning port, and FIG. 9(b) is a sectional view of the ultrasonic cleaner, respectively. An ultrasonic cleaner 900 is not different from the ultrasonic cleaner 26 in the method of use or the installation position, except that a cleaning tank 902 part of a cleaning port 901 has a conical shape unlike the ultrasonic cleaner 26.

By changing the part in which the liquid of the cleaning tank 902 is stored to a conical shape, it is possible to reduce an amount of the cleaning liquid to be used, and further, the ultrasonic wave generated from the diaphragm 202 can be reflected by a surface 903 on the cleaning tank side of the cleaning port 901, it is possible to concentrate the occurrence of the cavitation on the periphery of the nozzle 22 inserted into the cleaning tank 902, and thus, it is possible to effectively perform the cleaning.

According to the ultrasonic cleaner having the above-described configuration, it is possible to effectively generate the cavitation in the cleaning range of the nozzle 22 in which the sample is dispensed, and to effectively clean the nozzle.

Example 2

FIG. 10 is an appearance view of an example of the ultrasonic cleaner of the embodiment. The embodiment is an example in which a vibrating part 222 is used instead of the diaphragm used above. FIG. 10(a) is a perspective view of the ultrasonic cleaner, FIG. 10(b) is an upper view of the ultrasonic cleaner, and FIG. 10(c) is a sectional view of the ultrasonic cleaner, respectively. The sectional view (c) is a sectional view of a location illustrated by a dashed line of a location illustrated by A. The ultrasonic vibrating means of the ultrasonic cleaner 200 (26) of the present invention is the BLT 100.

The ultrasonic cleaner 200 fixes a plate spring 221 and the vibrating part 222 to the BLT 100 by a bolt 224, and both ends of the plate spring 221 are fixed to a cleaner base 223.

In the cleaner base 223, the cleaning tank 211 which can store the cleaning liquid and a liquid feeding port 225 which connects a tube that feeds the cleaning liquid to the cleaning tank 211 are provided, the cleaning liquid is overflowed to a groove on the periphery by feeding the cleaning liquid to the cleaning tank 205, and the cleaning liquid can be replaced. In addition, the overflowed cleaning liquid on the periphery of the cleaning tank 205 enters a hole 226 for the discharge, and the cleaning liquid is discharged through a discharge port 208 connected to the discharge pipe. The nozzle 22 can be inserted into the cleaning tank 211 in which the cleaning liquid is stored, from the upper part of the cleaning tank 211.

The ultrasonic cleaner 200 transmits the vibration of the BLT 100 to the vibrating part 222, and further, the tip end (the lowest end) of the vibrating part 222 extends to the inside of the cleaning tank 205, and the vibration can be transmitted to the cleaning liquid in the cleaning tank 211. In other words, the vibrating part 222 in the cleaning liquid can generate the ultrasonic wave from the side surface of the nozzle 22 due to the driving of the BLT 100. In other words, the vibrating part 222 has a shape which extends along the dispensing nozzle, and has a first part at which the vibrating part 222 is inserted into the cleaning tank, and the ultrasonic vibrator can vibrate the first part in the horizontal direction via a second part above the first part. In addition, the ultrasonic cleaner 200 can replace the cleaning liquid by the overflow after performing the cleaning of the nozzle 22.

In order to effectively clean the tip end of the nozzle 22, it is desirable that the vibrating part 222 is disposed to be parallel to the nozzle 22, or it is desirable that the nozzle is inserted at a position close to the vibrating part 222. Unlike the example of the diaphragm, it is possible to insert the nozzle at a position close to the vibrating part 222 without providing the opening part 210 a part of which protrudes. In addition, unlike the example of the diaphragm, it is possible to obtain a high cleaning effect without providing the sealing material for preventing the diaphragm or the liquid leakage on the side surface of the cleaning tank 211. It is desirable that the plate spring 221 has a shape in which the vibrating part 222 is not twisted so as to generate a parallel displacement, and the plate thickness is thin in order to increase the displacement of the vibrating part 222.

In the vibrating part 222, in addition to the plate-like vibrating part as described in FIG. 10(c), a rod-like vibrating part having a certain degree of thickness is also included. The shape of the vibrating part 222 is not particularly limited as long as the vibrating part 222 is a member which can be inserted into the cleaning tank 211 and vibrates in the horizontal direction. In addition, the vibrating part 222 may not be configured of a single member, but of a plurality of members.

In addition, FIGS. 6 and 9 can also be similarly employed in the example of the vibrating part 222.

Example 3

Next, another structure of the ultrasonic cleaner 26 will be described. The ultrasonic cleaner 26 generates the ultrasonic wave in the cleaning tank. As will be described later, the ultrasonic cleaner 26 is provided with the vibrating part which is inserted into the cleaning liquid in the cleaning tank, and transmits the ultrasonic vibration to the cleaning liquid, and the ultrasonic vibrator which is configured by fixing and fastening the piezoelectric element with two or more metal blocks by the bolt, and generates the ultrasonic vibration to the vibrating part. The vibrating part is mainly different from that of Example 2 in that a hollow part 1209 is provided.

FIG. 11 is an appearance view of an example of the ultrasonic cleaner. FIG. 11(a) is an upper view, FIG. 11(b) is a front view, FIG. 11(c) is a sectional view (section taken along A-A of the upper view (a)), and FIG. 11(d) is a perspective view of the ultrasonic cleaner, respectively. An ultrasonic cleaner 1200 includes an ultrasonic vibrator 1201, a vibrating part 1202, and a plate spring 1203. The ultrasonic cleaner 1200 is configured to interpose the plate spring 1203 between the ultrasonic vibrator 1201 and the vibrating part 1202, and to be fixed by a bolt 1204. Furthermore, two columns of a cleaner base (made of metal) 1205 which is a part of the automatic analyzer protrudes upward, and both end parts of the plate spring 1203 are fixed to the two columns of the cleaner base 1205. A tip end of the vibrating part 1202 is positioned in a cleaning tank 1206 which is on the cleaner base 1205, and in particular, the vibrating part 1202 is in contact with the cleaning tank 1206, and the tip end thereof is a free end. In other words, the vibrating part 1202 is fixed to the side surface of a metal block 1211 which will be described later and an upper part of the cleaning tank 1206, and the tip end of the vibrating part 1202 which is inserted into the cleaning liquid in the cleaning tank vibrates as a free end according to the vibration in the horizontal direction of the side surface.

The tip end of the vibrating part 1202 is provided with a cylindrical hole, and the hole passes through to a bottom of the vibrating part 1202 (refer to FIGS. 11(a) and 11(c)). Therefore, the vibrating part 202 includes the hollow part 1209, the nozzle 22 can be inserted into the hollow part 1209, and the hollow part 1209 is filled with the cleaning liquid.

In addition, it is possible to supply the cleaning liquid or the water from a supply port 1207 to the cleaning tank 1206, to make the liquid which enters the cleaning tank 1206 overflowed by supplying the liquid having an amount which is equal to or greater than a certain amount, and to discharge (replace the liquid by the overflow) the liquid to the outside of the ultrasonic cleaner 1200 from a discharge port 1208. In addition, the tip end of the vibrating part 1202 after supplying the cleaning liquid can also be immersed in the cleaning liquid stored in the cleaning tank 1206.

When cleaning the nozzle 22 by the ultrasonic cleaner 1200, by inserting the nozzle 22 into the hollow part 1209 which is at the tip end of the vibrating part 1202, the tip end part (range of being in contact with the sample) of the nozzle 22 is immersed in the cleaning liquid. By inputting sine wave voltage which is, for example, equal to or greater than 20 kHz to the ultrasonic vibrator 1201, the ultrasonic vibrator 1202 performs the ultrasonic vibration in the arrow direction. Accordingly, the tip end part of the vibrating part 1202 also performs the ultrasonic vibration, the cavitation occurs in the cleaning liquid of the hollow part 1209, and the nozzle 22 can be strongly cleaned.

In particular, in the configuration of the ultrasonic cleaner 1200, since it is possible to generate the cavitation from the different direction with respect to the side surface of the nozzle 22, it is possible to perform the cleaning without unevenness with respect to the range in which the tip end is cleaned. In addition, since the tip end of the vibrating part 1202 is a free end, at the tip end of the vibrating part 1202, the amplitude of the ultrasonic vibrator 1201 can be amplified, and many cavitations can occur. Additionally, since the distance between a vibration surface (inner circumference of a cap, here, a cylinder is referred to as a cap for convenience) which performs the ultrasonic vibration and the nozzle 22 is shortened, it is possible to generate the cavitation having high density with respect to the range in which the tip end of the nozzle 22 is desired to be cleaned. According to the two actions, it is possible to realize a strong cleaning effect. In addition, the cleaning force can be appropriately adjusted by adjusting the length in the perpendicular direction of the vibrating part 1202 and by adjusting the diameter of the hollow part 1209. For example, regarding the former adjustment, it is possible to increase the amplitude of the vibration surface by increasing the length, and regarding the latter adjustment, it is possible to shorten the distance between the vibration surface and the nozzle 22 by decreasing the diameter.

Since the contaminants which adhere to the nozzle 22 by cleaning the nozzle 22 are mixed into the cleaning liquid in the cleaning tank 1206, it is desirable to replace the cleaning liquid after cleaning the nozzle 22. However, if the cleaning liquid is replaced every time the nozzle 22 is cleaned, since a large amount of the cleaning liquid stocked in the device is necessary, it is desirable to reduce the amount of the cleaning liquid which is necessary for cleaning the nozzle 22. In the ultrasonic cleaner 1200, it is possible to replace the cleaning liquid by making the cleaning liquid overflowed, and to clean the nozzle 22 when the cleaning liquid is overflowed in the cap of the tip end of the vibrating part 1202. In other words, it is possible to make the shape of the cleaning tank 1206 small within a range in which the outer side of the vibrating part 1202 is not in contact, and to reduce the amount of the cleaning liquid to be used by reducing the size of the cleaning tank 1206.

The ultrasonic vibrator 1201 of the ultrasonic cleaner 1200 considers the BLT, and the BLT generally has a structure of interposing a piezo element (hereinafter, referred to as a piezoelectric element) 1213 by two metal blocks (1211 and 1212), and fastening and fixing by the bolt (not illustrated) on the inside. In the BLT, since the piezoelectric element is interposed by the metal blocks having a relatively large weight, and fastened and fixed by the bolt, it is possible to lower the vibration frequency of the piezoelectric element on the metal block side. The frequency band of the piezoelectric element of the embodiment is a band for an element which oscillates in a frequency band in which the cavitation is relatively unlikely to occur. However, it is possible to configure the ultrasonic cleaner which vibrates in a frequency band (20 kHz to 100 kHz) in which the cavitation is likely to occur, of the BLT.

The ultrasonic cleaner 1200 is fixed by the cleaner base 1205 via the plate spring 1203 at a part at which the vibration amplitude of the ultrasonic vibrator 1201 increases (an antinode of the vibration). When the plate spring 1203 has a shape having high rigidity, the amplitude of the vibrating part 1202 is not sufficiently obtained, and the cleaning effect of the nozzle 22 deteriorates. Therefore, a shape in which the plate thickness of the plate spring 1203 is thin and the width is narrow, is desirable.

As the distance between the ultrasonic vibrator 1201 and the vibrating part 1202 is shortened, the size of the cleaner can be reduced, and thus, it is also possible to mount the ultrasonic cleaner 1200 on the automatic analyzer having a limited installation space.

In the embodiment, a structure in which the cylindrical hole is provided as the hollow part at the tip end of the vibrating part 1202 is described. However, the invention is not necessarily limited to the configuration as long as a high cleaning effect is obtained and an effect in which the cleaning unevenness does not occur is considered. For example, the hole may be an elliptical or polygonal columnar hole. Otherwise, the hole may be a hole having an uneven width in the depth direction not to have a shape of a column, but to have a shape of a part of a cone or a part of a polygonal cone. In this manner, the vibrating part 1202 may have a shape a part of which is chipped, in addition to the shape which covers the entire circumferential direction of the nozzle 22.

In a case of the shape a part of which is chipped, it is desirable that a position at which a part is chipped is a position which does not intersect a straight line when drawing the straight line in the vibrating direction of the vibrating part 1202 from the position of the nozzle 22 on a horizontal section.

For example, in a case of the shape a part of which is chipped by using the shape which covers the entire circumferential direction of the nozzle 22 as a reference, it is desirable to provide the position at which a part is chipped at an intersecting position when drawing the straight line in the direction perpendicular to the vibrating direction of the vibrating part 1202 from the position of the nozzle 22.

For example, a shape which interposes the nozzle 22 by parallel flat plates or the like may be employed as the shape a part of which is chipped. In this case, the disposition of the position at which a part is chipped is also similar. In other words, it is desirable to employ flat plates which oppose each other in the vibrating direction of the vibrating part 1202.

Here, the reason of occurrence of the cleaning unevenness will be described. In a case where the ultrasonic wave is generated from the side surface in one direction of the nozzle 22, on the side opposite to the nozzle 22, a shade region in which the ultrasonic wave is unlikely to sneak is generated, and unevenness occurs in the occurrence amount of the cavitation in the front surface direction and in the rear surface direction of the nozzle 22. Therefore, by generating the ultrasonic wave from the plural directions with respect to the nozzle 22 from the vibrating part 1202, it is possible to eliminate the shade region. Accordingly, it is possible to suppress the cleaning unevenness by configuring the vibrating part so that the part which vibrates in synchronization with the vibration of the vibrating part 1202 is disposed in the plural directions when viewed from the nozzle 22.

Therefore, in the embodiment, it is also possible to further suppress the cleaning unevenness by the vibrating part of Example 2.

However, since the surface perpendicular to the vibrating direction is a surface which contributes to generating cavitation the most, it is possible to most efficiently obtain a high cleaning force by achieving a shape of the vibrating part 1202 in which a part is disposed at two positions which intersect each other when drawing a straight line in the vibrating direction of the vibrating part 1202 by using the position of the nozzle 22 as a starting point on the horizontal section.

Here, the hollow part 1209 will be described. As described above, the vibrating part 1202 may have various shapes, and a shape in which the part is disposed in the plural directions when viewed from the nozzle 22 may be employed. Therefore, the hollow part 1209 does not necessarily mean only the inner side of a shape which covers the entire circumferential direction of the nozzle 22. In addition, regardless of the continuity of the part, in the specification, the inner side surrounded by the plural parts corresponds to the hollow part 1209.

As described above, it is more desirable that the parts are the vibrating part 1202 provided with an opposing part via the hollow part 1209 considering the efficiency rather than that the parts which are simply disposed in the plural directions. In other words, it is desirable that the vibrating part 1202 is provided with two surfaces opposing each other via the hollow part 1209. This is because the shade region generated on one surface can be eliminated by the other surface. Here, opposing surfaces means not only the parallel surfaces, but also that an inclination between the surfaces to a certain degree is allowed. For example, the inclination angle between the surfaces may be 30°, and is considered to be opposing when the inclination angle is less than 90°.

However, it is desirable that the two surfaces oppose each other in the vibrating direction of the vibrating part. In other words, two surfaces which interpose the hollow part 1209 and are perpendicular to the vibrating direction are desirable. In addition, not only the plane but also a curved surface described in the embodiment is also included in the perpendicular surface. In the embodiment, the vibrating part 1202 has a shape which surrounds the entire periphery of the hollow part 1209, and the two surfaces are inner wall surface having the shape.

Next, the effects will be described. As described above, by using the ultrasonic cleaner provided with the ultrasonic vibrator of the BLT and the vibrating part having the hollow part, it is possible to provide the automatic analyzer or the like which can obtain a high cleaning effect without the cleaning unevenness with respect to the dispensing nozzle by cleaning the dispensing nozzle by generating the ultrasonic vibration in the vibrating part in a state where the dispensing nozzle is inserted into the hollow part.

In addition, since the ultrasonic cleaner of a type of inserting the vibrating part into the cleaning tank is employed, it is possible to generate the ultrasonic wave at the amplitude which is greater than the amplitude of the ultrasonic vibrator. In addition, it is possible to make the vibrating part approach the dispensing nozzle, and to clean the dispensing nozzle by higher cleaning force.

In addition, as the vibrating part is provided with two surfaces opposing each other via the hollow part, it is possible to more effectively eliminate the cleaning unevenness than the case where two surfaces do not oppose each other.

In addition, as the two surfaces are surfaces opposing each other in the vibrating direction of the vibrating part, it is possible to much more effectively eliminate the cleaning unevenness. Additionally, in a case of this shape, each surface vibrates in the opposite phase around the nozzle. The cleaning liquid interposed therebetween largely waves by the vibration of the opposite phase. The cleaning liquid contaminated by the nozzle cleaning climbs over the surface and moves to the outside of the hollow part by the waving action. Accordingly, the cleaning liquid which is not contaminated flows into the hollow part from the lower side of the hollow part. Therefore, it is possible to suppress re-adhesion of a contamination source to the nozzle by the action of the flow of the cleaning liquid.

In addition, as the vibrating part has a shape which surrounds the entire periphery of the hollow part and two surfaces are inner wall surfaces having the shape, it is possible to manufacture the vibrating part by a simple processing method of opening a hole in the vibrating part. Therefore, it is possible to manufacture a high-performance vibrating part at comparatively low cost. In addition, as described above, similar effects can also be obtained in a case of a polygonal columnar shape, but from the viewpoint of the processing cost, the cylindrical columnar shape is the most appropriate.

In addition, in a configuration in which a plurality of ultrasonic arrays are disposed on the inner side of the cleaning tank as described in PTL 2, a difficulty of attaching each element of the ultrasonic array is considered, and the control of the plurality of ultrasonic arrays becomes complicated. Meanwhile, in the embodiment, a simple configuration is achieved since the configuration of inserting the vibrating part is employed, and the driving control is easily performed since the number of ultrasonic generating sources is practically one.

In addition, when the configuration of PTL 2 is employed, even in a case where a part of the ultrasonic array is damaged, since other ultrasonic arrays are driven, it is difficult to notice the abnormality, and a case where the fact that the expected cleaning effect is not obtained is not noticed can be considered. Meanwhile, in the embodiment, in a case where the ultrasonic vibrator is damaged, since the cavitation is not generated at all, it is possible to easily notice the abnormality.

In addition, when the plurality of ultrasonic arrays are disposed on the inner side of the cleaning tank as described in PTL 2, while complicated unevenness is generated on the inner side of the cleaning tank, in the embodiment, the inner side of the cleaning tank has a shape of a curved surface which does not have the unevenness. Therefore, in a case of performing the maintenance to wipe out the inside of the cleaning tank, the maintenance becomes easy. In addition, in the vibrating part from the ultrasonic vibrator is employed, it is also possible to easily perform the maintenance or replacement by wiping-out of the vibrating part.

Example 4

In Example 3, a configuration in which a high cleaning effect without the cleaning unevenness is obtained is mainly described. However, when repeatedly performing the cleaning by the ultrasonic wave, the ultrasonic vibrator 1201 generates heat (depending on the driving condition, but there is a case where the temperature is equal to or greater than 50 degrees), and the heat moves to the vibrating part 1202. In particular, in a case where the distance between the ultrasonic vibrator 201 and the vibrating part 1202 is short similar to the vibrating part 1202 similar to the ultrasonic cleaner 1200, the temperature of the vibrating part 1202 becomes high temperature to the degree which is the same as that of the ultrasonic vibrator 1201. The cleaning liquid is supplied to the periphery of the tip end of the vibrating part 1202, but the heat of the vibrating part 202 moves during a short period of time since the amount thereof is small, and further, the nozzle 22 inserted into the cleaning tank 1206 for performing the cleaning is warmed. The water temperature in the automatic analyzer is generally normal temperature (approximately 25 degrees), and an increase in a difference between the temperature of the nozzle 22 and the normal temperature influences the dispensing performance. Since both a large difference and a small difference between the temperature of the nozzle and the water temperature influence the dispensing performance, it is desirable that the difference between the temperature of the nozzle 22 and the normal temperature is small. In order to reduce the influence, it is desirable to radiate the heat before the heat from the ultrasonic vibrator 1201 moves to the vibrating part.

Since the metal plate spring 1203 is also disposed between the ultrasonic vibrator 1201 and the vibrating part 1202 in the example of FIG. 11, it cannot be said that the heat radiation effect is not obtained at all, but as described above, since a thin plate is employed, the heat radiation effect is relatively small. Therefore, in the following embodiment, a configuration for increasing the heat radiation effect will be described. In addition, since the shape of the tip end of the vibrating part 1202 is similar to that of the Example 3, the description of the configuration and the effect will be omitted.

FIG. 12 is an appearance view of an example of the ultrasonic cleaner (only the vibration part) having a structure in which a heat radiation effect higher than that of Example 3 is obtained. FIG. 12(*a*) is an upper view, FIG. 12(*b*) is a side view, FIG. 12(*c*) is a perspective view of the ultrasonic cleaner, and FIGS. 12(*d*) and 12(*e*) are schematic views of the cleaning part, respectively. However, the cleaning tank in which the cleaning liquid is stored is similar to FIG. 11, and is omitted in FIG. 12. Similar to the ultrasonic cleaner 1200, an ultrasonic cleaner 1300 uses a BLT type ultrasonic vibrator 1301, but instead of the plate spring 1203, a piezo element 1313 and a metal member 1314 are interposed between metal blocks 1311 and 1312, and are fastened and fixed by the bolt (not illustrated) in the ultrasonic vibrator 1301. The metal member 1314 can be fixed to an ultrasonic vibrator base 1302, and a vibrating part 1303 is fixed to the ultrasonic vibrator 1301 by the bolt or the like. A tip end of the vibrating part 1303 is the same as that of the ultrasonic cleaner 1200, and is immersed in the cleaning liquid in the cleaning tank 1206 (not illustrated in FIG. 12). In a state where the nozzle 22 is inserted into the cleaning tank 1206 and approaches the vibrating part 1303, by driving the ultrasonic vibrator 1301, the tip end of the nozzle 22 can be cleaned.

The ultrasonic cleaner 1300 is fixed to the ultrasonic vibrator base (made of metal) 1302 via the metal member 1314 at a part at which the vibration amplitude of the ultrasonic vibrator 1301 does not become large (a node of the vibration). Unlike the ultrasonic cleaner 1200, the plate spring 1203 is not necessary and without making the plate thickness of the metal member 1314 thin similar to the plate spring 1203, the amplitude of the vibrating part 1202 can be sufficiently generated. The metal member 1314 is adjacent to the piezo element 1313 which is a heat generation source, and the heat when driving the ultrasonic vibrator 1301 moves to the metal member 1314 from the piezo element.

After this, the heat moves in order of the metal block 1311 and the vibrating part 1303, and when the vibrating part 1303 is heated, the nozzle 22 is warmed via the cleaning liquid when cleaning the nozzle 22. However, a heat capacity increases since the plate thickness in the metal member 1314 can be thick (the volume increases) compared to the plate spring 1203, and the movement of the heat to the vibrating part 1303 can decrease compared to the ultrasonic cleaner 1200. Therefore, by providing the metal member 1314 and the ultrasonic vibrator base (made of metal) 1302, it is possible to effectively radiate the heat, and to suppress the movement of the heat to the vibrating part 1303.

In particular, in order to improve the heat radiation properties, it is desirable that the material of the metal member 1314 and the ultrasonic vibrator base 1302 is a material having higher thermal conductivity than that of the metal block 1311 or the vibrating part 1303, and by radiating the heat from the metal member 1314 or by integrally moving the heat to the ultrasonic vibrator base 1302, the heat from the piezo element 1313 is unlikely to be moved to the vibrating part 1303.

Furthermore, as means for increasing the heat radiation efficiency from the metal member 1314, there is a method of providing a fin structure in the metal member 1314 or the ultrasonic vibrator base 1302, increasing the surface area, and sticking a heat sink to the metal member 1314. In addition, in the structure of the ultrasonic cleaner 1300, it is possible to cool the metal member 1314 by cooling the ultrasonic vibrator base 1302, and to suppress the movement of the heat to the vibrating part 1303. As cooling means, there are a method of attaching a fan for air cooling or a water cooling tube to the ultrasonic vibrator base 1302, and a method of attaching a Peltier element.

As described above, similar to the ultrasonic cleaner 1200, the vibrating part 1303 is used by disposing the tip end part in the cleaning tank 1206, but when the shape of the tip end part has a shape of a plane, and when the shape is a shape of a curved surface, it is possible to clean the nozzle 22. However, as described above, by providing a hollow part 1320 to surround the nozzle 22 in the tip end part of the vibrating part 1303 in a shape of a cup, it is possible to effectively clean the entire circumference of the nozzle 22. Furthermore, even in a case of a shape of a cup, by making the hollow part 1320 as a through hole, it is also possible to replace the cleaning liquid in the hollow part 1320, similar to the ultrasonic cleaner 1200, the ultrasonic cleaner 1300 can correspond to the overflow structure of the liquid. In particular, by making the shape of a cup, since it is possible largely increase the surface area of the surface which is in contact with the liquid of the vibrating part 1303, it is possible to increase a cooling effect by the overflow of the liquid which will be described later.

FIG. 13 is an appearance view of an example of the ultrasonic cleaner having the heat radiation structure (cooling structure) of the embodiment. FIG. 13(*a*) is an upper view, FIG. 13(*b*) is a rear view, FIG. 13(*c*) is a sectional view, and FIG. 13(*d*) is a perspective view (section taken along A-A of the rear view (b)) of the ultrasonic cleaner, respectively. An ultrasonic cleaner 1400 has a structure similar to that of the ultrasonic cleaner 1200, and is different from the ultrasonic cleaner 1200 in that a tube 1402 for radiating the heat (cooling) is provided in an ultrasonic vibrator 1401. As described above, the BLT interposes the piezo element by the two metal blocks, and is fastened by the internal bolt, and in the ultrasonic cleaner 1400, a hole is open in an internal bolt 1403 and two tubes 1402 pass through the hole. In FIG. 13, the tube 1402 enters from the side surface of the ultrasonic vibrator 1401, is removed from the rear surface, and enters the ultrasonic vibrator 1401 from the rear surface, and finally, goes out of the side surface of the ultrasonic vibrator 1401. In addition, a structure in which the inside of the tube 1402 is filled with the fluid (for example, water) and the circulation is possible by a pump (not illustrated), is employed. At a part of the tube 1402 which is on the outside of the ultrasonic cleaner 1400, the fluid in the tube 1402 can radiate (cool) the heat of the piezo element through the cooling means, such as a cooler. As the cooling means, a cooling function of a cold insulation box (a part of the reagent disk 12) for insulating the reagent which is in the automatic analyzer 10, may be used. According to the above-described configuration, the generated heat of the piezo element 1213 can be radiated to the outside of the ultrasonic cleaner 1400 by the circulation of the fluid which passes through the inside of the tube 1402, and the movement of the heat to the vibrating part 1202 can be suppressed.

In FIG. 13, a configuration in which the disposition of the tube 1402 enters from the side surface of the ultrasonic vibrator 1401 and goes out of the rear surface is illustrated, but the heat radiation (cooling) is possible even when the surface or the position at which the tube 1402 enters and goes out is different from that of FIG. 13. In addition, the flow path may be directly formed in the ultrasonic vibrator 1401 without using the tube 1402, or the tube may be connected to the flow path. It is preferable that the tube 1402 is made of a material which is resistant to high temperature of the piezo element 1213 and has low rigidity which does not influence the vibration of the ultrasonic vibrator 1401.

Similar to the ultrasonic cleaner 1200, since the ultrasonic cleaner 1400 also has the overflow structure of the liquid, it is possible to radiate the heat (cool) by the overflow of the liquid which will be described late.

In addition, as a method in which the cooler is not used as the cooling means, there is also a method in which the above-described heat sink, the cooling fan, or the Peltier element is used.

FIG. 14 is an example of the liquid overflow structure and the pipe connection in the ultrasonic cleaner of the embodiment. In order to supply the cleaning liquid or the water to the ultrasonic cleaner 26, a pipe 1501 is connected to a lower part of the cleaning tank 1206. A syringe pump 1502 for extruding the liquid by pressure, a cleaning liquid tank 1503 in which the cleaning liquid is stored, a pipe 1504 which is connected to water works and supplies the water to the water works facilities, and a switching valve 1505 for switching the connection of the pipe, are connected to the pipe 1501. Furthermore, a pipe 1506 which is connected to the sewage and discharges the liquid to a sewage system after the liquid overflowed from the cleaning tank 1206 passes through the discharge port 1208, is provided. In the above-described configuration, by controlling the syringe pump 1502 and the switching valve 1505, it is possible to supply the cleaning liquid or the water to the cleaning tank 1206. In addition, as illustrated in a flow path 1507 of the liquid at the time of the overflow, the liquid which is in the cleaning tank 1206 is overflowed by supplying the liquid, and the liquid can be discharged to the sewage by the overflow. The syringe pump 1502 or the switching valve 1505 operate by the command from the control portion 28 which controls the device, and can control the number of overflows or the type (water or cleaning liquid) of the liquid.

The overflow of the liquid described above can be used in radiating the heat from the tip end part of the vibrating part (1202 or 1303) in a case where the heat from the ultrasonic vibrator (any of 1201 to 1401) moves to the tip end part of the vibrating part (1202 or 1303). In particular, by repeating the overflow of the liquid plural times, the heat radiation to the liquid from the vibrating part, the discharge of the heated liquid, and the supply of the liquid having a normal temperature, are repeated (since the water works have a normal temperature, the temperature is lower than that of the heated vibrating part). Therefore, by repeating the overflow plural times, it is possible to discharge the heat from the tip end part of the vibrating part (1202 or 1303). In addition, instead of repeating the overflow plural times, the liquid may be continuously overflowed for a long period of time. In addition, in order to suppress the amount of the cleaning liquid used, it is desirable to switch the liquid to be overflowed to the water.

In addition, it is possible to supply the cleaning liquid when performing the ultrasonic cleaning of the nozzle 22, or to supply and store the water when the cleaning is not performed for a long period of time.

In addition, the cleaning liquid to be supplied to the cleaning tank 1206 can be supplied after diluting original liquid which is in the cleaning liquid tank 1503 with the water.

FIG. 15 is an example of a processing flow of the nozzle cleaning in which the ultrasonic cleaner of the present invention is used. FIG. 15(a) is a sampling processing flow of the sample including the ultrasonic cleaning, FIG. 15(b) is a processing flow of the ultrasonic cleaning, and FIG. 15(c) is an replacement timing of the cleaning liquid, respectively.

At the time of S1601 in a state where the device is in an operation state, the sample dispensing mechanism 15 repeats S1611 of the sampling processing with respect to the sample. In S1611 of the sampling processing, S1612 of dispensing (suctioning of the sample and ejecting of the sample) is not performed, and in a case where the sample to be dispensed is a sample which does not require the ultrasonic cleaning (S1613 of determination processing), S1614 of the water cleaning in which the nozzle 22 is washed with the water is performed, and in a case of a sample which requires the ultrasonic cleaning (S1613 of determination processing), the water cleaning is performed after performing S1615 (the processing flow will be described later in detail) of the ultrasonic cleaning. The above-described processing will be repeated.

In the description above, according to the result of S1613 of the sample determination, a case of only S1614 of the water cleaning processing and a case of S1615 of the ultrasonic cleaning and S1616 of the water cleaning are divided, but S1615 of the ultrasonic cleaning may be performed every time when the sampling is performed.

In S1615 of the ultrasonic cleaning, S1621 (for example, applying a sine wave of predetermined voltage) of starting the driving of the ultrasonic vibrator (1201, 1301, 1401) is performed, S1622 of inserting the nozzle 22 into the cleaning tank 1206, S1623 of drawing the nozzle 22 out of the cleaning tank 1206 after a certain period of time, and S1624 of stopping the driving of the ultrasonic vibrator (1201, 1301, 1401), are performed. After this, S1625 of replacing the cleaning liquid in the cleaning tank 1206 which is used in the cleaning by the overflow, is performed.

The time period from S1622 of inserting the nozzle to S1623 of drawing out the nozzle is short in the middle of the operation, but the degree of contamination can be estimated from the number of dispensations, and the cleaning time can also be controlled to be long. In addition, in a case where the ultrasonic cleaning is performed in a maintenance state where the device does not require the dispensing processing, the cleaning time may be elongated.

Since the timing at which the heat radiation of the vibrating part (1202 or 1303) is performed by the overflow of the liquid as described above, may be the timing at which a time 1631 when the S1615 of the ultrasonic cleaning is not performed is elongated, for example, a schedule in which S1615 of the ultrasonic cleaning is not performed may be automatically determined from the examination item or the type of the sample which is managed in the automatic analyzer 10, and the heat radiation of the vibrating part (1202 or 1303) may be performed by performing S1626 of making the water overflowed. There is a method of performing S1626 of making the water overflowed at the timing when the number of cleaning reaches the predetermined number in the middle of the operation, a method of performing S1626 at a certain timing, or a method of performing S1626 when the temperature becomes equal to or higher than a certain temperature by temperature detection means. The temperature detection means will be described later.

In order to radiate the heat (cool) of the vibrating part (1202 or 1303), after performing S1626 of making the water overflowed, S1627 of the processing of re-replace the cleaning liquid is performed, and S1615 of the ultrasonic cleaning is performed.

FIG. 16 is a cleaning flow which corresponds to a change in the temperature of the ultrasonic cleaner in the present invention. The timing of performing an ultrasonic cleaning 1700 is similar to S1615 of the ultrasonic cleaning. In S1700 of the ultrasonic cleaning, after S1701 of starting the driving of the ultrasonic vibrator (1201, 1301, 1401), S1702 of checking whether or not a difference between the resonance value of the ultrasonic vibrator (1201, 1301, 1401) and a value measured in advance exceeds a predetermined threshold value, is performed.

The resonance frequency can be output via a circuit (a circuit which automatically adjusts a frequency to that of a low frequency, and amplifies and outputs the voltage) which applies the voltage to the ultrasonic vibrator. Therefore, the control portion 28 can ascertain the difference by the resonance frequency output from the circuit, and it is possible to determine that the difference exceeds the predetermined threshold value. The resonance frequency of the ultrasonic vibrator (1201, 1301, 1401) changes depending on the temperature, and when the resonance frequency changes to be greater than a value measured in advance, it is possible to determined that the ultrasonic vibrator (1201, 1301, 1401) reaches a high temperature. The resonance frequency of the ultrasonic vibrator (1201, 1301, 1401) used for comparison is, for example, stored in advance by a pre-operation when initiating the automatic analyzer 10. When the ultrasonic vibrator (1201, 1301, 1401) reaches a high temperature, the heat radiation processing of the vibrating part (1202 or 1303) is necessary in order to prevent the nozzle 22 from being heated as described above. Here, in S1702 of checking the resonance frequency, in a case where the value which is greater than threshold value is detected, the process is transited to S1703 of a state where the abnormality is detected before the cleaning, and the control portion stops the control of the dispensing nozzle which is scheduled to be inserted into the cleaning tank. Additionally, an alarm, such as displaying of the abnormality on an operation screen of the automatic analyzer 10, is notified to the user. Furthermore, S1704 of overflow-cooling the above-described liquid by the overflow is performed. It is desirable that S1704 of overflow-cooling (heat radiation operation) is performed for a certain period of time and the heat radiation is sufficiently performed.

In a case where a change is smaller than a threshold value in S1702 of checking the change in the resonance frequency of the vibrator, since it is possible to determine that the ultrasonic vibrator does not reach a high temperature as the change decreases, S1705 of inserting the nozzle 22 into the cleaning tank 1206 is performed. After the nozzle 22 is inserted into the cleaning tank 1206 for a certain period of time and S706 of the ultrasonic cleaning, S1707 of drawing the nozzle 22 out of the cleaning tank 1206, S1708 of stopping the driving of the vibrator, S1709 of replacing the cleaning liquid, and S1710 of checking the temperature of the nozzle, are performed. In addition, there is not a problem even when S1708 of stopping the driving of the vibrator and S1710 of checking the temperature of the nozzle are performed at the same time.

S1710 of checking the temperature of the nozzle can use temperature measuring means, such as a temperature sensor which is sticked to the nozzle. In addition, a thermocouple is considered as a temperature sensor. In addition, an infrared sensor may be used as the temperature sensor, and it is possible to obtain the temperature of the nozzle in a non-contact manner by the infrared sensor. In addition, the temperature of the nozzle 22 may be indirectly predicted from the temperature of the water which washes the nozzle 22. The detection (or prediction) of the temperature of the nozzle is not limited to the above-described means and various means can be considered.

In a case where a difference between the temperature (or prediction of temperature) of the nozzle 22 and the normal temperature is equal to or greater than the threshold value, the process is transited to S1711 of an abnormality state after cleaning the nozzle, and the control portion stops the control of a sample suction operation scheduled next. Additionally, as described above, in order to influence the dispensing accuracy, the nozzle 22 itself is cooled (heat-radiated) by performing S1712 of performing the cleaning processing inside and outside the nozzle. In S1711 of the abnormality state after cleaning the nozzle, the alarm, such as the displaying of the abnormality on the operation screen of the automatic analyzer 10, may be notified to the user. By performing S1712 of performing the cleaning processing inside and outside the nozzle, the temperature of the nozzle 22 returns to the normal temperature. In a case where there is not an abnormality in S1710 of checking the temperature of the nozzle, S1714 of continuing the sampling processing (S1611) is performed as usual after S1713 of the water cleaning of the nozzle 22.

S1702 of checking the change in the resonance frequency of the ultrasonic vibrator can be switched to means for performing the checking by the temperature sensor or the like.

According to the ultrasonic cleaner having the above-described configuration, it is possible to make the influence of the temperature of the ultrasonic vibrator which reaches a high temperature difficult to be transmitted to the nozzle 22 by repeatedly cleaning the nozzle 22, and to clean the nozzle.

In the pipe connection (FIG. 14) of the present invention, the tube which passes through the cooler (for example, a reagent cold insulation box) in a system which supplies the water is provided, and after detecting the temperature in the cleaning tank 1206, the cleaning liquid is mixed and diluted with the water cooled by the cooler, and accordingly, control to an arbitrary liquid temperature is possible. The change in the liquid temperature after putting the liquid into the cleaning tank 1206 can be estimated from the measured value of the temperature in the cleaning tank 1206, the temperature of the cleaning liquid can be controlled to be low in advance, and the cleaning liquid can be supplied to reach the normal temperature in the cleaning tank 1206.

In addition, the processing of FIGS. 15 and 16, and the checking and the control of various sensors, are performed by the control portion 28.

Next, the effects of Example 4 will be described. The following effects can be obtained in addition to the effects obtained by the vibrating part of Example 3. First, by providing the heat radiation portion between the piezoelectric element (piezo element) and the vibrating part, it is unlikely to transmit the influence of the temperature of the piezoelectric element which reaches a high temperature due to the repeated cleaning of the nozzle 22, to the nozzle 22, and it is possible to clean the nozzle.

In addition, in Example 3, regarding the heat radiation, the metal plate spring disposed between the ultrasonic vibrator and the vibrating part and the cleaner base including the cleaning tank are fixed, and the heat radiation portion becomes the plate spring and the cleaner base. In order to improve the heat radiation effect, similar to Example 4, it is desirable that the metal member disposed on a side closer to the piezoelectric element than the vibrating part and the vibrator base are fixed, and the heat radiation portion becomes the metal member and the vibrator base. This is because the heat capacity of the metal member can be greater than that of the plate spring.

In addition, it is desirable that a flow path for making the fluid flow in the ultrasonic vibrator is provided, and the heat radiation portion is a flow path. The heat of the piezoelectric element can be radiated by making the fluid flow in the flow path.

In addition, it is desirable that the pipe which is connected to the cleaning tank and supplies the cleaning liquid and the water is provided, the control portion controls the supply of the cleaning liquid and the water to the cleaning tank via the pipe, the control portion controls the supply of the water to the cleaning tank at the timing when the driving control of the ultrasonic cleaner is not performed, and the water is discharged from the opening part of the cleaning tank being overflowed. Accordingly, it is possible to effectively discharge the heat of the tip end of the vibrating part by the overflow. In addition, it is possible to discharge the heat with a small consumption amount of the cleaning liquid since not the cleaning liquid but the water is used. In a case where the cleaning liquid is detergent, an effect of decreasing the consumption amount of the cleaning liquid becomes a large advantage from the viewpoint of cost.

In addition, it is desirable that resonance frequency measuring means for measuring the resonance frequency of the ultrasonic vibrator is provided, and in accordance with the resonance frequency measured by the resonance frequency measuring means, the control portion stops the control of the dispensing nozzle which is scheduled to be inserted into the cleaning tank. Accordingly, it is possible to estimate the heat of the ultrasonic vibrator by the resonance frequency, and to suppress the insertion of the nozzle into the heated cleaning liquid. The resonance frequency measuring means is, for example, a circuit itself which applies the voltage to the ultrasonic vibrator, and for example, when the resonance frequency changes to be greater than the value measured in advance, it is possible to determine that the ultrasonic vibrator reaches a high temperature.

In addition, it is desirable that the temperature measuring means for measuring the temperature of the dispensing nozzle is provided, and in accordance with the temperature measured by the temperature measuring means, the control portion stops the control of a sample suctioning operation which is scheduled next. Accordingly, it is possible to directly or indirectly detect the temperature of the dispensing nozzle by the temperature measuring means, and to suppress the sample suctioning operation by the heated dispensing nozzle. The temperature measuring means may be, for example, the thermocouple or the infrared sensor which is sticked to the nozzle, or a sensor which detects the temperature of the water which washes the nozzle, and may indirectly predict the temperature of the nozzle from the detection value of the sensor. For example, in a case where the difference between the temperature detected by the temperature sensor and the normal temperature is equal to or greater than the threshold value, the control is stopped. Accordingly, it is possible to suppress the negative influence on the dispensing accuracy due to the heat of the piezoelectric element.

In addition, it is desirable that any measuring means among the resonance frequency measuring means for measuring the resonance frequency of the ultrasonic vibrator or the measuring means for measuring the temperature of the dispensing nozzle is provided, and in accordance with the measurement result of the measuring means, the heat of the dispensing nozzle is radiated by bringing inner cleaning water and outer cleaning water into contact with the dispensing nozzle. Accordingly, the heat radiation of the dispensing nozzle is performed, and it is possible to suppress the negative influence on the dispensing accuracy caused by the heat of the piezoelectric element.

Example 5

Next, another structure of the ultrasonic cleaner 26 will be described. The ultrasonic cleaner 26 generates the ultrasonic wave in the cleaning tank. As will be described later, the ultrasonic cleaner 26 is provided with the vibrating part which is inserted into the cleaning liquid in the cleaning tank and transmits the ultrasonic vibration to the cleaning liquid, and the ultrasonic vibrator which is configured by fixing and fastening the piezoelectric element with two or more metal blocks by the bolt, and generates the ultrasonic vibration to the vibrating part.

In Example 5, by the configuration of the ultrasonic cleaner in which the BLT is used, the ultrasonic cleaner which can increase the liquid temperature of the cleaning liquid and obtain a high cleaning effect in addition to the configuration in which strong cavitation which can clean the nozzle tip end (in particular, outer circumference) without unevenness at a range of 20 to 100 kHz of the driving frequency, will be described.

However, the cleaning effect can be roughly divided into the cleaning which uses a chemical effect of the cleaning liquid and the cleaning which uses a physical effect, such as cavitation or a straight flow, and in order to obtain a strong cleaning effect, it is required to use both cleaning manners. Regarding the physical effect of the cleaning, it is possible to generate the strong cavitation by generating a large displacement. Regarding the chemical effect of the cleaning, it is effective to select an appropriate type of the cleaning liquid, and to control the liquid temperature. In particular, a high cleaning effect can be obtained by increasing the liquid temperature with respect to the contaminants including protein, such as blood.

FIG. 17 is a view illustrating an example of the configuration of the ultrasonic cleaner of present invention. FIG. 17(a) is an upper view, FIG. 17(b) is a side view, FIG. 17(c) is a sectional view, and FIG. 17(d) is a perspective view (section taken along A-A of the upper view (a)) of the ultrasonic cleaner, respectively. The ultrasonic cleaner 26 includes an ultrasonic vibrator (BLT) 2205 and a vibrating part (cleaning head) 2209. The ultrasonic vibrator (BLT) 2205 is configured by interposing one or more piezoelectric elements 203 between a front mass 2201 and a back mass 2202, and by fastening the front mass 2201 and the back mass 2202 by a bolt 2204. A base portion 2207 which is a part of the automatic analyzer includes a cleaning tank 2206 in which the cleaning liquid is stored, and supports an ultrasonic vibrator 2205. The ultrasonic vibrator 2205 is provided with a flange portion 2208, and is supported by the base portion 2207 via the flange portion 2208. Furthermore, the ultrasonic vibrator 2205 is connected to the vibrating part (cleaning head) 2209 which extends to the cleaning tank 2206.

A tip end part 2210 of the vibrating part (cleaning head) 2209 has a cylindrical shape, and is in a state of being inserted into the cleaning liquid, and a part or the entirety of the cylindrical shape is immersed. In other words, the vibrating part (cleaning head) 2209 has a shape of surrounding the nozzle similar to the cylindrical shape. The tip end part 2210 is not in contact with the cleaning tank 2206. In the cylindrical part of the tip end part 2210, a hole having a diameter greater than that of the tip end of the nozzle 22 is open. Therefore, the vibrating part (cleaning head) 2209 has a hollow part (nozzle insertion port 303 which will be describe later), the nozzle 22 can be inserted into the hollow part, and the hollow part is filled with the cleaning liquid. The control portion 28 performs the cleaning of the nozzle 22 by vibrating the vibrating part (cleaning head) in a state where the nozzle 22 is inserted into the hollow part.

In addition, a cleaning liquid supply tube 2211 which supplies the cleaning liquid to the cleaning tank 2206 is provided, and it is possible to replace the cleaning liquid which is in the cleaning tank 2206 by the overflow by supplying a certain amount of cleaning liquid. The cleaning liquid overflowed from the cleaning tank 2206 flows to a liquid receiver 2212 which is on an outer circumference of the cleaning tank 2206, and is discharged from a drainage path 2213. Here, it is desirable that an outlet on the cleaning tank 2206 side of the cleaning liquid supply tube 2221 is disposed immediately below the bottom of the vibrating part as illustrated in the drawing. This is because it is possible to prevent the cleaning liquid from being flown out of the cleaning tank by making the cleaning liquid abut against the bottom of the vibrating part in a case where the cleaning liquid is forcefully supplied. Accordingly, it is possible to forcefully supply the cleaning liquid into the cleaning tank while preventing the cleaning liquid from being flown out of the cleaning tank, and to replace the cleaning liquid during a short period of time. In addition, in the vibrating part of FIG. 10, similarly, it is also desirable that the outlet of the liquid feeding port is disposed immediately below the vibrating part.

In addition, in the drawing, a view in which only a lower side of the flange portion 2208 is supported by the base portion 2207 is described, but it is desirable that the upper side of the flange portion 2208 is pressed from above by a member which can connect the upper side to the base portion 2207, and the entire circumference of the flange portion 2208 is equivalently fixed. In addition, an interference member having an elastic force, such as rubber or silicon, may be put into the part at which the flange portion 2208 and the base portion are in contact with each other for preventing wear or noise of the flange portion 2208 or the base portion 2207.

In addition, the front mass 2201 and the back mass 2202 are metal blocks, an electrode plate (for example, a copper plate) is interposed between the metal block (2201 or 2202) and a piezoelectric element 2203, and between the plurality of piezoelectric elements 2203, and by applying the sine wave voltage of an arbitrary frequency to the electrode, the ultrasonic vibrator 2205 is driven in the shaft direction of the bolt 2204. In addition, this is a merely an example, and one piezoelectric element 2203 may be provided. In the ultrasonic vibrator 2205, the number of piezoelectric elements does not matter as long as a structure in which the piezoelectric element is fixed by fastening two or more metal blocks by the bolt. As the ultrasonic vibrator 205 is driven in the shaft direction of the bolt 2204, it is possible to generate the ultrasonic vibration to the vibrating part (cleaning head) 2209.

In particular, by making the shape of the front mass 2201 as a shape of a horn (a shape whose diameter on the piezoelectric element 2203 side and on the tip end side changes) as illustrated in the drawing, it is possible to amplify the generated amplitude of the piezoelectric element 2203. By designing the length or the shape of the horn in accordance with the frequency which is desired to be driven, a large amplitude can be obtained by a small amount of electricity. In FIG. 17, a shape of a conical horn is illustrated, but other shapes (exponential horn or the like) also do not have a problem. In other words, the diameter of the metal block to which the vibrating part is fixed continuously decreases when approaching the vibrating part. In addition, the sectional shape of the shape of a horn may not be circular, and may be polygonal. In this case, the diameter of a circumscribed circle and an inscribed circle continuously decreases. In addition, regarding the fixing of the vibrating part, since the vibrating part may be integrated with the front mass 2201, the fixing may be performed by the bolt or the like, or the vibrating part may be formed as one component with the front mass 2201.

Furthermore, in the example, the elongated vibrating part (cleaning head) 2209 which extends to the cleaning tank 2206 is provided at the tip end of the front mass 2201 having a shape of a horn, the vibration of the tip end of the horn is further enlarged by bending the member which extends downward, and a large displacement can be generated in the tip end part 2210.

In the ultrasonic cleaner 26 having the above-described configuration, by driving (generating the ultrasonic vibration) the piezoelectric element 2203 at a frequency of 20 to 100 kHz, the vibrating part (cleaning head) 2209 in the cleaning tank 2206 vibrates (the frequency is the same as the driving frequency) by a large displacement, and the cavitation occurs at the center of the periphery of the tip end part 2210 which is immersed in the cleaning liquid.

When cleaning the nozzle 22 by the ultrasonic cleaner 26, the piezoelectric element 2203 is driven at a frequency of 20 to 100 kHz, the nozzle 22 is inserted into the hole (hollow part) on the inner side of the cylindrical shape of the tip end part 2210 so that the cleaning range (range of approximately 5 millimeters from the nozzle tip end) is immersed in the cleaning liquid, and the contaminants which adhere to the outer circumferential part of the nozzle is removed by the cavitation by bringing the nozzle 22 in contact with the cleaning water for a certain period of time. The ultrasonic cleaner 26 of the present invention can generate a strong cavitation by a displacement enlarging effect of the vibrating part (cleaning head) 2209.

Additionally, when the ultrasonic vibrator 2205 vibrates, the vibrating part (cleaning head) 2209 has a resonance point at which the vibrating part (cleaning head) 2209 inserted into the cleaning tank 2206 resonates and vibrates within a range of 20 to 100 kHz. In addition, the control portion 28 cleans the nozzle 22 by vibrating the vibrating part (cleaning head) 2209 at 20 to 100 kHz in a state where the nozzle is inserted into the hollow part. Therefore, the tip end part 2210 can resonate in synchronization with the vibration of the ultrasonic vibrator 2205, and it is possible to effectively convert electric energy applied to the ultrasonic vibrator 2205 into a large amplitude of the tip end part 2210. In general mechanical design, since the bending is amplified as the components resonate each other, resonance points for avoiding the damage of the component can be designed to be separated, but the vibrating part (cleaning head) 2209 can obtain a high cleaning effect during a short period of time by actively using a resonance phenomenon on purpose since it is assumed that continuous driving for a long period of time is not performed.

After the cleaning, by drawing out the nozzle 22 and automatically replacing the cleaning liquid by the overflow, it is possible to perform the cleaning with new cleaning liquid when cleaning the next nozzle 22, and to suppress the carry-over.

In addition, since the cleaning can be performed as long as the cylindrical hole of the tip end part 2210 and the cleaning liquid on the periphery thereof are present, it is possible to reduce the amount of the cleaning liquid to be used. For example, when the outer diameter of the narrow nozzle is equal to or less than 1.0 millimeters, it is possible to perform the cleaning even when the liquid amount is equal to or less than 0.5 mL, and it is also possible to reduce the size of the cleaner.

Furthermore, by using the liquid temperature control which will be described later, it is possible to achieve a liquid temperature (temperature higher than the normal temperature) having a high effect of the chemical action of the cleaning liquid, and to obtain a high cleaning effect during a short period of time by a contaminant removing action by the physical action and the chemical action caused by the strong cavitation.

In the example, a method of use in which the cleaning liquid is put into the cleaning tank 2206 is described, but the cleaning liquid is not limited to the detergent, and may be the water. Even when the water is used, the fact that a high cleaning effect can be obtained by the cavitation does not change, not only the detergent but also hot water is effective with respect to the contaminants, such as protein, and the water may be used according to the target cleaning effect.

FIG. 18 is an example of a structure of the vibrating part (cleaning head) 2209 of the ultrasonic cleaner 26 of the example. Hereinafter, the vibrating part will be referred to as the cleaning head 2209. FIG. 18(*a*) is a front view, FIG. 18(*b*) is a side view, FIG. 18(*c*) is a perspective view of the cleaning head 2209, FIGS. 18(*d*), 18(*e*), and 18(*f*) are examples of other shapes of the tip end shape, FIG. 18(*g*) is an example in which the processing is applied to the neck, and FIG. 18(*h*) is an example in which a round part (R part) is provided between a tip end and a root. In addition, a neck 2304 is included in the cleaning head 2209 in addition to the tip end part.

Since it is necessary to attach the cleaning head 2209 to the tip end of the ultrasonic vibrator 2205, or to make an integrated structure with the front mass 2201, a fixing portion 2301 positioned in the upper part of the cleaning head 2209 is a columnar shape (an inclination may be provided on the side surface in accordance with the shape of a horn of the front mass 2201). A cleaning portion 2302 is provided in the tip end part of the lower part of the cleaning head 2209. In the cleaning portion 2302, a nozzle insertion port (through hole) 2303 which has the above-described cylindrical shape, which is greater than an outer shape of the nozzle 22 that is the cleaning target on the inner side of the cylindrical shape, and which corresponds to the hollow part. Between the fixing portion 2301 and the cleaning portion 2302, the neck 2304 for enlarging the displacement of the cleaning portion 2302, and a reinforcing portion 2305 which links the neck 2304 to the fixing portion 2301 and increases the strength of the root part, are provided. Since the neck 2304 extends in the perpendicular direction and the nozzle is lowered in the perpendicular direction and is inserted into the hollow part, the interference of the neck 2304 and the nozzle 22 is avoided. Therefore, the cleaning portion 2302 protrudes in the horizontal direction with respect to the neck 2304 (similar to the drawing, the side surface has an L shape).

In addition, the length from the end surface of the neck 2304 to the tip end of the cleaning portion 2302 in the horizontal direction is defined as a length 2302a of the cleaning portion, and the length from the lower end of the reinforcing portion 2305 to the lower end of the cleaning portion 2302 in the perpendicular direction is defined as a length 2304a of the neck portion. In addition, a height 2302b of the cleaning portion is defined by the shape of the cleaning portion 2302.

Since the cleaning portion 2302 is immersed in the cleaning liquid stored in the cleaning tank 2206 as described above, by driving the piezoelectric element 2203, the cavitation occurs in the cleaning liquid in the nozzle insertion port 2303 by the enlarged vibration in the cleaning portion 2302. In particular, the displacement generated in the piezoelectric element 2203 is enlarged by the front mass 2201 having the above-described shape of a horn, and is also further enlarged by the neck 2304. Therefore, the vibration of the large displacement is achieved in the cleaning portion 2302. Since the cavitation occurs in the region in which the ultrasonic wave is concentrated, and the cavitation becomes stronger as the ultrasonic intensity becomes stronger, the generation of a large displacement in a narrow range is effective in making the cavitation occur. In the cleaning head 2209 of the present invention, the large displacement can be generated, and further, the nozzle insertion port 2303 which matches the size of the nozzle 22 is a narrow region in which the hole diameter can be equal to or less the several millimeters, the distance between a vibration generating surface having high strength of cavitation and the entire circumference of the nozzle 22, and strong cavitation can be emitted. In addition, the cavitation becomes stronger as the nozzle insertion port 2303 becomes smaller, but as described above, there is a problem of residual vibration for the nozzle 22 to move at high speed, and it is necessary to design the nozzle insertion port 2303 to have a tolerance in a range with which the nozzle 22 is not in contact at the residual vibration generated in the lowering operation of the nozzle 22. Additionally, the cleaning portion 2302 has the resonance point when the ultrasonic vibrator 2205 vibrates within a range of 20 to 100 kHz. Since the ultrasonic vibrator 2205 vibrates at 20 to 100 kHz, a structure itself of the cleaning head 2209 is a structure which easily resonates. It is possible to emit strong cavitation by the resonance effect during a short period of time.

Next, an example of another shape of the cleaning portion 2302 will be described. As the shape of the cleaning portion 2302, a rectangular block shape 2311 having a notch, a cylindrical shape 2312 having a notch, or a shape 2313 in which a prismatic hole is open, also can obtain the cleaning effect. The attaching direction of each shape (2302, 2311, 2312, 2313) of the cleaning portion does not matter. For example, when the cleaning portion (2302, 2311, 2312, 2313) are attached being shifted by 90 degrees in the shaft direction of the bolt 2204, the cleaning can also be performed. In addition, the nozzle insertion port 2303 of the example of another shape can also be considered as the hollow part. In this manner, as the shape of the cleaning portion 2302, any of a shape having a notch and a shape which completely surrounds the nozzle may be employed. In other words, when the part of the cleaning portion 2302 is disposed in the plural directions when viewed from the nozzle 22, the part can be considered as the hollow part. By configuring the cleaning portion 2302 in this manner, it is possible to suppress the cleaning unevenness.

In the neck 2304, processing 2320 in which the diameter of the neck is narrow order to make it easy to enlarge the amplitude of the cleaning portion 2302 (in order to generate distortion which will be described later), may be added.

A cleaning head 2314 is an example of a structure different from the cleaning head 2209. In the cleaning head 2314, similar to the cleaning head 2209, the fixing portion 2301, the cleaning portion 2302, and the neck 2304 are provided (the reinforcing portion 2305 is not provided). The cleaning head 2314 is different from the cleaning head 2209 in that the nozzle insertion port 2303 is positioned to be comparatively separated from the neck 2304 by providing a connection portion 2321 between the cleaning portion 2302 and the neck 2304. An advantage of the cleaning head 2314 is that it is possible to provide the round part (R part) in the connection portion 2321, and to disperse stress generated at the large vibration of the cleaning portion 2302. Durability can increase by dispersing the stress and the use period can extend. In addition, as the nozzle insertion port 3032 is separated from the neck 2304, it is possible to further reduce a contact risk of the nozzle 22 and the cleaning head 2314. By attaching the cleaning head 2209 having the above-described configuration to the above-described ultrasonic vibrator 2205, or by making the front mass 2201 in an integrated structure, it is possible to cause the cavitation which occurs in the nozzle insertion port 2303 to effectively act on the outer circumference of the nozzle 22 which is inserted into the nozzle insertion port 2303 and immersed in the cleaning liquid.

FIG. 19 is a view illustrating an example of a vibration mode of the cleaning head 2209 and a temperature gradient of the cleaning liquid. FIG. 19(a) is deformation of a primary vibration mode, FIG. 19(b) is deformation of a secondary vibration mode, FIG. 19(c) is a temperature gradient of the cleaning liquid, and FIG. 19(d) is an impedance waveform of the ultrasonic vibrator to which the cleaning head (2209, 2314) is attached, respectively.

As described above, in the cleaning head 2209, the elongated neck 2304 is provided, and the vibration of the cleaning portion 2302 of the tip end is enlarged. The resonance frequency of the cleaning head 2209 is determined by a material (Young's modulus) of the cleaning head 2209, the length and the sectional shape of the neck 2304, and by the mass of the cleaning portion 2302, and the vibration of the cleaning portion 2302 becomes a large amplitude by performing the driving using the resonance frequency. In addition, a plurality of resonance frequencies in the shape added by the mass similar to the cleaning portion 2302 are provided at the tip end, and for example, in the cleaning head 2209, the resonance frequency in which the deformations, such as the primary vibration mode (a) and the secondary vibration mode (b), are generated. In addition, (a) and (b) illustrate the deformations of the neck 2304 by extremely enlarging the deformations in order to easily understand the difference of the vibration modes.

The primary vibration mode is a vibration mode in which the cleaning portion 2302 largely vibrates in the shaft direction of the bolt 2204. The secondary vibration mode is a vibration mode in which the cleaning portion 2302 vibrates in the shaft direction of the bolt 2204, a node (a part at which the amplitude is small) of the vibration is possible in the middle of the cleaning portion 2302, and the upper part and the lower part largely vibrate. Regarding the cleaning performance, in any vibration mode, the amplitude of the cleaning portion 2302 is obtained and the cavitation can occur, but in the secondary vibration mode, the upper and lower parts of the cleaning portion 2302 vibrate horizontally in the opposite phase around the node. Therefore, the movement of the cleaning portion 2302 for shaking the cleaning liquid generates a water flow in the cleaning tank 2206, the contaminants of the nozzle 22 which are dropped by the cavitation circulate in the cleaning tank 2206, and re-adhesion to the nozzle 22 can be suppressed. Meanwhile, the amplitude in the primary vibration mode can be greater than that in the secondary vibration mode.

Since the cleaning portion 2302 largely vibrates in the primary vibration mode, the neck 2304 is deformed and the distortion is generated. In the secondary vibration mode, since the vibration which become the opposite phase on the upper surface and on the lower surface of the cleaning portion 2302 causes the movement, the distortion is generated in the vicinity of a connecting part between the neck 2304 and the cleaning portion 2302. Since the metal material generates the heat when the distortion is generated, the heat is generated at a part near the cleaning portion 2302 of the neck 2304 in the primary vibration mode, and the heat is generated in the vicinity of the connecting part of the cleaning portion 2302 in the secondary vibration mode. Since the heat is generated at the part near the cleaning tank 2206 in any cases, the heat of the cleaning head 2209 moves to the cleaning liquid from the cleaning portion 2302. In particular, since the hole is open in the cleaning portion 2302 as described above, the contact area with the cleaning liquid increases, and the heat can effectively move. On the contrary, the reinforcing portion 2305 or the fixing portion 2301 which has a large volume is provided at the upper part of the cleaning head 2209, and the heat is more unlikely to be transmitted to the piezoelectric element 2203 than to the cleaning liquid since the heat is scattered. In addition, the heat can be discharged from the cleaning portion 2302 by performing the overflow of the cleaning liquid, the ultrasonic cleaner 26 also can prevent the heat generation having a temperature which is equal to or higher than a certain temperature even when the cleaning operation is continuously performed, and it is possible to use the cleaning liquid having a high liquid temperature which does not exceed a high temperature only in a time zone where the nozzle 22 is cleaned.

In addition, since the distortion is easily generated at a step part, in a case where the heat is not desired to be generated, it is possible to suppress the distortion by performing round processing (R processing) at the step part (refer to the R part of the cleaning head 2314). In particular, when the distortion is generated at the root part of the neck 2304, the root part is far from the cleaning tank 2206, and the transmission efficiency to the cleaning liquid is not excellent compared to a case where the heat is generated in the cleaning portion 2302. Therefore, it is desirable that the connection part between the reinforcing portion 2305 and the neck 2304 has a shape in which the round processing (R processing) is performed and a rapid change in the shape is not generated.

A temperature gradient 2401 of the cleaning liquid in the cleaning tank 2206 when the cleaning head 2209 is operated (when the ultrasonic vibrator 2205 is driven) is linearly raised for a certain period of time, and starts to be saturated after the certain period of time (refer to (c)). Therefore, the increase in liquid temperature from the start of the driving after the certain period of time can be illustrated by a linear approximate line 2402. As described above, the liquid temperature is lowered by making the cleaning liquid overflowed, but the temperature gradient 2401 can similarly raise the liquid temperature without differing from before the overflow. In other words, the temperature gradient of the liquid temperature in the cleaning tank 2206 when the cleaning head 2209 is operated again is investigated, and further, it is possible to predict the liquid temperature after the operation for a certain period of time when the liquid temperature before the operation of the cleaning head 2209 is known.

However, when using the primary vibration mode of the cleaning head 2209, the vibration amplitude becomes the maximum in the vicinity of the lower part of the cleaning portion 2302, and a state where the tip end part of the nozzle 22 can be cleaned the most is achieved. Meanwhile, when the second vibration mode of the cleaning head 2209 is used, regarding the vibration amplitude, the amplitude becomes the maximum in the vicinity of the upper part and the lower part of the cleaning portion 2302, and thus, the vibration mode is properly used according to the point which is desired to be cleaned in the nozzle 22, and accordingly, it is possible to obtain a high cleaning effect. For example, when suctioning the liquid from the container into which the liquid is put using the nozzle 22, the contaminants are likely to be accumulated at a position which is the same as the liquid surface of the nozzle 22 due to the surface tension of the liquid. Here, in a case where the driving is performed in the secondary vibration mode of the above-described cleaning head 2209, by matching the position (position which is the same as the liquid surface when suctioning the liquid) at which the contaminants of the nozzle 22 are accumulated to the height of the upper part of the cleaning head 2209, the contaminants can be easily removed. In other words, not only at the tip end of the nozzle 22, but also at the upper part thereof, it is possible to perform the cleaning with a strong cleaning force.

FIG. 19(d) is a view illustrating a frequency in a horizontal axis and an impedance in a vertical axis. A resonance point 2410 of the vibrating head and a resonance point 2411 (a mode of stretching and contracting the bolt 2042 in the shaft direction) of the ultrasonic vibrator 2205 are illustrated.

The cleaning head 2209 (314) can increase the cleaning force in the driving of the primary vibration mode and in the driving of the secondary vibration mode by a structure in which the resonance point is present at the driving frequency of 20 to 100 kHz in the ultrasonic vibrator 2205.

In particular, as illustrated in FIG. 19(*d*), it is desirable that the resonance point 2410 (a mode in which the tip end largely vibrates as illustrated in FIGS. 19(*a*) and 19(*b*)) of the cleaning head, and the resonance point 2411 of the ultrasonic vibrator 2205, approach each other, and an absolute value of the difference of the values is designed to be equal to or less than 10 kHz. The resonance point 2410 may be any of a resonance point of the primary vibration mode and a resonance point of the secondary vibration mode.

Whether performing the driving in the primary vibration mode or in the secondary vibration mode is determined by the structure of the cleaning head 2209 (2314). In particular, due to the condition of forming the hollow part, the cleaning head 2209 (2302) has a structure of the cleaning head 2209 (2314) having a weight at the tip end of the neck. When the neck is elongated or the weight is given to the tip end, the resonance point of the primary vibration mode tends to have a low frequency. Therefore, in a case where the primary vibration mode is desired to be used, it is necessary to consider the length or the weight of the neck. This is because the resonance point of the primary vibration mode of the cleaning head becomes less than 20 kHz when not considering the length or the weight of the neck. In addition, on the contrary, by employing an appropriate length or an appropriate weight of the neck, it is possible to include the resonance point of the primary vibration mode or the secondary vibration mode within the range of 20 to 100 kHz. In addition, since parameters which influence the resonance point are various as will be described later, here, the representative parameters, such as the length of the neck and the weight of the tip end are focused.

As described above, by performing the driving in a vibration mode in which the cleaning portion 2302 vibrates, the heat can be generated at a part close to the cleaning tank 2206 of the cleaning head 2209, and the liquid temperature of the cleaning liquid in the cleaning tank 2206 can be raised. In other words, before inserting the nozzle 22 into the cleaning liquid in the cleaning tank 2206, by driving the ultrasonic cleaner, the temperature of the cleaning liquid in the cleaning tank 2206 becomes a temperature higher than the normal temperature, the nozzle 22 is inserted into the cleaning liquid of the temperature higher than the normal temperature, and the ultrasonic cleaning is performed. In addition, when the gradient of the raising temperature per unit time is known in advance, it is possible to predict the liquid temperature after a certain period of time.

In addition, in using the secondary vibration mode at 20 to 100 kHz by the cleaning head 2209 (2314), it is necessary to appropriately design the rigidity of the neck determined by the length 2304*a*, the width (the diameter of the neck in the cleaning head 2209), and the depth (diameter of the neck in the cleaning head 2209) of the neck, and the mass of the cleaning portion 2302 which is determined by the length 2302*a* of the cleaning portion, the inner diameter of the nozzle insertion port 2303, and the outer diameter of the cleaning portion 2302.

It is necessary to narrowly design the outer diameter of the tip end of the nozzle 22 which is a target of the example to be 0.5 to 1.5 mm, and to design the nozzle insertion port 2303 to match the outer diameter of the nozzle. For example, the inner diameter of the nozzle insertion port 2303 is designed to be 2.0 to 4.0 mm, the height 2302*b* of the cleaning portion is designed to be 4.0 mm when the tip end of the nozzle 22 becomes 4.0 mm in the cleaning range, the thickness and the depth of the neck is designed to be in a range of 3.0 to 5.0 mm in the cleaning head 2314, the length is designed to be in a range of 15 to 20 mm, and the length 2302*a* of the cleaning portion is designed to be in a range of 7 to 10 mm. Accordingly, a design in which the resonance point of the secondary vibration mode is present at approximately 20 to 100 kHz, is employed. In the cleaning head 2209, the above-described thickness and the depth part of the neck is changed to the diameter, and is set to be 3.0 to 5.0 mm.

By considering the above-described dimensions as a reference, using the analysis, such as a finite element method, the design of the resonance frequency is performed more specifically. In addition, since the rigidity of the neck 2304 changes according to the presence or the absence of the R part 2321 between the cleaning portion 2302 and the neck 2304, and the shape of the round part (R part), there is also a case where the design condition of the resonance frequency is shifted by approximately ±1 mm from the reference dimension. In the example, an example in which the nozzle insertion port 2303 is near the tip end side of the cleaning portion 2302 is illustrated, but in a case where the nozzle insertion port 2303 is near the neck 2304 side, the center of gravity varies, and thus, the resonance frequency is slightly shifted.

In addition, the cleaning head (2209, 2314) is designed in a range of being shifted from the above-described dimension according to the outer diameter of the nozzle 22, but in designing the resonance of the secondary vibration mode to be 20 to 100 kHz, it is possible to similarly design from a ratio of the above-described rigidity of the neck and the cleaning portion.

It is desirable that the material of the cleaning head (2209, 2314) is similar to the material of the front mass 2201, or the material is SUS or titanium.

In this manner, in the description above, an example of the shape having the resonance point of the secondary vibration mode in 20 of 100 kHz is illustrated, but not being limited to the above-described numerical range, it is possible to have the resonance point of the secondary vibration mode in the above-described range, and thus, each numerical value itself is not important in a specific shape, and it is possible to realize the secondary vibration mode in various numerical values. The control portion 28 can obtain an effect obtained in the above-described secondary vibration mode by vibrating the ultrasonic vibrator at a frequency at which the cleaning head (2209, 2314) vibrates in the secondary vibration mode, and by performing the cleaning of the nozzle.

FIG. 20 is an example of a time chart of the nozzle cleaning during the operation in which the ultrasonic cleaner of the example is used. In FIG. 20, a time chart of a nozzle operation, an operation of the ultrasonic vibrator, and replacing of the cleaning liquid, are illustrated, and a temporal change in the temperature of the cleaning liquid is also illustrated. During the operation, since the device is operated at a high throughput for the sample examination, it is necessary to perform the cleaning of the nozzle 22 during a short period of time. For example, the cleaning of the nozzle is performed within 3.6 seconds. In addition, the operations are controlled by the control portion 28.

First, in order to replace the cleaning liquid in the cleaning tank 2206, a certain amount of cleaning liquid is extruded, and the overflow (2501) is performed. The cleaning liquid is extruded by the pump which is connected to the cleaning liquid supply tube 2211. After replacing the cleaning liquid and suppressing fluctuation of the liquid surface, the ultrasonic vibrator is driven, and the ultrasonic vibration is generated with respect to the cleaning liquid in the cleaning tank 2206 (2502). By generating the ultrasonic vibration, as described above, the cavitation occurs in the cleaning liquid in the cleaning tank 2206.

Next, the nozzle 22 is inserted into the cleaning liquid in the cleaning tank 2206 after the generation of the ultrasonic wave (2503), and the nozzle 22 is drawing out of the cleaning tank 2206 after a certain period of time (2504). An operation of inserting the nozzle 22 to the cleaning liquid in the cleaning tank 2206 (2503) and an operation of drawing the nozzle 22 out of the cleaning liquid (2504), are performed in the vertical operation of the sample dispensing mechanism 15 as described above, and the time period during which the nozzle 22 is immersed in the cleaning liquid in the cleaning tank 206 becomes the cleaning time at which the ultrasonic cleaner 26 is used.

In addition, after drawing out the nozzle 22, by stopping the ultrasonic vibration (2505) and by making the cleaning liquid overflowed (2506) again for the next cleaning, it is possible to perform the next cleaning with new cleaning liquid, and the contaminants of the nozzle 22 which are dropped by the ultrasonic cleaner 26 are discharged from the device as waste water.

In addition, the replacement timing of the cleaning liquid may be a timing immediately before using the ultrasonic cleaner 26 next, or may be a timing immediately after using the ultrasonic cleaner 26.

When performing the cleaning operation at the timing illustrated in FIG. 20, the temperature (2520) of the cleaning liquid in the cleaning tank 2206 is transited as illustrated in FIG. 20. The liquid temperature is lowered after the overflow (2501) of the cleaning liquid, and at a timing (2510) of starting the ultrasonic vibration for cleaning the nozzle 22, the liquid temperature starts to be raised by a certain gradient, and the temperature continues to be raised until a timing (2513) of stopping the ultrasonic vibrator. The liquid temperature is lowered after the timing, and the liquid temperature is further lowered by making the cleaning liquid overflowed (2506).

The ultrasonic cleaner 26 of the example can control the liquid temperature at the timing of cleaning the nozzle 22 to be a temperature which is appropriate in the cleaning. As described above, it is ascertained that the cleaning head 2209 (2314) of the ultrasonic cleaner 26 generates the heat at the neck of the cleaning head by the vibration, and the increase in the liquid temperature linearly changes during a certain period of time. Therefore, by adjusting an interval (time) between the timing (2510) of starting the ultrasonic vibration and the timing (2511) of inserting the nozzle 22 into the cleaning liquid in the cleaning tank, it is possible to control the liquid temperature of the cleaning liquid in the cleaning tank 206 of the timing (2510) of starting the ultrasonic vibration to be an arbitrary liquid temperature.

When setting the timing (2510) of starting the ultrasonic vibration to be earlier, compared to the time when the operation is performed at the reference timing, the liquid temperature during the cleaning can increase. On the contrary, when setting the timing (2510) of starting the ultrasonic vibration to be later, compared to the time when the operation is performed at the reference timing, the liquid temperature during the cleaning can decrease. In this manner, the temperature change which is different from the temperature change illustrated in FIG. 20 can be realized by the adjustment of the start timing of the ultrasonic vibration.

Here, since the nozzle 22 thermally expands when being immersed in the liquid having a high temperature, and the thermal expansion negatively influences the dispensing accuracy, the liquid temperature in the cleaning tank 2206 is not limited, the high temperature is not necessarily appropriate, and the liquid temperature which is in a range of not influencing the dispensing accuracy, is higher than the normal temperature (approximately 25° C.), and which can improve the cleaning effect, should be employed. In other words, only by simply setting the timing (2510) of starting the ultrasonic vibration to be earlier, the dispensing accuracy deteriorates even when the cleaning effect of the nozzle 22 is obtained, and a sufficient performance as the analyzer cannot be realized.

For example, when the liquid temperature (for example, equal to or higher than 60° C.) which influences the dispensing accuracy is set with respect to the liquid temperature (for example, equal to or higher than 40° C.) at which the cleaning effect is high, if the temperature does not reach 60° C. or higher until the timing (2512) of drawing the nozzle 22 out of the cleaning liquid in the cleaning tank 2206, the temperature does not influence the dispensing accuracy, and if the temperature is equal to or higher than 40° C. until the timing (2511) of inserting the nozzle 22 into the cleaning liquid in the cleaning tank 2206, the cleaning effect which is higher than that of the cleaning liquid at the normal temperature (approximately 25° C.) is obtained. Therefore, when the liquid temperature of the timing (2510) of starting the ultrasonic vibration is, for example, 25° C., and the temperature gradient of the cleaning liquid confirmed in advance is, for example, 3° C./seconds, the liquid temperature after 5 seconds becomes 40° C., and the liquid temperature after 12 seconds becomes 61° C. Therefore, the ultrasonic vibrator may be driven 5 or more seconds ago of 2503 of inserting the nozzle 22 into the cleaning liquid in the cleaning tank, and the ultrasonic vibration may be generated (502). As described above, since the automatic analyzer is a device which is operated at a high throughput, and the cleaning time of the nozzle 22 can be ensured only for approximately several seconds, if the nozzle 22 is inserted into the cleaning tank (2503), and the liquid temperature is 40° C. to 50° C., even when the liquid temperature increases during the cleaning, the temperature does not become equal to or greater than 60° C., and there is not the influence on the dispensing accuracy.

When an operation pattern is set after considering all of the conditions, while removing the influence on the dispensing accuracy in one operation pattern, it is possible to realize the cleaning at the liquid temperature having a high cleaning effect. However, when the volume of the cleaning liquid in the cleaning tank decreases, there is a case where the influence of the installation environment temperature and the difference of the device is received, and it becomes difficult to control the liquid temperature in the cleaning of the nozzle 22 in one operation pattern. Therefore, by adjusting the timing of inserting the nozzle 22 into the cleaning liquid and the timing of starting the ultrasonic vibration, it is possible to easily perform the control of including the liquid temperature during the cleaning of the nozzle 22 in a desirable range. In other words, the control portion 28 performs the ultrasonic cleaning of the nozzle 22 in the certain range of temperature in the temperature higher than the normal temperature by controlling the driving timing of the ultrasonic cleaner or the insertion and extraction timing of the nozzle 22 into and from the cleaning liquid in the cleaning tank.

In addition, in the ultrasonic cleaner 26 of the example, since a high cleaning effect can be obtained during approximately several seconds of the cleaning time, the time of giving the ultrasonic vibration is shortened, and further, the cleaning liquid is replaced being overflowed every time the cleaning is performed. Therefore, even when the ultrasonic cleaner 26 is repeatedly used, the ultrasonic cleaner 26 itself does not reach the temperature which influences the dispensing accuracy or the high temperature which causes a damage of the ultrasonic vibrator 2205.

As a method of detecting the liquid temperature, a method of disposing the temperature sensor (for example, a thermocouple) in the cleaning tank 2206, a method of sticking the temperature sensor (for example, a thermocouple) to the cleaning liquid supply tube 2211, or a method of disposing an infrared type (non-contact) sensor on the outside of the cleaning tank 2206, is employed, but the temperature detection method does not influence the liquid temperature control method during the nozzle cleaning.

In this manner, when it is possible to detect the liquid temperature before driving the ultrasonic cleaner by the sensor or the like, if a relationship between the driving time of the ultrasonic cleaner and the temperature increase of the cleaning liquid, for example, which is represented by a gradient of the raising temperature per unit time, is known in advance, the liquid temperature control during the nozzle cleaning can be easily performed. This is because it is possible to correctly predict the liquid temperature while the nozzle is in contact with the cleaning liquid, since it is possible to grasp whether or not the nozzle is in contact with the cleaning liquid from the lowering amount of the nozzle after several seconds after the device itself drives the ultrasonic cleaner.

By adjusting any of the timing (2510) of starting the ultrasonic vibration and the timing (2511) of inserting the nozzle into the cleaning liquid in the cleaning tank, based on the relationship, such as the temperature gradient of the cleaning liquid investigated in advance, and the liquid temperature before the driving the ultrasonic cleaner, it is possible to set the desirable liquid temperature at the timing (2511) of inserting the nozzle 22 into the cleaning liquid in the cleaning tank. However, in the automatic analyzer, at the timing of the nozzle 22, the control which is in synchronization with other units (other dispensing mechanism or reaction disk) is performed, there is a possibility that the timing adjustment of the driving of the nozzle influences other units, and there is a possibility that the control becomes complicated. Therefore, it is desirable that the liquid temperature control during the cleaning is performed at the timing (2510) of starting the ultrasonic vibration.

In addition, the liquid temperature which influences the dispensing accuracy varies according to the material or the volume of the nozzle 22, but it is possible to react to the timing adjustment of the present invention by grasping the influence temperature in advance.

In the example, an operation during the operation is described, but even in a reset operation of initiating the state where the device is initiated, or in an automatic maintenance operation which is performed when finishing the analysis or shutting down the device, it is possible to increase the temperature of the cleaning liquid, and to perform the effective cleaning. In this case, the temperature control which does not excessively increase the liquid temperature is performed by alternately performing the overflow (2501) for replacing the cleaning liquid and the driving (2502) of the ultrasonic vibrator, or by performing the replacing (2501) of the cleaning liquid in the middle of performing the driving (2502) of the ultrasonic vibrator, and it is possible to operate the ultrasonic cleaner 26 for a long period of time. Similar to the latter, the cleaning liquid in the cleaning tank is overflowed to the outside of the cleaning tank, and while performing the control of guiding new cleaning liquid into the cleaning tank, as the control portion 28 performs the ultrasonic cleaning of the nozzle, an equivalent cleaning effect is obtained during a short period of time by the alternate performing similar to the former.

In addition, when performing the maintenance operation or the reset operation of the automatic analyzer, the relationship between the driving time of the ultrasonic cleaner and the temperature increase of the cleaning liquid is stored, and based on the relationship, by controlling the driving timing of the ultrasonic cleaner during the operation or the insertion and extraction timing of the nozzle into and from the cleaning liquid in the cleaning tank, it is possible to perform the ultrasonic cleaning of the nozzle within a certain range of temperature.

In addition, in a case of the reset operation or the maintenance operation, unlike a case during the operation, since it is not necessary to consider the influence on the dispensing accuracy, the temperature may be grasped while the ultrasonic vibrator is practically driven by the above-described sensors or the like, and based on this, the temperature control may be performed.

FIG. 21 is a configuration example of the dispensing mechanism of the automatic analyzer and a control block of the cleaner in the present invention. On the operation screen of the automatic analyzer 10, a device operation and display portion 2600, and an analysis performing operation portion 2601 for performing the examination or a cleaner state display portion 2602 for displaying the state of the ultrasonic cleaner 26, are provided. A device control portion 2610 (corresponds to the control portion 28) which controls the device receives the command of the device operation and display portion 2600 from an upper communication processing portion 2611, and a device sequence processing portion 2612 controls the dispensing mechanism 15 or the ultrasonic cleaner 26 based on sequence data 2613.

A dispensing mechanism control portion 2614 performs the rotation or the vertical operation of the dispensing mechanism 15 via a motor control portion 2615 and a motor driving portion 2616, and moves the nozzle 22. A cleaner control portion 2617 controls an ultrasonic driving portion (piezoelectric element amplifier) 2619 via an ultrasonic control portion 2618, and drives (ON/OFF the ultrasonic wave) the ultrasonic vibrator 2205 provided in the ultrasonic cleaner 26.

Since the resonance properties of the ultrasonic vibrator 2205 changes due to the heat generation, in order to maintain the amplitude generated in the cleaning head 2209, it is necessary to correct the shift of the resonance frequency. Therefore, the ultrasonic driving portion 2619 uses a frequency adjustment portion (adjustment circuit) 2620, and changes the driving frequency in accordance with the change in the resonance frequency.

Furthermore, the cleaner control portion 2617 sends the command to a pump control portion 2621, and drives a pump 2630 through which a pump driving portion 2622 is linked to the pipe of the cleaning liquid supply tube 2211. A flow path or a tank which mixes pure water and the cleaning liquid with each other is provided on the upstream side of the pump, but is omitted in the example. By sending the cleaning liquid by driving the pump 2630, it is possible to extrude (overflow) the cleaning liquid of the cleaning tank 2206 and replace the cleaning liquid.

In addition, a temperature sensor 2640 disposed in the vicinity of the cleaning tank 2206 aggregates values recorded by a temperature metering portion (temperature sensor value recorder) 2623 by a metering processing portion 2624, accumulates the values in temperature data at the time of the ultrasonic driving 2625, and records the information related to the relationship between the driving time of the ultrasonic cleaner and the temperature increase of the cleaning liquid, such as the temperature gradient. By the cleaner control portion 2617, it is possible to calculate the timing of driving the ultrasonic vibrator 2205 based on the temperature data at the time of the ultrasonic driving 2625, and to adjust the timing (2510) of starting the ultrasonic vibration. In addition, in a case where the liquid temperature is higher than a predetermined temperature, it is possible to lower the liquid temperature by the overflow of the cleaning liquid using the pump control portion.

The temperature data at the time of the ultrasonic driving 2625 can also record the data at the time of normal operation, determine an abnormal state of the ultrasonic cleaner 26 by a liquid temperature state managing portion 2626, and display the abnormality on the cleaner state display portion 2602. In addition, the cleaner control portion 2614 included in the device control portion 2610 performs the control of replacing the cleaning liquid in the cleaning tank, and the liquid temperature state managing portion 2626 included in the device control portion 2610 can replace the cleaning liquid in the cleaning tank when it is determined that the measured temperature of the temperature metering portion 2623 exceeds a normal range. Since the replacement of the cleaning liquid causes the cooling effect, it is possible to suppress damage of the device caused by the heat. In addition, as described above, the liquid temperature state managing portion 2626 may notify the abnormality of the ultrasonic cleaner at the same time when it is determined that the measured temperature of the temperature metering portion 2623 exceeds the normal range.

In addition to the above-described methods, the temperature sensor 2640 may use any detection means among the detection means for interfering with the insertion and extraction operation of the nozzle 22, influencing the vibration of the ultrasonic vibrator 2205, or influencing the liquid temperature of the cleaning liquid.

FIG. 22 is an example of the cleaning flow in which the ultrasonic cleaner of the example is used. In the cleaning operation of the nozzle 22, first, the replacing operation (S2701) of the cleaning liquid is performed (the operation is not necessary in a case where the cleaning liquid is replaced in advance), it is determined whether or not the replacement is completed (S2702), and waiting is performed until the fluctuation of the liquid surface is stabilized (S2703). After this, any of the above-described detection methods with respect to the liquid temperature of the cleaning liquid in the cleaning tank 2206 is used, the liquid temperature is confirmed (S2704), and the time (timing) at which the driving of the ultrasonic vibrator is started is computed (S2705) from the information related to the relationship between the driving time of the ultrasonic cleaner and the temperature increase of the cleaning liquid, such as the temperature gradient of the cleaning liquid which is investigated in advance. After this, waiting is performed until reaching the computed time without the ultrasonic vibration (S2706), the liquid temperature in the cleaning tank 2206 is measured when reaching the computed time (S2707), the driving of the ultrasonic vibrator 2205 is started (S2708), and as described above, the processing of lowering the nozzle 22 and inserting the nozzle 22 into the cleaning liquid in the cleaning tank 2206 is performed (S2709), and the nozzle 22 is drawn out of the cleaning liquid in the cleaning tank 2206 after a certain period of time (predetermined cleaning time) has elapsed (S711).

In the driving of the ultrasonic vibrator 2205 (S2708), by performing the driving using the resonance frequency of the primary vibration mode or the secondary vibration mode of the cleaning head 2209, as described above, the heat generation from the neck 2304 of the cleaning head 2209 is started, and the temperature of the cleaning liquid in the cleaning tank 2206 can increase. By setting the timing (2510) of starting the driving of the ultrasonic vibrator 2205 to be an appropriate timing by checking the start of the ultrasonic vibration (S2706), the liquid temperature of the cleaning liquid in the cleaning tank 2206 before the nozzle insertion processing (S2709) becomes a value (temperature having a high cleaning effect) higher than the normal temperature, and the temperature becomes equal to or lower than the liquid temperature which does not influence the dispensing until performing nozzle drawing-out processing (S2711).

After drawing the nozzle 22 out of the cleaning liquid in the cleaning tank 2206, the driving of the ultrasonic vibrator 2205 is stopped (S2712), and the change in the liquid temperature while driving the ultrasonic vibrator 2205 is recorded (S2713).

The data, such as the temperature gradient used during the operation, may be updated every time the ultrasonic cleaner 26 is used, or may be obtained during the reset operation at the time of initiating the device or the maintenance operation, or by periodically performing the operations from S2707 to S2713 (S2709 and S2711 related to the nozzle operation are not necessary). In addition, in a case where the liquid temperature at every cleaning timing does not change, such as a case where the ultrasonic cleaner 26 is used in a certain cycle, by adjusting the timing by the reset operation or the maintenance operation, the timing of starting the driving of the ultrasonic vibrator 2205 during the operation may be fixed. In addition, in a case where the timing is not adjusted at the timing of the reset operation or the maintenance operation, the driving may be performed at the timing of starting the driving of the ultrasonic vibrator which is fixed at the time of shipment. In this case, steps S2705, S2707, and S2713 can be omitted.

In a step of cleaning liquid confirming processing (S2704), in addition to processing of confirming the temperature which influences the dispensing accuracy, or processing of predicting whether or not the liquid temperature becomes the temperature which influences the dispensing accuracy before drawing out the nozzle 22 (S2711) by driving the ultrasonic vibrator (S2708), processing of lowering the liquid temperature by making the cleaning liquid overflowed before driving the ultrasonic vibrator (S2708) may be added. However, as described above, since the ultrasonic cleaner 26 reaches the high temperature, and does not reach the liquid temperature which influences the dispensing accuracy in the normal operation, in a case where the temperature higher than the normal temperature is detected in the cleaning liquid confirming processing (S2704), processing of displaying an error on the operating portion of the device may be added.

According to the control method for controlling the liquid temperature of the ultrasonic cleaner 26 and the cleaning tank 2206 having the above-described configuration, and generating the cavitation in the cleaning liquid, by controlling the liquid temperature to be in the temperature range which is higher than the normal temperature and does not influence the dispensing accuracy before inserting the nozzle 22 into the cleaning tank 2206, and further, focusing the cavitation at the tip end of the cleaning head 2209, it is possible to clean the outer circumference of the nozzle 22 during a short period of time, and to provide a detection device having high detection accuracy without carrying over another sample which adheres to the nozzle 22.

Among commercial cleaners which vibrate the bottom of the cleaning tank by the piezoelectric element, there is a cleaner which performs the cleaning by generating a flow of the liquid which is called a straight flow in the middle of the liquid by driving the piezoelectric element at a several MHz, and the cleaner is used in cleaning a delicate target (for example, a semiconductor wafer) which does not desire the generation of a damage due to the generation of cavitation, but the cleaner is not appropriate since it is difficult to remove the contaminants which adhere to the nozzle. Meanwhile, the BLT interposes the piezoelectric element by two metal blocks and drops the resonance frequency to 20 to 100 kHz, and is advantageous in enlarging the amplitude and generating the cavitation. It is difficult to realize fast dispensing processing when performing the cleaning for a long period of time in order to increase the cleaning effect, but it is possible to clean the nozzle used in the analyzer which requires fast processing during a short period of time by using the BLT.

The ultrasonic cleaners of Examples 1 to 5 have common points that the vibration in the horizontal direction is generated in the cleaning tank by the BLT, and the vibrating part which vibrates in the horizontal direction is provided on the side surface side in the cleaning tank. In particular, in the ultrasonic cleaners of Examples 2 to 5, a support point of the vibrating part is provided on the upper part of the cleaning tank, a part thereof is immersed in the cleaning liquid, and it is advantageous in that an amplitude larger than that of a case where the diaphragm of Example 1 is used as the vibrating part can be obtained.

In the examples, the sample dispensation of the biochemical automatic analyzer is described, but the ultrasonic cleaner of the present invention can also similarly perform the cleaning in a dispensing nozzle of other clinical examination devices, such as a reagent dispensing nozzle or a dispensing nozzle of an immunological automatic analyzer or a coagulation automatic analyzer. In addition, not being limited to the dispensing nozzle, it is also possible to clean the nozzle which performs only the suctioning regardless of the nozzle for suctioning and ejecting. The material of the nozzle is not particularly limited, but for example, a metal nozzle is employed.

In addition, in the above-described embodiments, the analyzer in which the measuring portion which performs the photometry with respect to the mixture in the reaction cell is provided is described as an example, but in the analyzing method, in addition to the embodiments, the ultrasonic cleaner of the present invention can also be mounted on the analyzer provided with the measuring portion which is a type of performing the photometry in the pipe in which the mixture is suctioned from the reaction cell or the like. In addition to the measurement using the light, the ultrasonic cleaner of the present invention can also be mounted in the analysis in which voltage measurement of the mixture or the sample is used. Therefore, the measuring portion is not limited to the photometry. An example of an analyzer which uses the voltage measurement of the sample includes an electrolyte measurement device, and the ultrasonic cleaner of the present invention can also be mounted on the electrolyte measurement device.

In other words, a configuration in which the ultrasonic cleaner of the present invention is mounted on other clinical examination devices other than the biochemical automatic analyzer, is also included in the range of the claims of the present invention.

In addition, in Example 5, an example in which the ultrasonic vibrator is driven before inserting the nozzle into the cleaning liquid in the cleaning tank is illustrated, but depending on situation, the ultrasonic vibrator may be driven after the nozzle is inserted into the cleaning liquid.

In addition, the cleaning tank may be included or may not be included in the configuration of the ultrasonic cleaner.

In addition, similar shape of the vibrating part may be realized in two or more ultrasonic cleaners. However, as described in the above-described embodiments, it is possible to reduce the cost by realizing one ultrasonic cleaner.

In addition, the ultrasonic cleaner described in the embodiments is also advantageous as a single ultrasonic cleaner which cleans the dispensing nozzle or the suctioning nozzle without being combined with the automatic analyzer.

The above-described embodiments are an example, and various combinations of the examples are possible. For example, the flow of FIG. 22 may be employed in the ultrasonic cleaner having the configuration of FIGS. 10 to 14, and the flows of FIGS. 8, 15, and 16 may be employed in the ultrasonic cleaner having the configuration of FIG. 17 or 18.

In other words, the above-described embodiments are an example, various combinations or various modification examples can be considered, and various combinations or various modification examples are included in the range of the claims without departing from the scope of the present invention.

REFERENCE SIGNS LIST

10 AUTOMATIC ANALYZER
11 REAGENT CONTAINER
12 REAGENT DISK
13 REACTION DISK
14 REAGENT DISPENSING MECHANISM
15 SAMPLE DISPENSING MECHANISM
21 REAGENT NOZZLE
22 SAMPLE NOZZLE
23 SAMPLE CONTAINER
24 LACK
25 REACTION CELL
26 ULTRASONIC CLEANER
27 CLEANING TANK
28 CONTROL PORTION
29 MEASURING PORTION
100 BLT
200 ULTRASONIC CLEANER
201 BLT
202 DIAPHRAGM
203 CLEANING PORT
204 FLANGE
205 SEALING MEMBER
208 DISCHARGE PORT
210 OPENING PART
211 CLEANING TANK
220 COVER
221 PLATE SPRING
222 VIBRATING PART
223 CLEANER BASE
224 BOLT
225 LIQUID FEEDING PORT
226 HOLE FOR DISCHARGE
311 PIEZO ELEMENT

312 PRESSING MEMBER
313 PRESSING MEMBER
321 SCREW PORTION
322 METAL PLATE
323 VIBRATING PART
324 NECK
400 VIBRATING PART
401 STANDING WAVE
402 HALF-WAVELENGTH OF STANDING WAVE
403 REGION IN WHICH ULTRASONIC INTENSITY IS STRONG (VIBRATING PART SIDE)
404 REGION IN WHICH ULTRASONIC INTENSITY IS STRONG (LIQUID SURFACE SIDE)
501 RANGE TO WHICH SAMPLE ADHERES
502 CLEANING RANGE OF ULTRASONIC CLEANER
503 CLEANING RANGE OF WATER CLEANING
511 BOTTOM OF CLEANING TANK
512 POOL OF CLEANING TANK
513 LIQUID LEVEL
514 NOZZLE TIP END POSITION
515 CENTER LINE OF DIAPHRAGM
516 LENGTH FROM FIXING END TO FIXING END OF DIAPHRAGM
601 PIPE
602 SYRINGE PUMP
603 CLEANING LIQUID TANK
604 PIPE (FOR WATER WORKS FACILITIES)
605 SWITCHING VALVE
606 OVERFLOW RECEIVER
900 ULTRASONIC CLEANER
901 CLEANING PORT
902 CLEANING TANK
903 SURFACE ON CLEANING TANK SIDE OF CLEANING PORT
1200 ULTRASONIC CLEANER
1201 ULTRASONIC VIBRATOR
1202 VIBRATING PART
1203 PLATE SPRING
1204 BOLT
1205 CLEANER BASE
1206 CLEANING TANK
1207 SUPPLY PORT
1208 DISCHARGE PORT
1209 HOLLOW PART
1211 METAL BLOCK (ON VIBRATING PART SIDE)
1212 METAL BLOCK
1213 PIEZO ELEMENT (PIEZOELECTRIC ELEMENT)
1300 ULTRASONIC CLEANER
1301 ULTRASONIC VIBRATOR
1302 VIBRATOR BASE
1303 VIBRATING PART
1311 METAL BLOCK (ON VIBRATING PART SIDE)
1312 METAL BLOCK
1313 PIEZO ELEMENT (PIEZOELECTRIC ELEMENT)
1314 METAL MEMBER
1320 HOLLOW PART
1400 ULTRASONIC CLEANER
1401 ULTRASONIC VIBRATOR
1402 TUBE
1403 BOLT (HOLE THROUGH WHICH TUBE PASSES TO INSIDE)
1501 PIPE
1502 SYRINGE PUMP
1503 CLEANING LIQUID TANK
1504 PIPE CONNECTED TO WATER WORKS
1505 SWITCHING VALVE
1506 PIPE CONNECTED TO SEWAGE
1507 FLOW PATH OF LIQUID AT TIME OF OVERFLOW
2201 FRONT MASS
2202 BACK MASS
2203 PIEZOELECTRIC ELEMENT
2204 BOLT
2205 ULTRASONIC VIBRATOR
2206 CLEANING TANK
2207 BASE PORTION
2208 FLANGE PORTION
2209 VIBRATING PART (CLEANING HEAD)
2210 TIP END PART
2211 CLEANING LIQUID SUPPLY TUBE
2212 LIQUID RECEIVER
2213 DRAINAGE PATH
2301 FIXING PORTION
2302 CLEANING PORTION
2303 HOLLOW PART (NOZZLE INSERTION PORT)
2304 NECK
2305 REINFORCING PORTION
2311 RECTANGULAR BLOCK SHAPE
2312 CYLINDRICAL SHAPE
2313 SHAPE IN WHICH PRISMATIC HOLE IS OPEN
2314 CLEANING HEAD
2401 TEMPERATURE GRADIENT
2402 LINEAR APPROXIMATE LINE
2501 OVERFLOW OPERATION
2502 DRIVING OPERATION OF ULTRASONIC VIBRATOR
2503 OPERATION OF INSERTING NOZZLE INTO CLEANING LIQUID IN CLEANING TANK
2504 OPERATION OF DRAWING NOZZLE OUT OF CLEANING LIQUID IN CLEANING TANK
2505 OPERATION OF STOPPING DRIVING OF ULTRASONIC VIBRATOR
2506 OVERFLOW OPERATION
2510 TIMING OF STARTING DRIVING OF ULTRASONIC VIBRATOR
2511 TIMING OF INSERTING NOZZLE INTO CLEANING LIQUID INTO CLEANING TANK
2512 TIMING OF DRAWING NOZZLE OUT OF CLEANING LIQUID IN CLEANING TANK
2513 TIMING OF STOPPING ULTRASONIC VIBRATOR
2520 TEMPERATURE OF CLEANING LIQUID
2600 DEVICE OPERATION AND DISPLAY PORTION
2601 ANALYSIS PERFORMING OPERATION PORTION
2602 CLEANER STATE DISPLAY PORTION
2610 DEVICE CONTROL PORTION
2611 UPPER COMMUNICATION PROCESSING PORTION
2612 DEVICE SEQUENCE PROCESSING PORTION
2613 SEQUENCE DATA
2614 DISPENSING MECHANISM CONTROL PORTION
2615 MOTOR CONTROL PORTION
2616 MOTOR DRIVING PORTION
2617 CLEANER CONTROL PORTION
2618 ULTRASONIC CONTROL PORTION
2619 ULTRASONIC DRIVING PORTION
2620 FREQUENCY ADJUSTMENT PORTION
2621 PUMP CONTROL PORTION
2622 PUMP DRIVING PORTION

2623 TEMPERATURE METERING PORTION
2624 METERING PROCESSING PORTION
2625 TEMPERATURE DATA AT TIME OF ULTRASONIC DRIVING
2626 LIQUID TEMPERATURE STATE MANAGING PORTION
2630 PUMP
2640 TEMPERATURE SENSOR

The invention claimed is:

1. An automatic analyzer comprising:
a nozzle which suctions a sample or a reagent;
a cleaning tank which cleans the nozzle;
an ultrasonic cleaner which generates an ultrasonic wave; and
a control portion which performs driving control of the ultrasonic cleaner,
wherein the ultrasonic cleaner includes
a vibrating part which is inserted into cleaning liquid in the cleaning tank and has a cleaning portion with a hollow part into which the nozzle is inserted, and transmits ultrasonic vibration to the cleaning liquid, and
an ultrasonic vibrator which is configured by fixing and fastening a piezoelectric element with two or more metal blocks by a bolt, and generates the ultrasonic vibration to the vibrating part in a horizontal direction,
wherein one end of the vibrating part is connected to the metal blocks at an upper part of the cleaning tank,
wherein the cleaning portion provided at another end of the vibrating part vibrates as a free end in accordance with vibration of the ultrasonic vibrator in the horizontal direction, and
wherein the control portion causes the vibrating part to generate the ultrasonic vibration in a state where the nozzle is inserted into the hollow part, to clean the nozzle.

2. The automatic analyzer according to claim 1,
wherein the vibrating part is provided with two surfaces that oppose each other via the hollow part.

3. The automatic analyzer according to claim 2,
wherein the two surfaces of the vibrating part oppose each other in the vibrating direction of the vibrating part.

4. The automatic analyzer according to claim 3,
wherein the vibrating part has a shape which surrounds the entire periphery of the hollow part, and the two surfaces are inner wall surfaces having the shape.

5. The automatic analyzer according to claim 1, further comprising:
a heat radiation portion which is disposed between the piezoelectric element and the vibrating part.

6. The automatic analyzer according to claim 5,
wherein a metal plate spring which is disposed between the ultrasonic vibrator and the vibrating part and a cleaner base which includes the cleaning tank are fixed, and the heat radiation portion is the plate spring and the cleaner base.

7. The automatic analyzer according to claim 5,
wherein a metal member which is disposed on a side closer to the piezoelectric element than the vibrating part and the vibrator base are fixed, and the heat radiation portion is the metal member and the vibrator base.

8. The automatic analyzer according to claim 5, further comprising:
a flow path for making fluid flow in the ultrasonic vibrator,
wherein the heat radiation portion is the flow path.

9. The automatic analyzer according to claim 1, further comprising:
a pipe which is connected to the cleaning tank and supplies cleaning liquid and water,
wherein the control portion controls supply of the cleaning liquid and the water to the cleaning tank via the pipe, and
wherein the control portion controls supply of the water to the cleaning tank and discharges the water from an opening part of the cleaning tank by overflow at a timing at which the driving control of the ultrasonic cleaner is not performed.

10. The automatic analyzer according to claim 1, further comprising:
resonance frequency measuring means for measuring a resonance frequency of the ultrasonic vibrator,
wherein the control portion stops control of the nozzle which is scheduled to be inserted into the cleaning tank in accordance with the resonance frequency measured by the resonance frequency measuring means.

11. The automatic analyzer according to claim 1, further comprising:
temperature measuring means for measuring the temperature of the nozzle,
wherein the control portion stops control of a sample suctioning operation which is scheduled to be performed next in accordance with the temperature measured by the temperature measuring means.

12. The automatic analyzer according to claim 1, further comprising:
any of measuring means among the resonance frequency measuring means for measuring the resonance frequency of the ultrasonic vibrator and measuring means for measuring the temperature of the nozzle,
wherein heat of the nozzle is radiated by allowing inner cleaning water and outer cleaning water to come into contact with the nozzle, in accordance with the measurement result of the measuring means.

13. The automatic analyzer according to claim 1,
wherein the vibrating part has a resonance point at which the vibrating part inserted into the cleaning tank resonates and vibrates within a range of 20 to 100 kHz when the ultrasonic vibrator vibrates, and
wherein the control portion causes the vibrating part to vibrate at 20 to 100 kHz in a state where the nozzle is inserted into the hollow part, to clean the nozzle.

14. The automatic analyzer according to claim 13,
wherein the ultrasonic vibrator has the resonance point within a range of 20 to 100 kHz, and
wherein an absolute value of a difference between the resonance point of the ultrasonic vibrator and the resonance point of the vibrating part is equal to or less than 10 kHz.

15. The automatic analyzer according to claim 14,
wherein the vibrating part has a resonance point at which the vibrating part resonates and vibrates in a secondary vibration mode within a range of 20 to 100 kHz, and
wherein the control portion causes the ultrasonic vibrator to vibrate at a frequency at which the vibrating part vibrates in the secondary vibration mode to clean the nozzle.

16. The automatic analyzer according to claim 1,
wherein the ultrasonic cleaning is performed by setting the temperature of the cleaning liquid in the cleaning tank to be higher than a normal temperature by the ultrasonic cleaner being driven before inserting the nozzle into the cleaning liquid in the cleaning tank, and by inserting the nozzle into the cleaning liquid having a temperature higher than the normal temperature.

17. The automatic analyzer according to claim 16, further comprising:
a dispensing mechanism provided with the nozzle,
wherein the control portion controls the dispensing mechanism, and
wherein the control portion performs the ultrasonic cleaning of the nozzle within a certain temperature range at the temperature higher than the normal temperature, by controlling a driving timing of the ultrasonic cleaner or an insertion and extraction timing of the nozzle into and from the cleaning liquid in the cleaning tank.

18. The automatic analyzer according to claim 17,
wherein the control portion stores a relationship between driving time of the ultrasonic cleaner and a temperature increase of the cleaning liquid when performing a maintenance operation or a reset operation of the automatic analyzer, and performs the ultrasonic cleaning of the nozzle within the certain temperature range by controlling the driving timing or the insertion and extraction timing based on the relationship.

19. The automatic analyzer according to claim 16,
wherein the control portion performs control of replacing the cleaning liquid in the cleaning tank,
wherein a metering portion which measures the liquid temperature of the cleaning liquid in the cleaning tank is further provided, and
wherein the control portion causes the cleaning liquid in the cleaning tank to be replaced when it is determined that the measured temperature of the metering portion exceeds a normal range.

20. The automatic analyzer according to claim 19,
wherein the control portion notifies abnormality of the ultrasonic cleaner when it is determined that the measured temperature of the metering portion exceeds the normal range.

21. The automatic analyzer according to claim 1,
wherein the control portion performs a first control in which the cleaning liquid in the cleaning tank is overflowed to the outside of the cleaning tank, and new cleaning liquid is guided into the cleaning tank, and
wherein the control portion causes the ultrasonic cleaning of the nozzle to be performed while performing the first control.

22. The automatic analyzer according to claim 1,
wherein the vibrating part is connected to one of the metal blocks, and
wherein the metal block to which the vibrating part is connected, has a shape of a horn whose diameter continuously decreases when approaching the vibrating part.

23. The automatic analyzer according to claim 1, further comprising:
a reaction disk having a reaction cell in which a mixture of a sample and a reagent is accommodated; and
a measuring portion which measures the mixture.

24. The automatic analyzer according to claim 1, further comprising:
a tube which supplies the cleaning liquid to the cleaning tank,
wherein an outlet on the cleaning tank side of the tube is disposed immediately below a bottom of the vibrating part.

25. The automatic analyzer according to claim 1,
wherein the vibrating part includes a member extending in a perpendicular direction,
wherein the cleaning portion is provided at a tip end of the member, and
wherein a connection portion for separating the hollow part and the member is provided between the cleaning portion and the member.

26. The automatic analyzer according to claim 25,
wherein the connection portion has a round part.

* * * * *